(12) United States Patent
Morin et al.

(10) Patent No.: US 9,981,377 B2
(45) Date of Patent: May 29, 2018

(54) FLEXIBLE ROBOTIC ACTUATORS

(71) Applicant: President and Fellows of Harvard College, Cambridge, MA (US)

(72) Inventors: Stephen A. Morin, Arlington, MA (US); Robert F. Shepherd, Brooktondale, NY (US); Adam Stokes, Watertown, MA (US); Filip Ilievski, Santa Clara, CA (US); Ramses V. Martinez, Somerville, MA (US); Jamie L. Branch, Topeka, KS (US); Carina R. Fish, Cambridge, MA (US); Lihua Jin, Somerville, MA (US); Rui M. D. Nunes, Somerville, MA (US); Zhigang Suo, Lexington, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 647 days.

(21) Appl. No.: 14/480,106

(22) Filed: Sep. 8, 2014

(65) Prior Publication Data

US 2015/0283699 A1    Oct. 8, 2015

Related U.S. Application Data

(63) Continuation of application No. PCT/US2013/032297, filed on Mar. 15, 2013.
(Continued)

(51) Int. Cl.
*B25J 9/14*     (2006.01)
*B25J 9/10*     (2006.01)
(Continued)

(52) U.S. Cl.
CPC ............ *B25J 9/142* (2013.01); *A47L 9/2836* (2013.01); *B25J 9/1075* (2013.01); *B25J 9/1697* (2013.01);
(Continued)

(58) Field of Classification Search
CPC . F15B 7/06; F15B 15/10; F15B 15/103; B25J 9/1075; B25J 9/14; B25J 9/142;
(Continued)

(56) References Cited

U.S. PATENT DOCUMENTS 2,891,139 A    6/1959 Wass et al.
3,284,964 A   11/1966 Saito
(Continued)

FOREIGN PATENT DOCUMENTS

DE          19617852 A1    10/1997
DE     102009029972 A1    12/2010
(Continued)

OTHER PUBLICATIONS

Robot Arm Roomba Youtube.*
(Continued)

*Primary Examiner* — Thomas E Lazo
*Assistant Examiner* — Dustin T Nguyen
(74) *Attorney, Agent, or Firm* — Wilmer Cutler Pickering Hale and Dorr LLP

(57) ABSTRACT

Systems and methods for providing flexible robotic actuators are disclosed. Some embodiments of the disclosed subject matter include a soft robot capable of providing a radial deflection motions; a soft tentacle actuator capable of providing a variety of motions and providing transportation means for various types of materials; and a hybrid robotic system that retains desirable characteristics of both soft
(Continued)

robots and hard robots. Some embodiments of the disclosed subject matter also include methods for operating the disclosed robotic systems.

13 Claims, 41 Drawing Sheets

Related U.S. Application Data

(60) Provisional application No. 61/698,436, filed on Sep. 7, 2012, provisional application No. 61/673,003, filed on Jul. 18, 2012, provisional application No. 61/615,665, filed on Mar. 26, 2012.

(51) Int. Cl.
*A47L 9/28* (2006.01)
*B25J 9/16* (2006.01)

(52) U.S. Cl.
CPC ........ *Y10S 901/22* (2013.01); *Y10T 74/20305* (2015.01)

(58) Field of Classification Search
CPC .... B25J 11/00; B25J 15/0023; B25J 15/0616; B25J 15/0625; B25J 15/065; B25J 15/0683; Y10T 74/20305; Y10S 901/22
USPC ........... 92/92, 48; 901/22, 37; 700/259, 250, 700/255, 248, 264; 294/185; 414/627
See application file for complete search history.

(56) References Cited

U.S. PATENT DOCUMENTS

| | | | |
|---|---|---|---|
| 3,343,864 A | 9/1967 | James | |
| 3,601,442 A | 8/1971 | Orndorff | |
| 3,713,685 A | 1/1973 | Ewing | |
| 3,987,528 A | 10/1976 | Zemek et al. | |
| 4,337,921 A | 7/1982 | Edwards | |
| 4,751,869 A | 6/1988 | Paynter | |
| 4,784,042 A | 11/1988 | Paynter | |
| 4,815,782 A | 3/1989 | Craig et al. | |
| 4,928,926 A | 5/1990 | Bloemendal et al. | |
| 4,976,191 A | 12/1990 | Suzumori et al. | |
| 5,018,506 A | 5/1991 | Danna et al. | |
| 5,021,064 A | 6/1991 | Caines | |
| 5,080,000 A * | 1/1992 | Bubic ............... B25J 18/06 294/119.3 | |
| 5,156,081 A | 10/1992 | Suzumori | |
| 5,317,952 A | 6/1994 | Immega | |
| 5,327,038 A | 7/1994 | Culp | |
| 5,385,080 A | 1/1995 | Suzumori | |
| 5,568,957 A | 10/1996 | Haugs | |
| 5,619,993 A | 4/1997 | Lee | |
| 5,697,285 A | 12/1997 | Nappi et al. | |
| 5,833,291 A | 11/1998 | Haugs | |
| 6,125,492 A | 10/2000 | Prowse | |
| 6,178,872 B1 | 1/2001 | Schulz | |
| 6,671,582 B1 * | 12/2003 | Hanley ............... A01B 51/02 250/339.11 | |
| 6,718,766 B2 | 4/2004 | Seto et al. | |
| 6,772,673 B2 | 8/2004 | Seto et al. | |
| 7,086,322 B2 | 8/2006 | Schulz | |
| 7,258,379 B2 | 8/2007 | Ono et al. | |
| 7,327,067 B2 | 2/2008 | Ishibashi et al. | |
| 7,331,273 B2 | 2/2008 | Kerekes et al. | |
| 7,617,762 B1 | 11/2009 | Ragner | |
| 7,654,595 B2 | 2/2010 | Yokoyama et al. | |
| 2003/0226355 A1 | 12/2003 | Simburger | |
| 2004/0050247 A1 | 3/2004 | Topping | |
| 2004/0118366 A1 | 6/2004 | Kluge | |
| 2005/0282462 A1 | 12/2005 | Panec et al. | |
| 2006/0028041 A1 * | 2/2006 | Ono ................. B25J 9/142 294/119.3 | |
| 2010/0106298 A1 * | 4/2010 | Hernandez .......... G05D 1/0217 700/250 | |
| 2010/0258362 A1 * | 10/2010 | Trimmer ................ A63H 11/18 180/7.1 | |

FOREIGN PATENT DOCUMENTS

| | | |
|---|---|---|
| EP | 0146261 A1 | 6/1985 |
| EP | 1190819 A1 | 3/2002 |
| EP | 1319845 A2 | 6/2003 |
| GB | 2296941 A | 7/1996 |
| JP | H01247809 A | 10/1989 |
| JP | H02-134465 A | 5/1990 |
| JP | 8-323676 | 12/1996 |
| JP | 2006204612 A | 8/2006 |
| WO | WO-98/49976 A1 | 11/1998 |
| WO | WO-0179707 A1 | 10/2001 |
| WO | WO-2006036067 A2 | 4/2006 |
| WO | WO-2006080088 A1 | 8/2006 |
| WO | WO-2012/148472 A2 | 11/2012 |

OTHER PUBLICATIONS

Robot Arm Roomba Youtube 2.*

Bar-Cohen, et al., "Low-mass Muscle Actuators using electroactive polymers (EAP)", Proceedings of SPIE's 5th Annual International Symposium on Smart Structures and Materials, Mar. 1-5, 1998, San Diego, CA. Paper No. 3324-32 (6 pages).

Brown, et al., "Universal robotic gripper based on the jamming of granular material" and "Universal Robotic Gripper based on the Jamming of Granular Material: Supplementary Material" PNAS vol. 107 (44):18809-18814 and 10.1073/pnas.1003250107, Nov. 2010 (12 pages).

Correll, et al., "Soft Autonomous Materials-Using Active Elasticity and Embedded Distributed Computation", 12th International Symposium on Experimental Robotics, Delhi, India, Dec. 18-21, 2010 (14 pages).

Daerden, F., et al., "Pneumatic Artificial Muscles: actuators for robotics and automation", Vrije Universiteit Brussel, Department of Mechanical Engineering, Eur. J. Mech. Environ. Eng., vol. 47, pp. 10-21, 13 pages (2000).

Fujiwara, et al., "Linear Expansion and Contraction of Paired Pneumatic Balloon Bending Actuators Toward Telescopic Motion", 22th IEEE Int. Conf. on Micro Electro Mechanical Systems ( MEMS 2009 ), Sorrento, Italy (1 page).

Galloway, Soft Actuator Prior Art Survey, Dec. 12, 2012 (34 pages).

Hamlen, et al., "Electrolytically Activated Contractile Polymer", Nature 206(4989): 1149-1150, Jun. 12, 1965 (2 pages).

International Search Report and Written Opinion issued by the European Patent Office as International Searching Authority for International Application No. PCT/US2013/032297 dated Sep. 30, 2013. 14 pages.

International Search Report and Written Opinion issued by the European Patent Office as International Searching Authority for International Patent Application No. PCT/US2011/061720 dated May 8, 2013. 9 pages.

International Search Report and Written Opinion issued by the European Patent Office as International Searching Authority for International Application No. PCT/US2013/022593 dated May 7, 2013 (10 pages).

International Search Report and Written Opinion issued by the European Patent Office as International Searching Authority for International Application No. PCT/US2013/028250 dated Aug. 30, 2013 (19 pages).

International Search Report and Written Opinion issued by the U.S Patent and Trademark Office as International Searching Authority for International Application No. PCT/US2012/059226 dated Jun. 19, 2013 (12 pages).

Kim, et al., "Micro artificial muscle fiber using NiTi spring for soft robotics", The 2009 IEEE/RSJ International Conference on Intelligent Robots and Systems, Oct. 11-15, 2009 St. Louis, USA, 2228-2234 (7 pages).

(56) References Cited

OTHER PUBLICATIONS

Konishi, et al., "Merging micro and macro robotics toward micro manipulation for biomedical operation", Proceedings of the 36th International Symposium on Robotics, 2005 (6 pages).
Konishi, S. et al., "Fluid-Resistive Bending Sensor Compatible with a Flexible Pneumatic Balloon Actuator," Journal of Robotics and Mechatronics, vol. 20, No. 3, pp. 436-437 (Jan. 24, 2008).
Kuhn, W. and Hargitay, B., "Reversible Dilation and Contraction by Changing the State of Ionization of High-Polymer Acid Networks," Nature, vol. 165, pp. 514-516 (Apr. 1, 1950).
Laschi, et al., "Design of a biomimetic robotic octopus arm", Bioinspiration & Biomimetics, 4(1); Mar. 2009 (8 pages).
Marchese, et al., "Soft Robot Actuators using Energy-Efficient Valves Controlled by Electropermanent Magnets", Author's Final manuscript, International Conference on Intelligent Robots and Systems, pp. 756-761. IEEE, (2011) (7 pages).
Micro/Nano Mechatronics Lab., "Fluid—Resistive Bending Sensor Having Perfect Compatibility with Flexible Pneumatic Balloon Actuator", Group Robotics Ritsumeikan University (1 page) (2007).
Morin, S. A. et al., "Camouflage and Display for Soft Machines", Science, vol. 337, pp. 828-832 (Aug. 17, 2012).
Mosadegh, B. et al., "Pneumatic Networks for Soft Robotics that Actuate Rapidly", and "Pneumatic Networks for Soft Robotics that Actuate Rapidly: Supporting Information," Advanced Functional Materials, 20 pages (2013).
Nakajima, et al., "Timing and Behavioral Efficiency in Controlling a Soft Body: A Case Study in Octopus Reaching", The 2nd International Conference on Morphological Computation, pp. 133-135 (2011).
Onal, et al, "Soft mobile robots with on-board chemical pressure generation", 15th International Symposium on Robotics Research, Flagstaff, AZ—Aug. 28-Sep. 1, 2011 (16 pages).
Osada, et al., "Soft and Wet Materials: Polymer Gels", Advanced Materials 10(11):827-837, 1998 (11 pages).
Otake, et al., "Motion design of a starfish-shaped gel robot made of electro-active polymer gel", Robotics and Autonomous Systems 40:185-191, 2002 (7 pages).
Pritts, M. B. et al., "Design of an Artificial Muscle Continuum Robot," Proceedings of the 2004 IEEE, International Conference on Robotics & Automation, New Orleans, LA, pp. 4742-4746 (Apr. 2004).
Rahn, Christopher D., "Biologically Inspired Design of Soft Robotic Manipulators," Biodynotics, Biologically Inspired Dynamic Robotics Presentation, 32 pages (Jul. 2008).
Steltz, et al, "JSEL: Jamming Skin Enabled Locomotion", The 2009 IEEE/RSJ International Conference on Intelligent Robots and Systems Oct. 11-15, 2009 St. Louis, USA, pp. 5672-5677.
Suzumori, "Elastic materials producing compliant robots", Robotics and Autonomous Systems 18:135-140, 1996 (6 pages).
Symposium L—NEMS/MEMS Technology and Devices, International Conference on Materials for Advanced Technologies 2009 and International Union of Materials Research Societies—International Conference in Asia 2009 (60 pages).
Trivedi, et al., "Geometrically exact dynamic models for soft robotic manipulators", Proceedings of the 2007 IEEE/RSJ International Conference on Intelligent Robots and Systems, San Diego, CA, USA, pp. 1497-1502 (Oct. 29-Nov. 2, 2007).

* cited by examiner

FLEXIBLE ROBOTIC ACTUATORS

CROSS-REFERENCE TO RELATED APPLICATIONS

This application is a continuation application of the International Application No. PCT/US2013/032297, entitled "SYSTEMS AND METHODS FOR PROVIDING FLEXIBLE ROBOTIC ACTUATORS," filed on Mar. 15, 2013, which claims benefit of the earlier filing date of U.S. Provisional Patent Application No. 61/615,665, entitled "FLEXIBLE ROBOTIC ACTUATORS," filed on Mar. 26, 2012; of U.S. Provisional Patent Application No. 61/673,003, entitled "SYSTEMS AND METHODS FOR INTEGRATION OF SOFT ROBOTS AND HARD ROBOTS," filed on Jul. 18, 2012; and of U.S. Provisional Patent Application No. 61/698,436, entitled "SYSTEMS AND METHODS FOR PROVIDING SOFT TENTACLES," filed on Sep. 7, 2012. All patents, patent applications and publications cited herein are hereby incorporated by reference in their entireties in order to more fully describe the state of the art as known to those skilled therein as of the date of the invention described herein.

STATEMENT REGARDING FEDERALLY SPONSORED RESEARCH OR DEVELOPMENT

The present invention was made with United States government support under Grant No. W911NF-11-1-0094 and W911NF-09-1-0476 awarded by Defense Advanced Research Projects Agency (DARPA); under Grant No. DE-FG02-00ER45852 awarded by the Department of Energy; and under Grant Nos. DMR-1005022, PHY-0646094, and DMR-0820484 awarded by National Science Foundation (NSF). The United States government has certain rights in this invention.

BACKGROUND

Many approaches to robots that resemble animals with skeletons are being actively developed. Most of these robots are constructed using so-called "hard" body plans; that is, a rigid (usually metal) skeleton, electrical or hydraulic actuation, electromechanical control, sensing, and feedback. These robots are successful at the tasks for which they were designed (e.g., heavy manufacturing in controlled environments.) However, these robots have severe limitations when faced with more demanding tasks (for example, stable motility in demanding environments): tracks and wheels perform less well than legs and hooves in many circumstances.

Another class of robots—those based on animals without skeletons—are much less explored, for a number of reasons: i) there is a supposition that "marine-like" organisms (squid) will not operate without the buoyant support of water; ii) the materials and components necessary to make these systems are often not available; iii) the major types of actuation used in them (for example, hydrostats) are virtually unused in conventional robotics. These systems are intrinsically very different in their capabilities and potential uses than hard-bodied systems. While they will (at least early in their development) be slower than hard-bodied systems, they will also be more stable and better able to move through constrained spaces (cracks, rubble), lighter, and less expensive.

Robots, or robotic actuators, which can be described as "soft" are most easily classified by the materials used in their manufacture and their methods of actuation. The field of soft robotic actuation began with work by Kuhn et al in 1950. Their work focused on the reversible change in the coiling and uncoiling of a polymeric material dependent on the pH of the surrounding medium. They used this to successfully raise and lower a weight, thus showing proof of principle for the use of soft materials in robotic actuation. Hamlen et al expanded upon this idea in 1965 and showed that polymeric materials can be made to contract electrolytically. These two developments set the scene for future work using the swelling of polymeric gels and electronic control of dielectric-based actuators. Otake et al have demonstrated the use of electro-active polymers in the manufacture of starfish-shaped robotic actuators. Pneumatically-driven soft actuators based on pressurization of sealed chambers fabricated from extensible polymers were first reported by Suzumori et al in 1991. This type of actuation has been used on the millimeter scale to fabricate grippers, tentacles, and other related devices including pneumatic balloons.

Pneumatic soft robotic actuators can be manufactured using inextensible materials, which rely on architectures such as bellows. McKibben actuators, also known as pneumatic artificial muscles (PAMs), rely on the inflation of a bladder constrained within a woven sheath which is inextensible in the axis of actuation. The resultant deformation leads to radial expansion and axial contraction; the force that can be applied is proportional to the applied pressure. Related actuators are called pleated pneumatic artificial muscles.

There are "soft" robotic actuators such as shape memory alloys which have been used by Sugiyama et al both as the actuation method and as the main structural component in robots which can both crawl and jump. Another approach, which can be described as "soft" uses a combination of traditional robotic elements (an electric motor) and soft polymeric linkages based on Shape Deposition Manufacturing (SDM). This technique is a combination of 3D printing and milling. An example of a composite of traditional robotics with soft elements has been used with great success in developing robotic grippers comprising soft fingers to improve the speed and efficiency of soft fruit packing in New Zealand.

Additional capabilities for soft robotics are desired.

SUMMARY

Flexible robotic actuators and robotic systems formed using flexible robotic actuators are described. These and other aspects and embodiments of the disclosure are illustrated and described below.

Some embodiments include a soft robot. The soft robot can include a flexible body having a plurality of embedded fluid channels, where at least two of the plurality of embedded fluid channels are arranged concentrically around a central axis of the flexible body. The soft robot can also include a pressurizing inlet coupled to the at least two of the plurality of embedded fluid channels, where the pressurizing inlet is configured to receive pressurized fluid to inflate a portion of the at least two of the plurality of embedded fluid channels, thereby causing a radial deflection of the flexible body.

In any of the embodiments described herein, the soft robot can also include a soft chamber disposed above and in sealing contact with the flexible body, wherein the soft chamber comprises a fluid reservoir and a fluid inlet.

In any of the embodiments described herein, the soft chamber comprises a cap comprising a cover layer and one or more walls, wherein the one or more walls are attached to the flexible body, and a volume between the cap and the flexible body forms the fluid reservoir.

In any of the embodiments described herein, the fluid reservoir is configured to deliver fluid via the fluid inlet when the at least two of the plurality of embedded fluid channels are pressurized.

In any of the embodiments described herein, the fluid reservoir is configured to receive fluid via the fluid inlet when the at least two of the plurality of embedded fluid channels are depressurized.

In any of the embodiments described herein, the flexible body is molded using an elastomer.

In any of the embodiments described herein, the at least two of the plurality of embedded fluid channels are arranged as concentric polygons.

In any of the embodiments described herein, the concentric polygons comprise concentric circles.

In any of the embodiments described herein, the flexible body can include a strain limiting layer, where a tensile modulus of the strain limiting layer is higher than a tensile modulus of the flexible body.

In any of the embodiments described herein, the strain limiting layer comprises paper.

Some embodiments include a method of actuating a soft robot. The method can include providing a soft robot according to embodiments described herein, and providing pressurized fluid to the pressurizing inlet to pressurize the at least two of the plurality of embedded fluid channels, thereby causing a radial deflection of the soft robot.

Some embodiments include a method of actuating a soft robot. The method can include providing a soft robot according to embodiments described herein, providing fluid to the soft chamber via the fluid inlet, and providing pressurized fluid to the pressurizing inlet to pressurize the at least two of the plurality of embedded fluid channels, thereby expelling fluid housed within the soft chamber via the fluid inlet.

In any of the embodiments described herein, the method can further include removing the pressurized fluid from the pressurizing inlet to depressurize the at least two of the plurality of embedded fluid channels, thereby inhaling fluid into the soft chamber via the fluid inlet.

In any of the embodiments described herein, the soft chamber is configured to accommodate a chemical reagent capable of reaction with a reagent to generate a color.

Some embodiments include a method of gripping a non-porous surface. The method can include providing a soft robot according to embodiments described herein, positioning the soft robot against a non-porous surface, and providing pressurized fluid to the pressurizing inlet to pressurize the at least two of the plurality of embedded fluid channels, thereby collapsing the soft robot against the non-porous surface to form a suction seal.

Some embodiments include a soft robotic actuator. The soft robotic actuator can include a flexible molded body having a plurality of channels disposed within the molded body, where the plurality of channels is coaxial with a central axis of the flexible molded body, where a portion of the molded body comprises an elastically extensible material and a portion of the molded body is strain limiting relative to the elastically extensible material, and where the molded body is configured to preferentially expand when one of the plurality of channels is pressurized by pressurized fluid. The soft robotic actuator can also include at least one pressurizing inlet that is configured to receive pressurized fluid for at least one of the plurality of channels. The soft robotic actuator can further include a first transport channel configured to transfer a first material between one end of the flexible molded body and the other end of the flexible molded body, and a second transport channel configured to transfer a second material between one end of the flexible molded body and the other end of the flexible molded body.

In any of the embodiments described herein, the first transport channel is embedded in the strain limiting portion of the molded body, and the second transport channel is embedded in the elastically extensible portion of the flexible molded body.

In any of the embodiments described herein, the first material comprises solid particles and the second material comprises liquid.

In any of the embodiments described herein, the first material comprises solid particles and the second material comprises liquid.

In any of the embodiments described herein, the plurality of channels is sectioned along the central axis of the molded body to provide complex motions.

Some embodiments include a soft robotic system. The soft robotic system can include a plurality of flexible actuators configured to support the soft robotic system, where at least one of the flexible actuators comprises a fluidic channel that is configured to be pressurized to actuate the associated flexible actuator. The soft robotic system can also include a soft tentacle actuator comprising a flexible molded body having a plurality of channels disposed within the molded body, where the plurality of channels is coaxial with a central axis of the flexible molded body, where a portion of the molded body comprises an elastically extensible material and a portion of the molded body is strain limiting relative to the elastically extensible material, and where the molded body is configured to preferentially expand when one or more of the plurality of channels is pressurized by pressurized fluid. The soft robotic system can further include a camera module coupled to the flexible molded body, configured to capture an image of a scene surrounding the soft robotic system.

In any of the embodiments described herein, the plurality of flexible actuators is configured to be actuated in response to the image captured by the camera module.

In any of the embodiments described herein, the soft tentacle actuator and the plurality of flexible actuators are configured to be independently actuated.

Some embodiments include a robotic system. The robotic system can include a soft robot system comprising a flexible body having a plurality of embedded fluid channels, where the plurality of embedded fluid channels is defined by upper, lower and side walls, where at least one wall is strain limiting, where the soft robot further comprises a pressurizing inlet coupled to the plurality of embedded fluid channels, and where the pressurizing inlet is configured to receive pressurized fluid to pressurize at least a portion of the plurality of embedded fluid channels to cause a movement of the soft robot. The robotic system can also include a hard robot coupled to the soft robot, configured to provide locomotion to the robotic system. The robotic system can further include a robotic control system coupled to the soft robot and the hard robot, where the robotic control system comprises a fluidic system configured to provide the pressurized fluid to the fluid inlet.

In any of the embodiments described herein, the fluidic system includes a pump and a valve coupled to the pressurizing inlet of the soft robot system, configured to pressurize one or more of the plurality of fluid channels, and wherein the pump and the valve are configured to be controlled using an actuation sequence associated with the one or more of the plurality of fluid channels.

In any of the embodiments described herein, the actuation sequence indicates at least one of (a) closing the valve, (b) turning on the pump to pressurize the fluid channel, (c) turning off the pump while keeping the valve closed, and (d) opening the valve to deflate the fluid channel.

In any of the embodiments described herein, the soft robot system comprises the soft robot, the soft robotic actuator, or any other types of flexible robotic systems.

In any of the embodiments described herein, the soft robot system comprises a plurality of actuators, where in each of the plurality of actuators has a fluid inlet.

In any of the embodiments described herein, the fluidic system is configured to provide motion to the soft robot system by selectively actuating one or more of the actuators using an actuation sequence associated with the actuators.

In any of the embodiments described herein, the plurality of actuators in the soft robot are arranged to exhibit a rotational symmetry.

In any of the embodiments described herein, the robotic control system is configured to modify a motion direction of the soft robot system by modifying an association between the actuation sequence and the actuators.

In any of the embodiments described herein, the robotic system further includes a central control system coupled to the robot control system, the central control system is configured to instruct the robot control system to cause the hard robot to move in a predetermined manner.

In any of the embodiments described herein, the robotic system further includes a camera system coupled to the central control system, where the camera system is configured to record an image of an environment surrounding the hard robot, and where the central control system is configured to use the recorded image to identify obstacles surrounding the hard robot.

In any of the embodiments described herein, the soft robotic system is configured to be actuated in response to the image captured by the camera system.

In any of the embodiments described herein, the robotic system includes a robotic vacuum cleaner.

Some embodiments include a method of operating a robotic system. The method can include providing a robotic system as disclosed in any of the embodiments described herein, receiving, by a central control system from a camera system, an image of a scene surrounding the hard robot, identifying, by the central control system, an object to be grabbed by the soft robot system, and instructing, by the central control system, the robotic control system to cause the hard robot to move to a location proximate to the identified object and the soft robot system to grab the identified object.

In any of the embodiments described herein, the method can further include providing, by the robotic control system, an actuation sequence to the fluidic system to control the soft robot system.

In any of the embodiments described herein, the fluidic system comprises a pump and a valve, and wherein the method further comprises (a) closing the valve, (b) turning on the pump to pressurize the fluid channel, (c) turning off the pump while keeping the valve closed, and (d) opening the valve to deflate the fluidic channel.

BRIEF DESCRIPTION OF THE DRAWINGS

The invention is described with reference to the following figures, which are presented for the purpose of illustration only and are not intended to be limiting.

DETAILED DESCRIPTION

Figure 1:
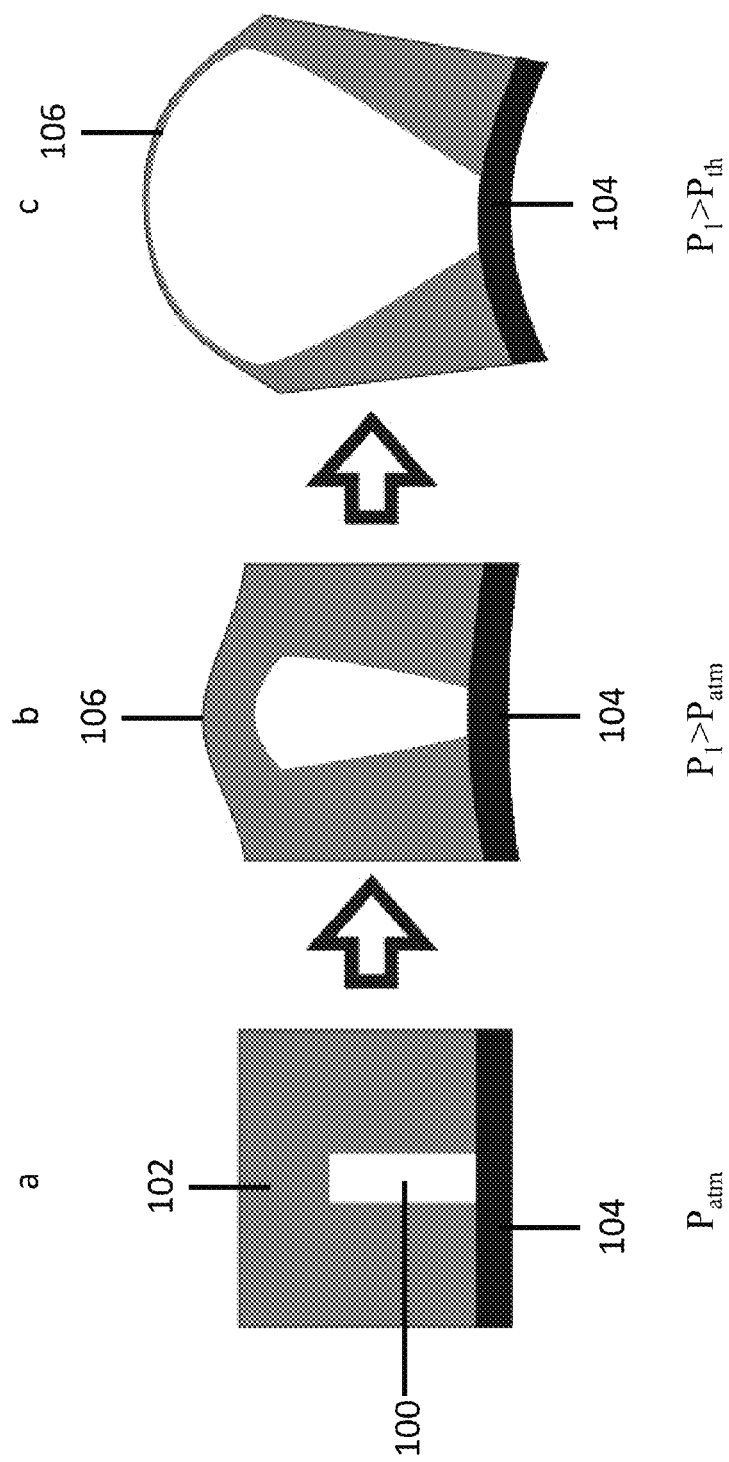
FIGS. 1a-1c illustrate principles of fluidic actuation of a soft robot in accordance with certain embodiment.

Organisms, such as Echinoderms (starfish, sea urchins) and Cnidarians (jellyfish) are ancient and incredibly successful, relatively simple organisms capable of movement unheard of in even the most advanced hard-robotic systems. One major reason for the gap between nature and the state of the art robotic systems is the severe limitation in material selection available for robotics.

To bridge this gap between natural and the state of the art robotic systems, robotic systems have exploited different materials. For example, a soft robotic system can use soft materials, such as soft elastomer, or flexible materials, such as papers and a nitrile, to build its structures, as disclosed in PCT Patent Application No. PCT/US2011/061720, titled "Soft robotic actuators," and PCT Patent Application No. PCT/US2013/022593, titled "Flexible robotic actuators," which are hereby incorporated by reference in its entirety.

Generally, "soft" robots—robots having flexible components that provide multiple degrees of freedom—have many useful capabilities. These capabilities include the abilities to deform their shape, to manipulate delicate objects, to conform to their surroundings, and to move in cluttered and/or unstructured environments. The flexibility of soft actuators can offer potentially useful approaches to problems in robotics, and to the design of actuators. They can also take advantage of often highly non-linear responses to actuation to accomplish, relatively simply, types of complex motions and tasks that are more difficult to accomplish using hard machines and conventional controllers. Soft robots based on flexible elastomers, as one simple example, can distribute pressure over large areas without elaborate controls; this capability makes it possible for them to manipulate fragile and irregular objects. In this type of design, the robot can perform complex motions only with a single pressure source; the appropriate distribution, configuration, and size of the pressurized networks, in combination with a sequence of actuation of specific network elements, can determine the resulting movement.

The present disclosure provides additional capabilities to soft robotic systems and provides mechanisms for integrating soft robotic systems with hard robotic systems. These additional capabilities and mechanisms can be employed alone, or in combination with other soft robotic actuators such as those referred to in the previous paragraph.

The disclosed subject matter includes a soft tentacle. The disclosed soft tentacle can provide a variety of motions. For example, the soft tentacle can provide a simple rolling motion. As another example, the soft tentacle can provide a complex three-dimensional motion based on an independent control of local curvatures along the tentacle. In some embodiments, these complex motions can be used to grab and manipulate objects with complex shapes and various surface characteristics, such as the surface resistance. In other embodiments, the soft tentacle can be employed in conjunction with other functional modules to provide additional capabilities. The functional modules can include a needle for delivering fluid, a camera modules for capturing images/videos, or a suction cup for lifting and moving objects. In other embodiments, the soft tentacles' surface can be textured to improve, for example, their adhesion to slippery surfaces.

The disclosed subject matter also includes a radial deflection actuator that is capable of out of plane deflection around a central point, e.g., movement from a planar configuration at a resting position to a convex or hemispherical position in an actuated position. Such a deflection is referred to herein as a "radial deflection." Radial deflections can be useful in soft robots because the radial deflection provides a suction mechanism. The suction mechanism can be used in many applications, including, as disclosed below, gripping of objects, reversible attachment of robots to surfaces, collection/delivery of fluids, and chemical sample collection for direct or down-stream chemical analysis.

The disclosed subject matter also includes a hybrid robotic system that integrates one or more multifunctional soft robots and hard robots. While soft robots can perform many types of complex motions, even the most sophisticated soft robots may be challenged by tasks that hard robots can easily address. The hybrid robotic system can operate the soft robot and the hard robot to retain desirable features of both robots. For example, the robotic system can use the hard robot to move across a long distance on a flat terrain, and the robotic system can use a soft robot to perform tasks within a smaller region with a rugged surface.

Actuation Principles of Soft Robots

In some embodiments, a soft robot actuator can be actuated using pressurized fluid (i.e., pressurized gas or liquid.) The principle of fluidic actuation is illustrated in FIG. 1, in which channel 100 is embedded in a soft rubber (elastomeric) form 102 having a stiffer, yet still pliable backing layer 104. A material with a high elastic modulus is sought for materials used for sections of the network where inflation is undesirable, while a material with a low elastic modulus is used for materials of the network where extensibility is needed. Upon pressurization of the channel via pressurized fluid (e.g., pressurized gas and/or liquid), the soft-elastomer network expands (FIG. 1B). Specifically, when pressurized, channel will expand in the region 106 that is the most extensible. To accommodate the increased volume that results when the channel expands like balloons, the structure bends in response. The soft-rubber's expansion is accommodated by bending around the stiffer, strain limiting layer (FIG. 1C). Further detail regarding the actuating principle of channels or chambers embedded in elastomeric bodies, is described in "Soft robotic actuators," filed on Nov. 21, 2011, identified as PCT Application No. PCT/US2011/061720, which is herein incorporated by reference in its entirety.

As used herein, "stiffness" refers to the resistance of the elastic body to deformation (e.g., extension) by an applied force. In general, elastic modulus is related to, but not the same as, stiffness. Elastic modulus is a property of the constituent material; stiffness is a property of a structure. That is, the elastic modulus is an intensive property of the material; stiffness, on the other hand, is an extensive property of the network and is dependent on the material modulus and the shape and boundary conditions. Because stiffness is a function of the Young's modulus, the material modulus can be used as a comparative measure of the relative stiffness of the channels walls and a predictor of deflection upon pressurization of the channel networks.

Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience strain or deformation first. As a result, the strain in the material of higher stiffness or greater elastic modulus is smaller or "limited." As used herein, the layer or wall of the channel that is stiffer, e.g., has a higher elastic modulus, is referred herein to the "strain limiting" layer or wall or membrane.

Soft Tentacle Actuators

A soft tentacle actuator can have at least four characteristics that make it especially suited for soft robotic applications: i) the disclosed soft tentacle is light, with a mass of 100 grams per meter; ii) the disclosed soft tentacle is compatible with high-speed actuation (e.g., complete activation in ~0.5 second using gas at 300 millibar, delivered through a 25-cm long tether with an internal diameter of 1.57 mm); iii) the disclosed soft tentacle is resistant to damage from impact and fall; and iv) the disclosed soft tentacle is compatible with the introduction of components with specialized optical, electrical, or mechanical functions, and with the modification of its surface to improve its interaction with objects.

Structure and Characteristics of Soft Tentacle Actuator

FIGS. 2a-e illustrate a soft tentacle and its operation in accordance with some embodiments of the disclosed subject matter. FIG. 2a shows a soft tentacle 202, fluidic channels 204 in the soft tentacle, and the gas inlets 206 coupled to the fluidic channels 204. In some embodiments, the fluidic channels 204 can be coaxial with the soft tentacle, and run along the length of the soft tentacle. The total length of the tentacle illustrated in FIG. 2a is about 15 cm. The length of the fluidic channels can be 14 cm, starting at a position separated from the root of the tentacle by 5 mm. However, the length of the tentacle and the length of the fluidic channels can be of any desired length.

In some embodiments, the soft tentacle 202 can include a core structure 208 and a skin structure. The core structure 208 can be strain limiting relative to the skin structure. In other words, the core structure 208 can be formed using a stiffer material than that of the skin structure. As illustrated in FIG. 2a, the core structure 208 can be formed using polydimethylsiloxane (PDMS) and the skin structure can be formed using Ecoflex. The core structure 208 can have any suitable shapes. For example, the core structure 208 can have a cylindrical shape, a cuboid shape, a triangular prism shape, a hexagonal prism shape, or any other polygonal prism shapes that are suitable for desired applications.

The soft tentacle 202 can be actuated by fluidic pressure applied to the fluidic channels 204 via the gas inlets 206. The gas inlets 206 include three nozzles, each of which can be coupled to one of the fluidic channels 204. In some embodiments, each nozzle can be coupled to an independent pressure source, which can allow for an independent actuation of the fluidic channels 204. In other embodiments, each nozzle can be coupled to the same pressure source, which allows for a simultaneous actuation of the fluidic channels 204.

FIG. 2b illustrates a structural deformation and a stress distribution in a fluidic channel upon pressurization, in accordance with some embodiments of the disclosed subject matter. Upon pressurization, a fluidic channel 204 can expand in regions that are most compliant, or regions fabricated using a material with a lower stiffness compared to neighboring regions (i.e., the regions fabricated in Ecoflex). For example, an expansion of the fluidic channel 204 can thin the Ecoflex skin structure that is not in contact with the PDMS core structure.

As the applied pressure is increased, from $P_{atm}$ to $P_{III}$, the Ecoflex skin structure can become thinner. In FIG. 2b, $P_I$ corresponds to 75 millibar (mbar), $P_{II}$ corresponds to 149 mbar, and $P_{III}$ corresponds to 231 mbar. The thinning of the skin structure can be accompanied by an asymmetric elongation of the two opposite walls of the fluidic channels 204. When the applied pressure is sufficiently high (e.g., around 230 millibar), the Ecoflex skin structure in the vicinity of the fluidic channels 204 can undergo a snap-through instability and deform dramatically. This deformation can trigger the soft tentacle 202 to bend. The extent to which the tentacle bends can be controlled by controlling the pressure applied to the fluidic channels 204. FIG. 2c illustrates the bending of the soft tentacle in accordance with some embodiments of the disclosed subject matter. As the amount of pressure applied to the fluidic channel increases, the extent to which the tentacle bends can also increase correspondingly.

In some embodiments, upon pressurization, the soft tentacle 202 can start bending at the tail-end of the tentacle. In many cases, the force to initiate the deformation at the tail end is smaller than the force to initiate the deformation at the center of the tentacle. Therefore, as illustrated in FIG. 2c, as the pressure applied to the fluidic channel 204 increases, the bending of the soft tentacle 202 would start at the tail-end of the tentacle. This structure-selective, regional actuation is one of the many useful non-linearities for generating complex motions.

Once the tail-end of the soft tentacle 202 reaches the snap-through instability, the deformation at the end of the fluidic channels 204 can reach a saturation point. Upon reaching the saturation point, the bending motion can propagate towards the root of the tentacle, which can trigger the tentacle to bend in a circular pattern (multiple times, if it is sufficiently long), as illustrated in FIG. 2c.

The dependency of the tentacle's curvature and the pressure applied to the fluidic channel can be characterized a numerical simulation. Although an analytical description of expanding thin-walled balloons is well developed, an analytical description of a composite structure, such as the soft tentacle, is not yet available. To address this issue, characteristics of an expanding fluidic channel can be simulated using finite element analysis.

Figure 3:
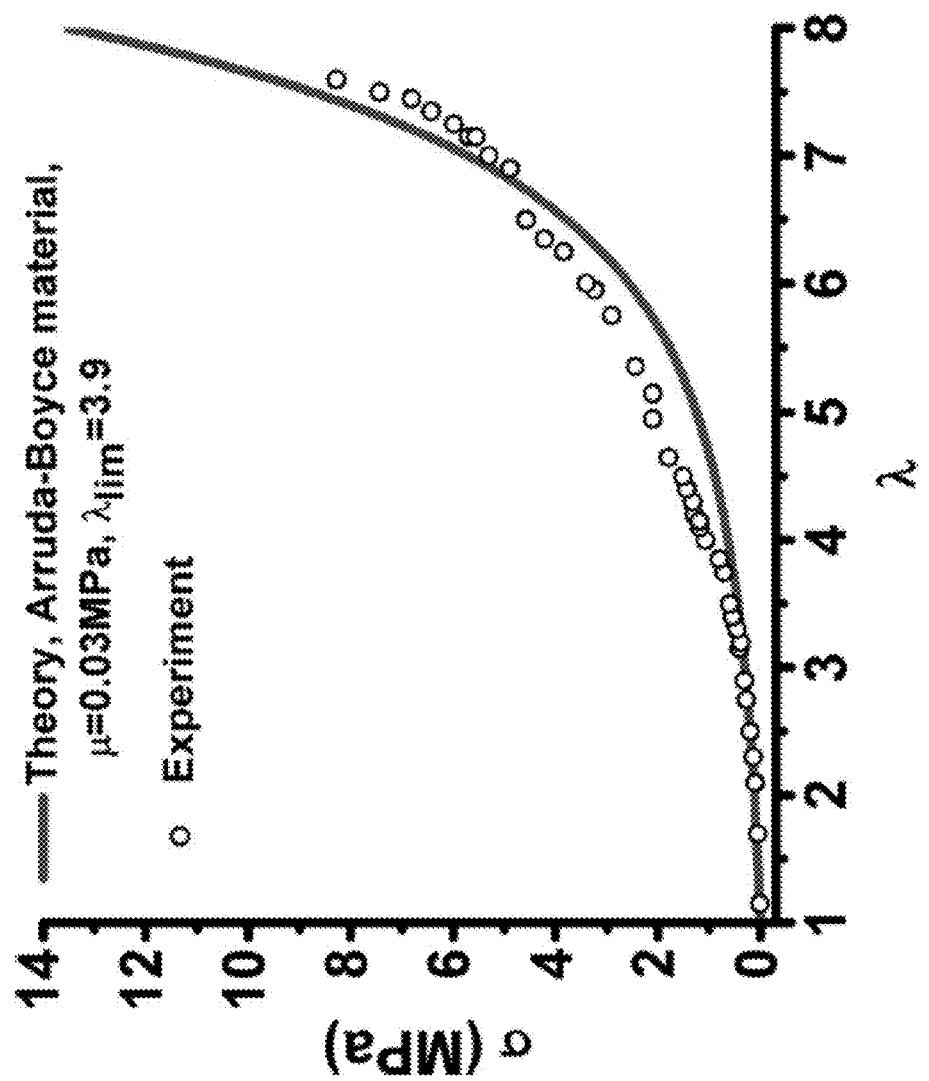
FIG. 3 illustrates a relationship between stress and strain for Ecoflex in accordance with some embodiments of the disclosed subject matter.

The finite element analysis can include building a three-dimensional model of an expanding fluidic channel using a finite element software. The finite element software can include ABAQUS of Dassault Systemes. The three-dimensional model of an expanding fluidic channel can include a model of a snap-through instability. The model of a snap-through instability can include the Riks method. The Riks method can include modeling the materials used to build the fluidic channel. To this end, the disclosed finite element analysis models the PDMS as an incompressible Neo-Hookean material with shear modulus G=1.84 MPa; Ecoflex can be modeled as an Arruda-Boyce material, i.e., a rubber material that stiffens at a high strain in order to capture the snap-through instability. FIG. 3 illustrates the relationship between stress and strain for Ecoflex under a uni-axial tension, in accordance with some embodiments of the disclosed subject matter. The experimental relationship between stress and strain of Ecoflex is fitted as an incompressible Arruda-Boyce material with shear modulus G=0.03 MPa and $\lambda_{lim}$=3.9.

The model illustrated in the previous paragraph can be used to simulate the dependency between the tentacle's curvature and the pressure applied to the fluidic channel. FIG. 2d illustrates the simulated dependency between the tentacle's curvature and the pressure applied to the fluidic channel, and FIG. 2e illustrates the experimental dependency between the tentacle's curvature and the pressure applied to the fluidic channel. As illustrated by FIGS. 2d-2e, the simulated dependency closely tracks the experimental dependency, thereby confirming the accuracy of the finite element analysis.

Figure 4:
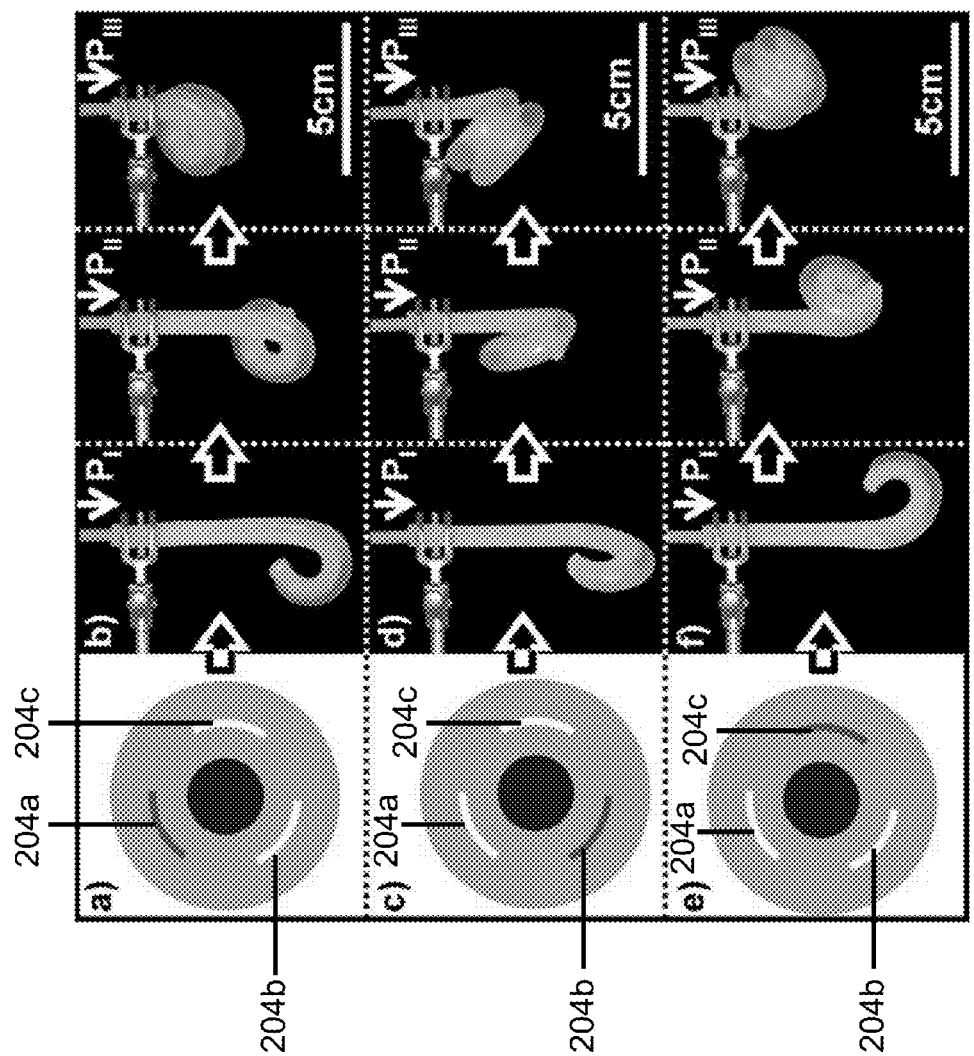
FIGS. 4a-4f illustrate a control of a soft tentacle's bending direction in accordance with some embodiments of the disclosed subject matter.

In some embodiments, the bending direction of the tentacle can be controlled by controlling the pressure level of individual fluidic channels 204. FIGS. 4a-4f illustrate how a bending direction of the soft tentacle can change as a function of the pressure level of fluidic channels, in accordance with some embodiments of the disclosed subject matter. Each row of FIG. 4 illustrates the bending direction of the tentacle when different one of the fluidic channels is pressurized. For example, FIG. 4b illustrates the bending of the tentacle when the fluidic channel 204a is pressurized; FIG. 4d illustrates the bending of the tentacle when the fluidic channel 204b is pressurized; and FIG. 4f illustrates the bending of the tentacle when the fluidic channel 204c is pressurized. Each column of FIGS. 4b, 4d, and 4f shows the extent to which the tentacle bends as the applied pressure is increased. In FIGS. 4b, 4d, and 4f, $P_I$ corresponds to 75 mbar, $P_{II}$ corresponds to 130 mbar, and $P_{III}$ corresponds to 270 mbar. Collectively, FIGS. 4a-4f illustrate that the bending direction of the tentacle depends on the pressure level of the individual fluidic channels.

Fabrication

In some embodiments, the soft tentacle 202 can be fabricated using a mold. The mold can be designed using a computer-aided design (CAD) tool, for example, from Alibre Inc. The designed mold can be generated using a three-dimensional (3D) printer, for example, StrataSys Dimension Elite printers. The mold can be printed with an acrylonitrile butadiene styrene (ABS) plastic.

Figure 5:
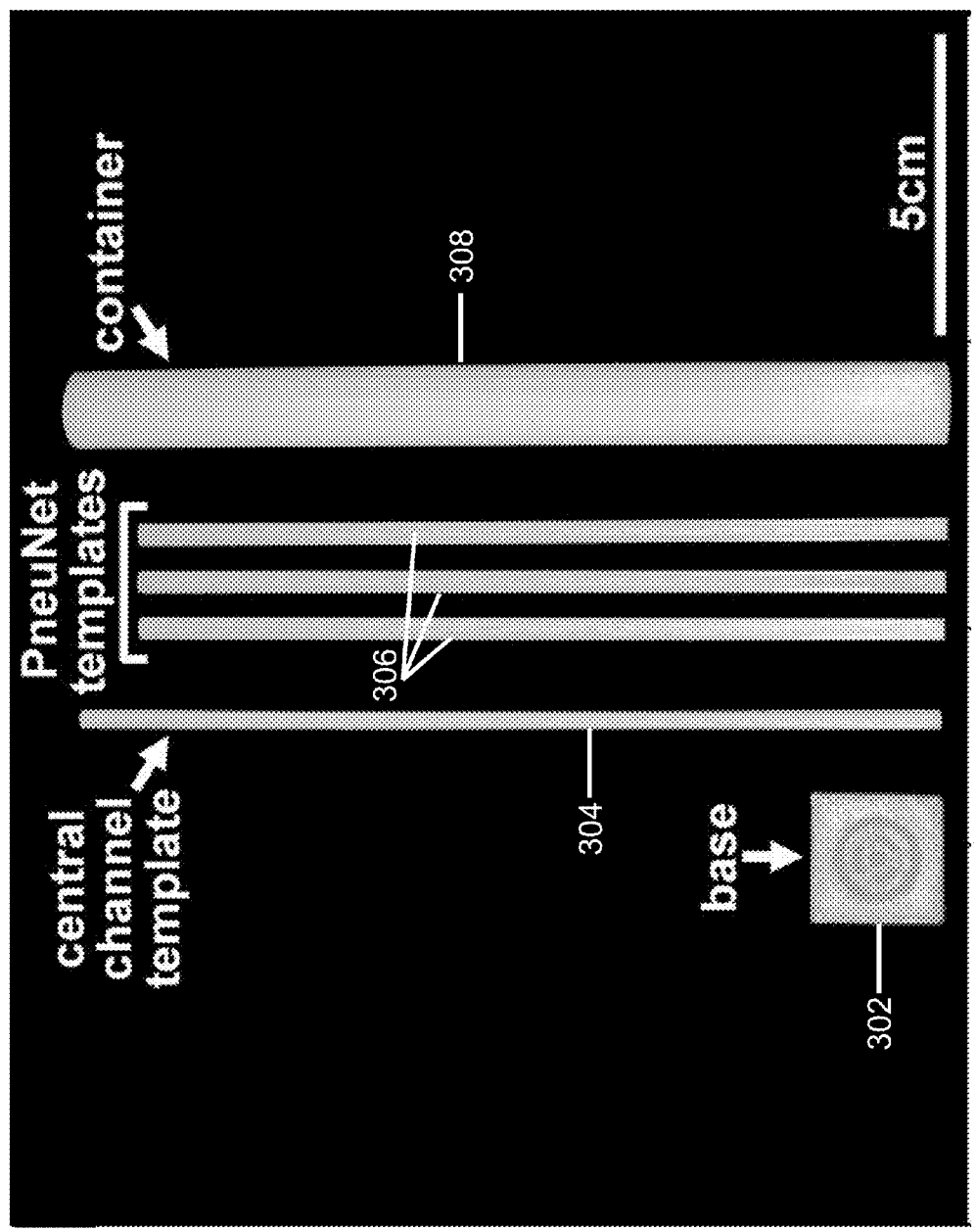
FIG. 5 illustrates individual parts of a mold in accordance with some embodiments of the disclosed subject matter.
Figure 6:
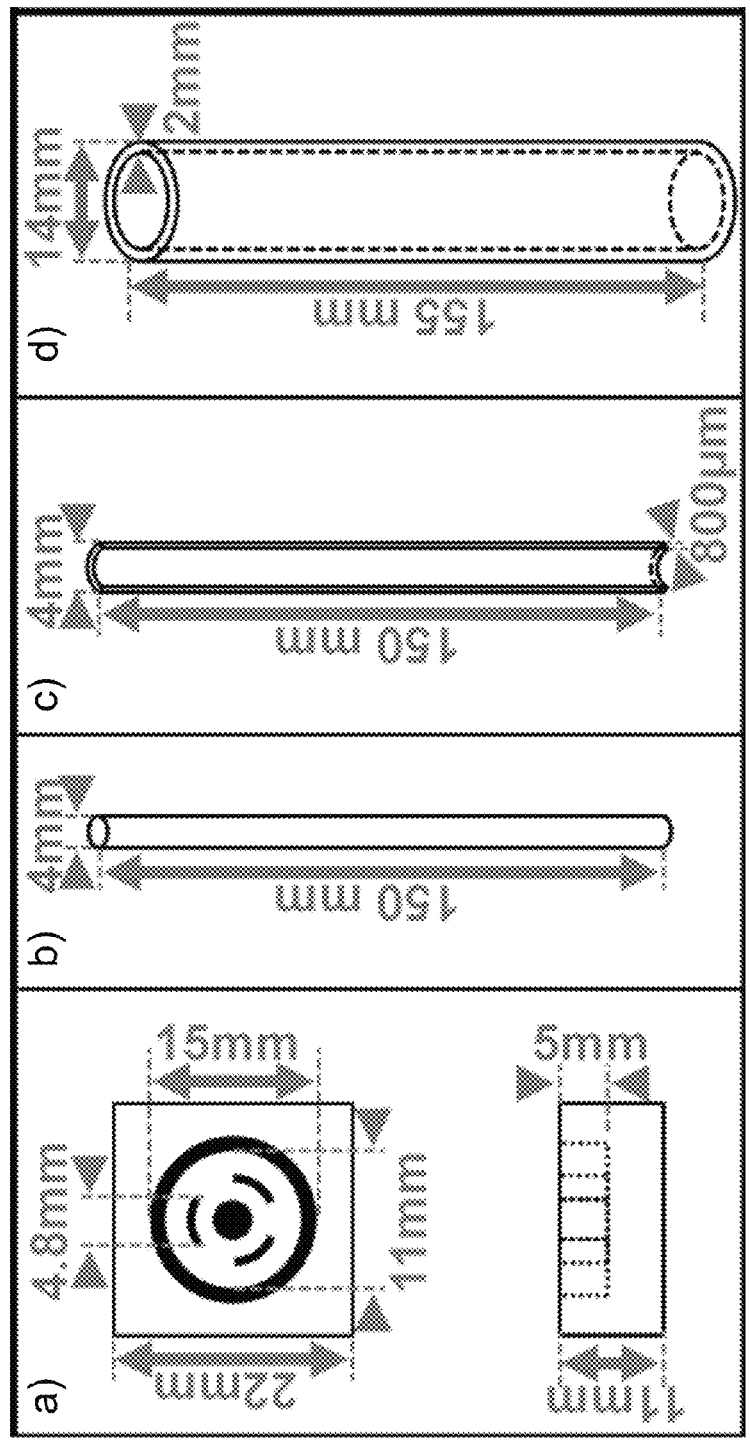
FIGS. 6a-6d illustrate the size of individual parts of a mold in accordance with some embodiments of the disclosed subject matter.

In some embodiments, the mold can be built as individual pieces that can be later assembled to form the mold. FIG. 5 illustrates individual parts of a mold in accordance with some embodiments of the disclosed subject matter. A mold can include a mold base 302, a core structure template 304, fluidic channel templates 306, and a container 308. The parts illustrated in FIG. 5 are built in an acrylonitrile butadiene styrene (ABS) plastic using a three-dimensional printer. FIGS. 6a-6d illustrate the size of individual parts of a mold in accordance with some embodiments of the disclosed subject matter. FIG. 6a illustrates the dimensions of the mold base; FIG. 6b illustrates the dimensions of the core structure template; FIG. 6c illustrates the dimensions of the fluidic channel template; and FIG. 6d illustrates the dimension of the container used to contain the elastomers during the molding process. The shape of the container determines the external shape of the fabricated tentacle. As illustrated in FIG. 6d, the container can have a cylindrical shape. The container can have a variety of other shapes, including a cuboid shape, a triangular prism shape, a hexagonal prism shape, or any other polygonal prism shapes that are suitable for desired applications. The dimensions illustrated in FIGS. 6a-6d are for illustrative purposes only. The individual parts of the mold can be formed in various sizes and lengths that are suitable for particular applications of a soft tentacle.

Figure 7:
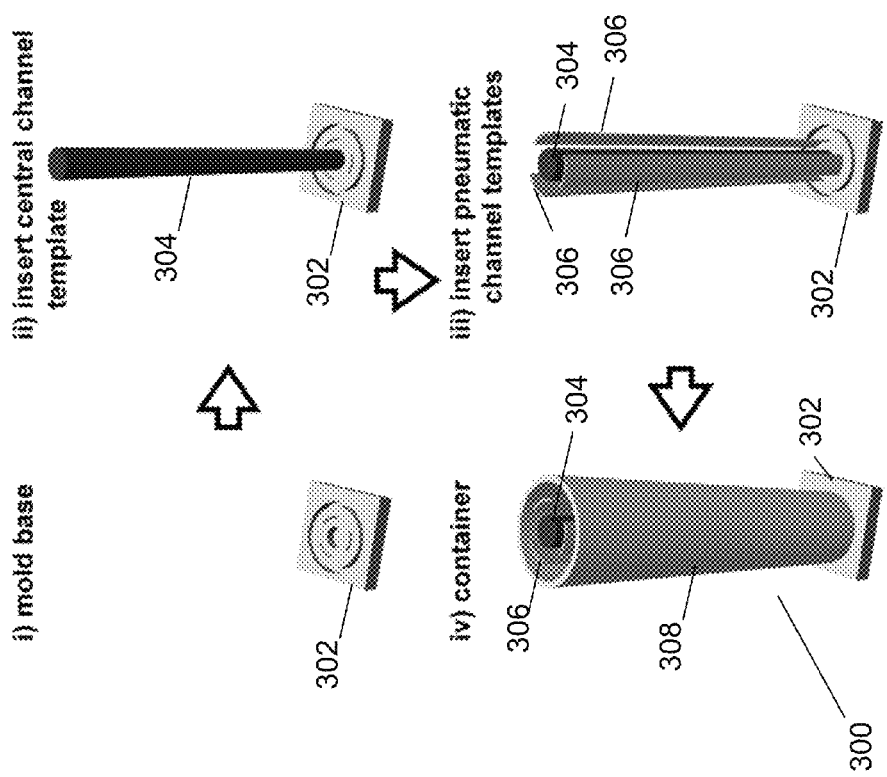
FIG. 7 illustrates a process of assembling a mold for a soft tentacle in accordance with some embodiments of the disclosed subject matter.

FIG. 7 illustrates the process of assembling a mold 300 from the individual parts in accordance with some embodiments of the disclosed subject matter. In step i), a mold base 302 can be provided. In step 2, a core structure template 304 can be affixed on the mold base 302. In step iii), fluidic channel templates 306 can be affixed on the mold base 302, and in step iv), a container can be affixed on the mold base 302.

Figure 8:
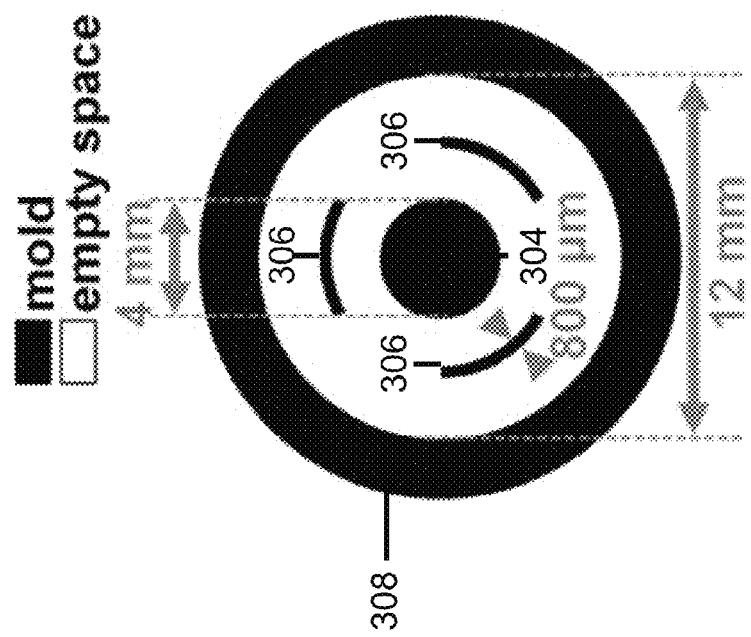
FIG. 8 illustrates a cross section of a mold for a soft tentacle in accordance with some embodiments of the disclosed subject matter.

FIG. 8 illustrates a cross section of the assembled mold in accordance with some embodiments of the disclosed subject matter. The core structure template 304 and the fluidic channel templates 306 can occupy the volume for the core structure 208 and the fluidic channels 204 for a soft tentacle. In some embodiments, the core structure template 304 can be substantially thicker than the fluidic channel templates 306. For example, the core structure template can have a thickness of 4 mm and the fluidic channel templates can have a thickness of 800 nm. The internal diameter of the mold can control the thickness of the fabricated soft tentacle. The internal diameter of the mold 300 can be 12 mm.

In some embodiments, the number of fluidic channels in the soft tentacles can be controlled by controlling the number of fluidic channel templates in the mold. In some embodiments, the mold can include 2, 4, 5, 6, or and other number of fluidic channel templates to form the corresponding number of fluidic channels in a soft tentacle. In some embodiments, the mold templates can be symmetrically arranged around the rotation axis so that the tentacle can be uniformly actuated upon pressurization. In some cases, the rotation axis of the tentacle can be characterized as a straight line around which all fixed points of a rotating tentacle move in circles. For example, if a tentacle has a cylindrical shape, the rotation axis of the tentacle can be a set of points corresponding to the center of the tentacle's cross sections.

Figure 9:
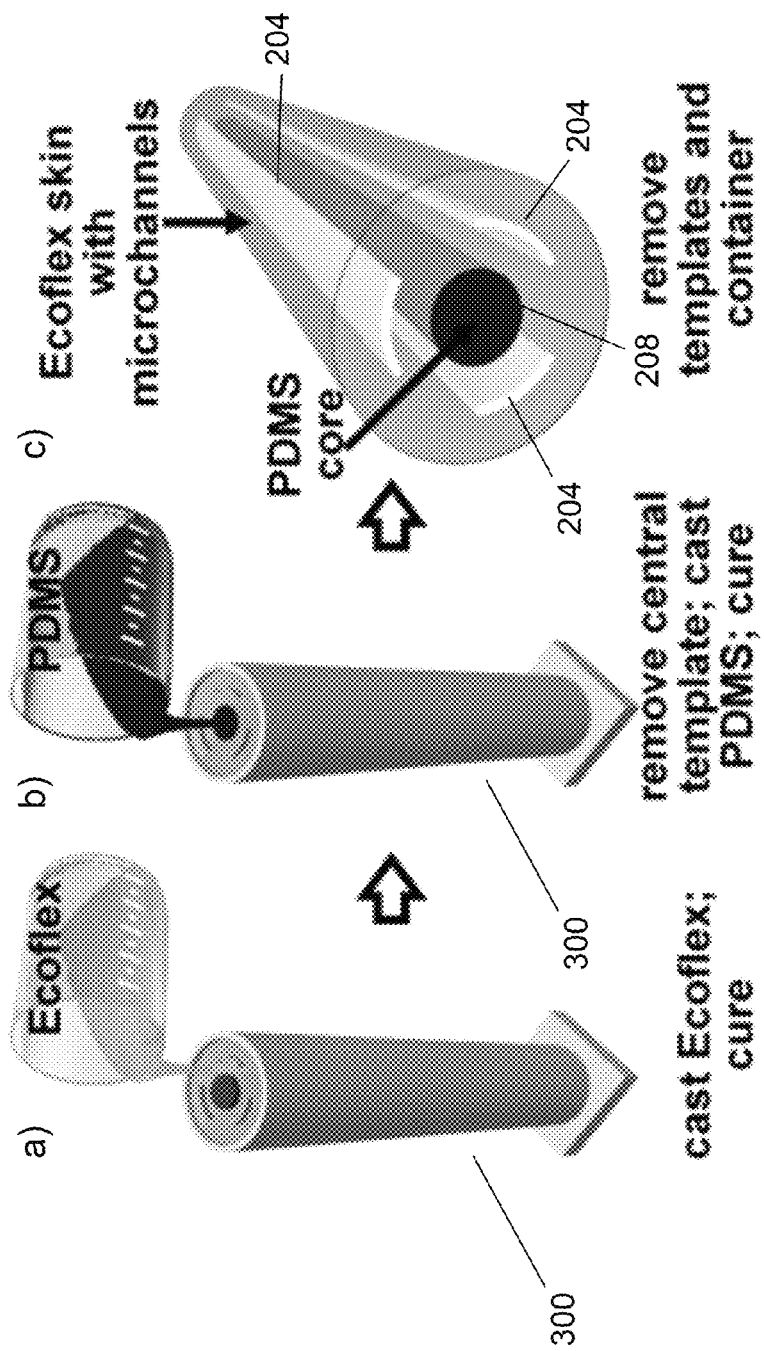
FIGS. 9a-9c illustrate the process of fabricating a soft tentacle using a mold in accordance with some embodiments of the disclosed subject matter.

FIGS. 9a-9c illustrate the process of fabricating a soft tentacle using a mold in accordance with some embodiments of the disclosed subject matter. The soft tentacle can be built using soft materials such as elastomers. The elastomers can include Ecoflex and polydimethylsiloxane (PDMS). Ecoflex can be prepared using the following procedure. Ecoflex precursor, such as Ecoflex 00-30 precursor, can be obtained from Smooth-On (http://www. smooth-on.com). The obtained Ecoflex precursor can be mixed in a 1:1 ratio by volume and the resulting prepolymer can be degassed in a desiccator at 36 Torr for 5 minutes in order to remove air bubbles. Subsequently, the Ecoflex can be cured at 60° C. for about 15 to 30 minutes. PDMS can be prepared using the following procedure. PDMS precursors can be obtained from Dow Corning. The PDMS precursors can be mixed with a cross-linking agent at the ratio of 10:1 by weight. The resulting prepolymer mixture can be degassed at 36 Torr for 30 minutes to remove any air bubbles and to ensure that the precursors and the cross-linking agent are mixed well. The prepolymer mixture can be cured at 60° C. for 2 hours. This curing time can assure a good bond between the resulting PDMS and Ecoflex when PDMS is cured in contact with Ecoflex.

Once Ecoflex and PDMS have been prepared, the soft tentacle can be fabricated using the process illustrated as follows. The first step includes, as illustrated in FIG. 9a, filling the mold 300 with Ecoflex and curing the Ecoflex at 60° C. for 15 minutes. The second step includes cooling the Ecoflex to a room temperature and removing the central channel template, thereby forming an empty volume at the core of the Ecoflex. The third step, as illustrated in FIG. 9b, can include pouring PDMS into the empty volume and curing the PDMS at 60° C. for two hours so that PDMS and Ecoflex can bond together. The fourth step includes removing the composite structure from the mold by gently pulling the composite structure. FIG. 9c illustrates the resulting composite structure. The resulting composite structure has fluidic channels parallel to the central PDMS core structure 208. The last step of fabrication includes sealing the two ends of the composite structure to form a soft tentacle. In some cases, sealing the two ends of the composite structure can include sealing the two ends using Ecoflex prepolymer. Sealing the two ends using Ecoflex prepolymer can include curing the Ecoflex prepolymer at 60° C. for 15 minutes.

The illustrated molding process permits fabrication of devices having an overall thickness greater than 1 mm and typically having a thickness in the range of 5 mm to 5 cm. Exemplary thicknesses include 2-4 mm, 5 mm, 1 cm, 2 cm, or 5 cm. The relatively large scale of the pressurizable networks (compared to features obtainable, for example, by conventional photolithographic techniques) result in the fabrication of functional devices on a large scale. Embedded channel networks in soft robotics are not limited to large scale and it is contemplated that conventional microfabrication techniques can be used to develop soft robotics on the sub-millimeter scale.

Figure 10:
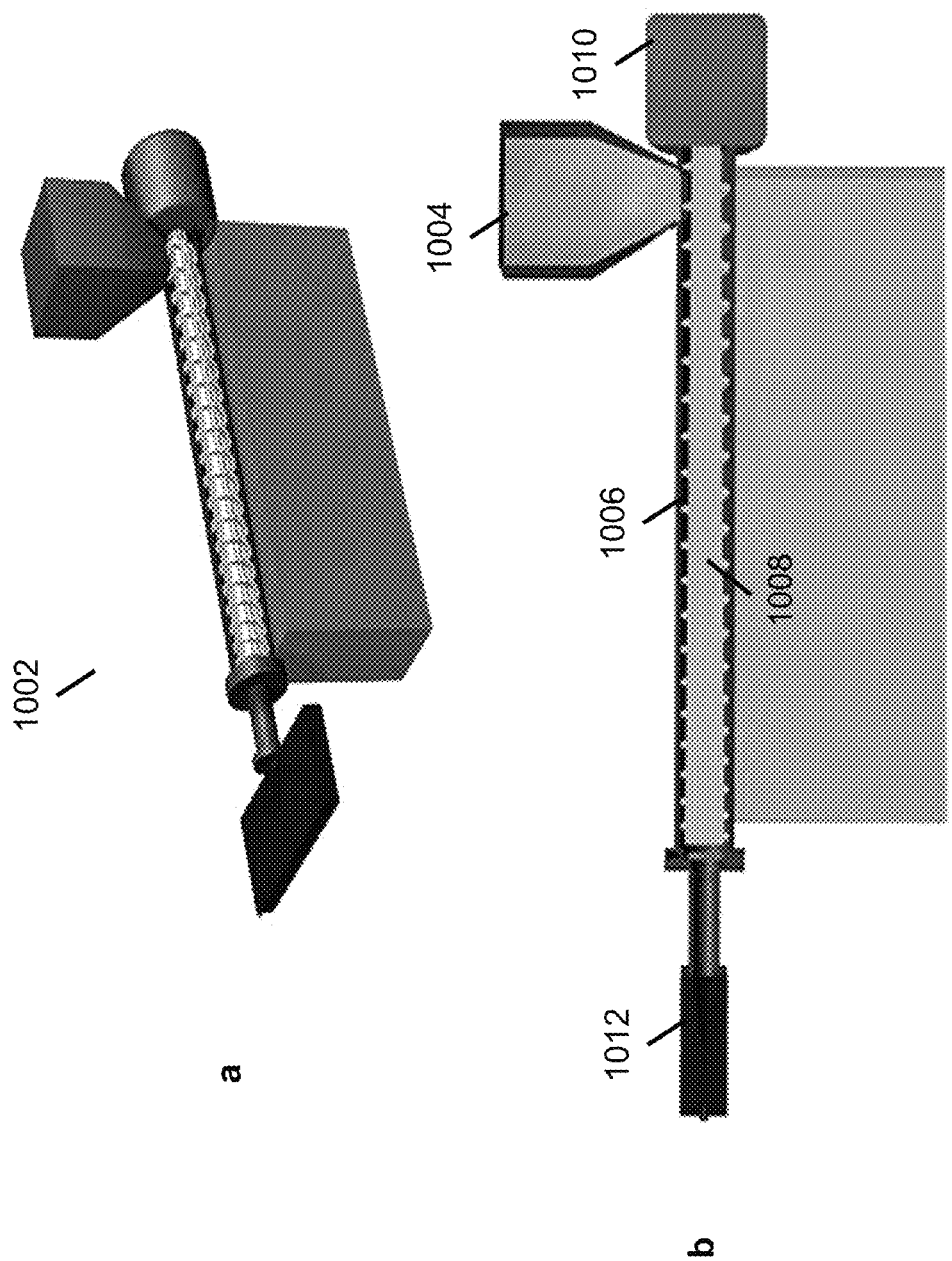
FIGS. 10a-10b illustrate a process of fabricating a soft tentacle using a plastic extrusion technique in accordance with some embodiments of the disclosed subject matter.

In some embodiments, a soft tentacle can be fabricated using a plastic extrusion technique. FIGS. 10a-10b illustrate a process of fabricating a soft tentacle using a plastic extrusion technique in accordance with some embodiments of the disclosed subject matter. FIG. 10a illustrates a plastic extrusion machine 1002, and FIG. 10b illustrates a cross section of the plastic extrusion machine 1002. A plastic extrusion machine 1002 can transform a polymer into a solid structure. This process can include (1) providing a polymer in liquid or viscous form to the hopper 1004, (2) pushing the liquid/viscous polymer through a tube 1006 along the space between the tube 1006 and the central screw 1008 using a screw driver motor 1010, (3) curing the polymer until the polymer is "about to become" solid, and (4) providing the polymer to a die 1012 having a desired shape in which the polymer is completely cured and takes the desired shape. The die 1012 can have a negative imprint of the desired tentacle structure. For example, the die 1012 can take the shape of the mold in FIG. 7. In some cases, the curing step can include one or more of: lowering the temperature of the polymer, applying heat to the polymer selectively, mixing the polymer with curing agents, exposing the polymer to oxygen and/or other gases, exposing the polymer to a ultra-violet radiation, and exposing the polymer to catalysts. The polymer can include prepolymer, polyacrylates, polyurethane, resin, gum, and/or rubber.

Figure 11:
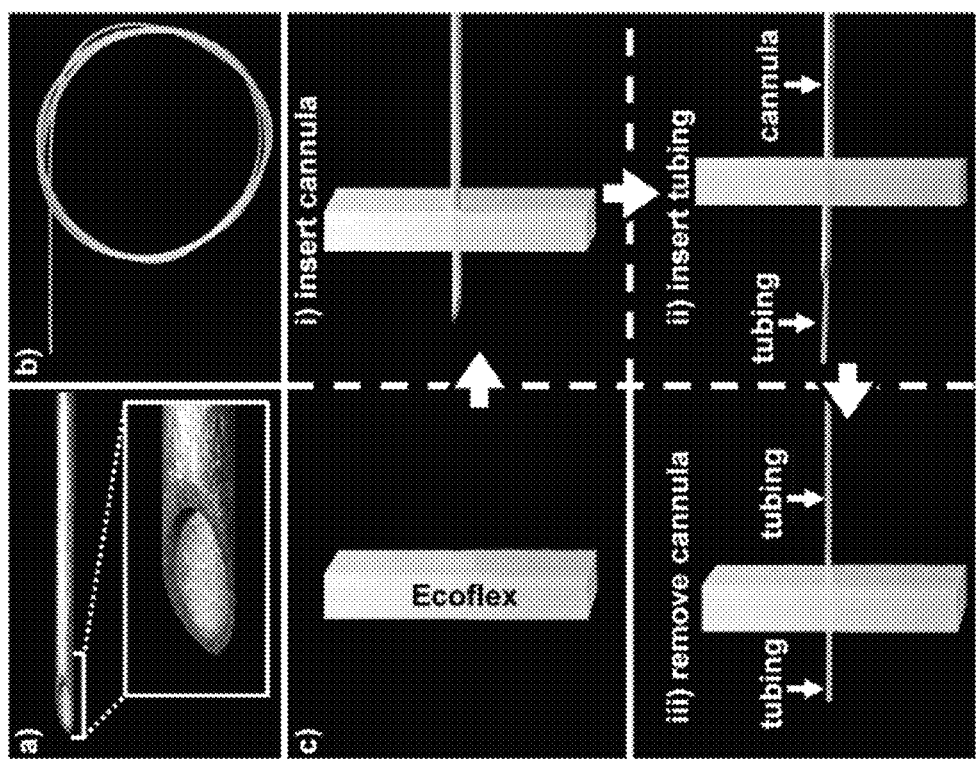
FIGS. 11a-11c illustrate the process of inserting a tubing into an elastomeric wall in accordance with some embodiments of the disclosed subject matter.

In some embodiments, fluidic channels 204 can be pressurized via gas inlets 206. The gas inlets 206 can be coupled to the fluidic channels 204 via a tubing. In some embodiments, the tubing can be formed using polyethylene. To couple the tubing with the fluidic channels 204, the tubing can be inserted into the elastomeric wall of a soft tentacle. FIGS. 11a-11c illustrate the process of inserting a tubing into an elastomeric wall in accordance with some embodiments of the disclosed subject matter. As illustrated in FIGS. 11a and 11b, a cannula and a tubing can be provided. The internal diameter of the cannula can be greater than the external diameter of the tubing so that the tubing can fit within the cannula. In some embodiments, the internal diameter of the cannula is 1.65 mm, and the external diameter of the tubing is 1.62 mm, but any other sizes of cannula and/or tubing can be used. As illustrated in FIG. 11c, inserting a tubing into an elastomeric wall can include inserting a cannula into the elastomeric wall, inserting a tubing into the cannula so that the tubing can pass through the elastomeric wall, and then removing the cannula. Because the elastomeric wall is soft, the elastomeric wall can wrap around the tubing to form an air-tight seal.

Figure 12:
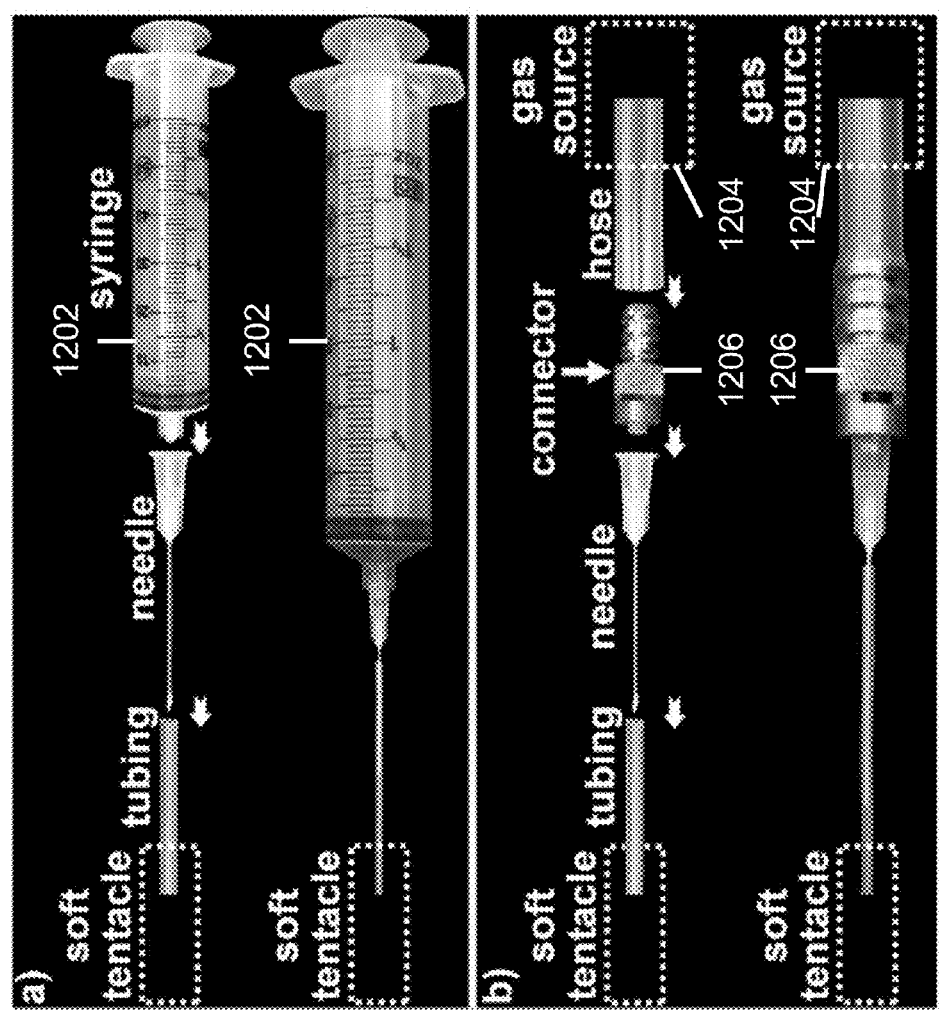
FIGS. 12a-12b illustrate structures for coupling a pressurized gas source to a gas inlet in accordance with some embodiments of the disclosed subject matter.

In some embodiments, the gas inlets 206 can be formed using a needle. The needle can be tightly coupled to the tubing to provide pressurized gas to the fluidic channels 204. FIGS. 12a-12b illustrate structures for coupling a pressurized gas source to a gas inlet in accordance with some embodiments of the disclosed subject matter. In some cases, the pressurized gas can be provided by a syringe 1202, as illustrated in FIG. 12a in accordance with some embodiments of the disclosed subject matter. The needle can simply be coupled to the syringe 1202 to receive pressurized gas. In other cases, the pressurized gas can be provided by a gas source 1204, as illustrated in FIG. 12b in accordance with some embodiments of the disclosed subject matter. The needle can be coupled to a connector 1206, which is further coupled to a hose that can receive pressurized gas from the gas source 1204.

In some embodiments, the core structure 208 can include tethers for functional modules coupled to the soft tentacle. As illustrated below, the soft tentacle can be coupled to other functional modules, including a suction module, a camera, and medical apparatuses. The core structure 208 can be used to embed the tethers for coupling the functional modules to the soft tentacle and/or external devices, such as computers.

The tethers can include a power line for delivering power to the functional modules, or fluidic channels for controlling the functional modules.

Applications

A soft tentacle can be used in a variety of applications. Oftentimes, the soft tentacle can interact with other objects by contacting the objects with the tentacle's skin. For example, the soft tentacle can be used to grab objects by wrapping the tentacle around the object of interest and lifting the tentacle.

Figure 13:
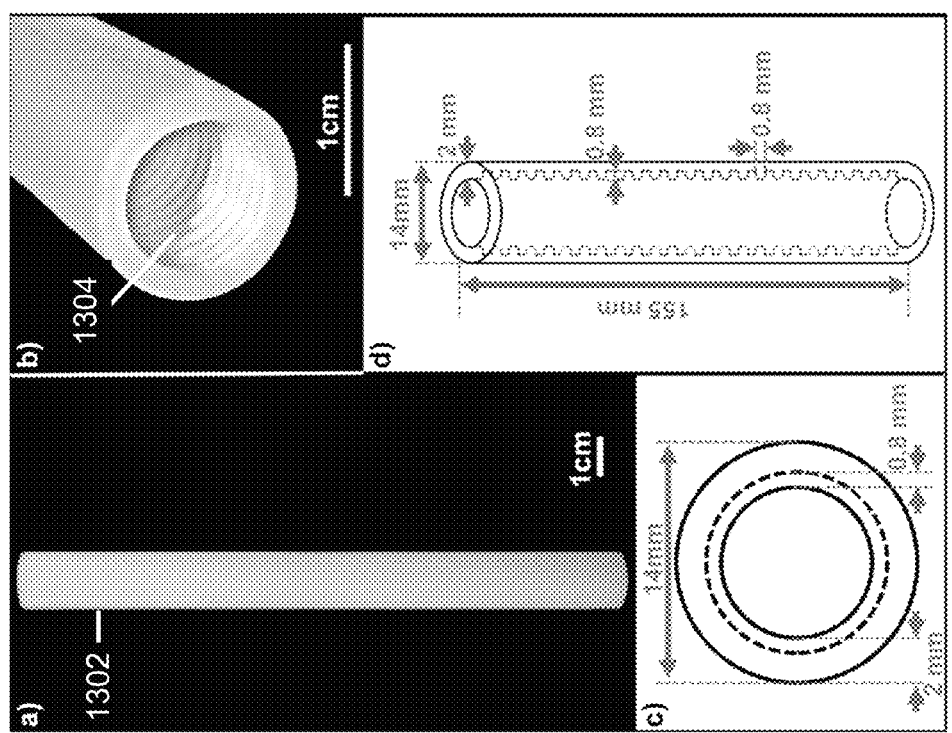
FIGS. 13a-13d illustrate a container with a textured internal surface in accordance with some embodiments of the disclosed subject matter.

In some embodiments, a soft tentacle's skin structure can be tailored to a certain application to enhance the tentacle's interaction with other objects. For example, when a soft tentacle is to be used for grabbing smooth or slippery objects, the surface of the tentacle can be textured to improve the grip. In some cases, the surface of the tentacle can be manipulated by modifying the mold used to fabricate the tentacle. FIGS. 13a-13d illustrate a container with a textured internal surface for fabricating a tentacle with a bellows skin structure in accordance with some embodiments of the disclosed subject matter. The tentacle with a bellows skin structure can be more compliant than a flat surface of the same material, and can also provide more traction. FIG. 13a illustrates an external view of the container 1302, which may not exhibit any differences from a container without a textured internal surface. FIG. 13b illustrates the internal surface of the container 1302. The internal surface can have the bellows structure 1304 that would form the bellows structure on the surface of the tentacle. FIGS. 13c-13d illustrate the dimensions of the container 1302: FIG. 13c shows dimensions of the cross-section of the container 1302; FIG. 13d shows dimensions of the perspective view of the container 1302. These dimensions are for illustrative purposes only. The container, as well as the bellows structure in the container, can be formed in various sizes that are suitable for particular applications of the resulting tentacle.

FIGS. 14a-14g illustrate a soft tentacle with a textured surface and its operation in accordance with some embodiments of the disclosed subject matter. As illustrated in FIG. 14a, the textured soft tentacle 1402 can include a bellows structure on its surface. FIG. 14b illustrates the bellows structure on the surface at a higher zoom. In some embodiments, the textured tentacle can be more compliant than a flat-surface tentacle having the same thickness because the textured tentacle has less amount of elastomer for its skin structure compared to that of the flat-surface tentacle and because each ridge on the textured surface can further assist the deformation of the tentacle.

A textured soft tentacle can grab objects better than a flat-surface soft tentacle. For example, the textured soft tentacle can grab a flat wrench coated with gelatin, as illustrated in FIGS. 14c-14f, which can be challenging for a flat-surface soft tentacle because the gelatin coating is slippery. FIG. 14g illustrates, in a close-up view, how the textured soft tentacle grabs a slipper wrench.

Figure 2:
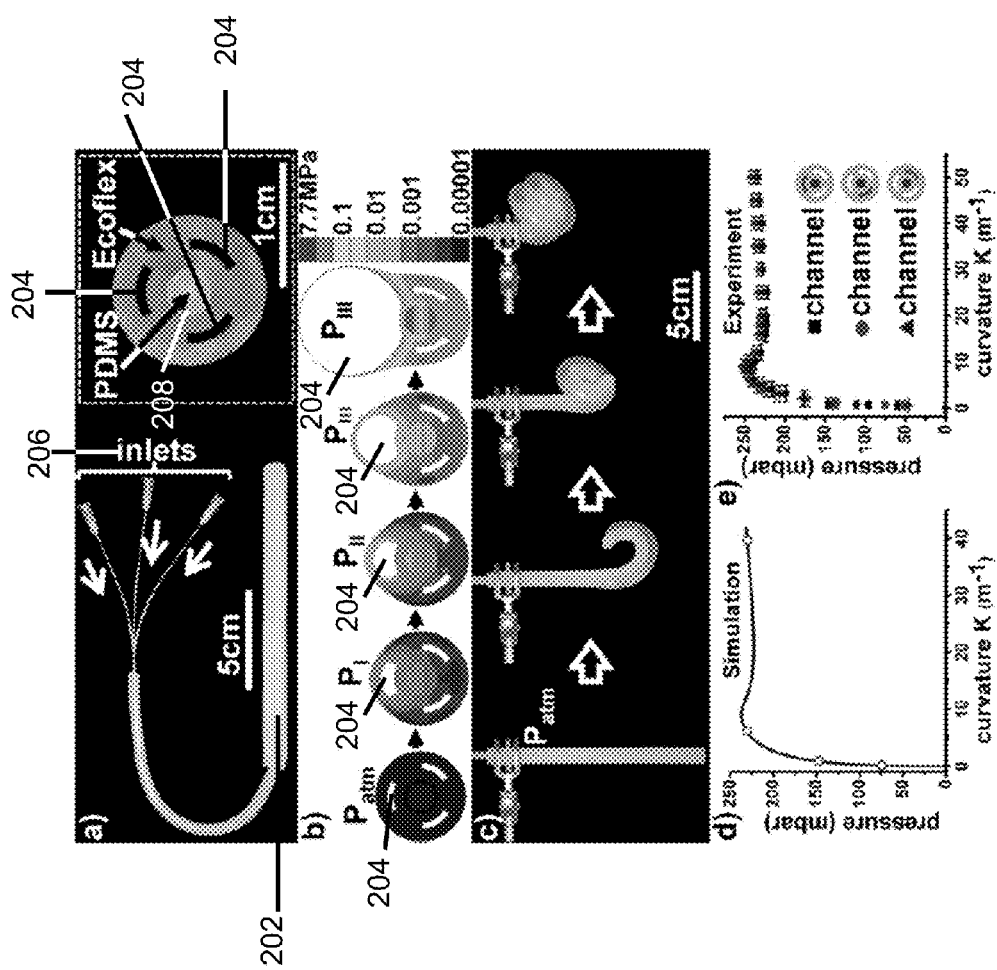
FIGS. 2a-2e illustrate a soft tentacle and its operation in accordance with some embodiments of the disclosed subject matter.
Figure 14:
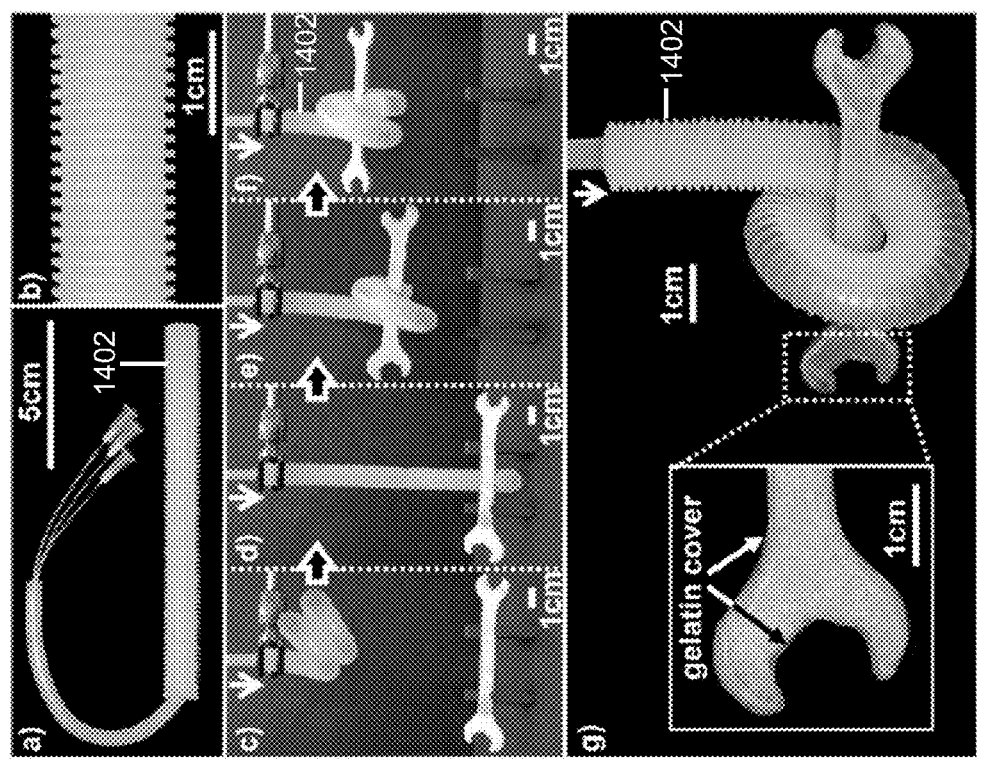
FIGS. 14a-14g illustrate a soft tentacle with a textured surface and its operation in accordance with some embodiments of the disclosed subject matter.

In some embodiments, a soft tentacle can include multiple sections of fluidic channels along the length of the tentacle. FIGS. 15a-15d illustrate a design and fabrication of a multi-section soft tentacle in accordance with some embodiments of the disclosed subject matter. When a tentacle has single-section fluidic channels (e.g., fluidic channels running from the head-end of the tentacle to the tail-end of the tentacle), the tentacle can have a single bending mode, as illustrated in FIGS. 2, 4, and 14. However, when a tentacle has multi-section fluidic channels, the tentacle can have additional bending modes, which can allow for complex motions. In some embodiments, two or more sectioned fluidic channels can be vertically aligned. For example, when a soft tentacle is held vertically (i.e., the longer dimension along the vertical axis), two or more sectioned fluidic channels can be aligned vertically.

Figure 15:
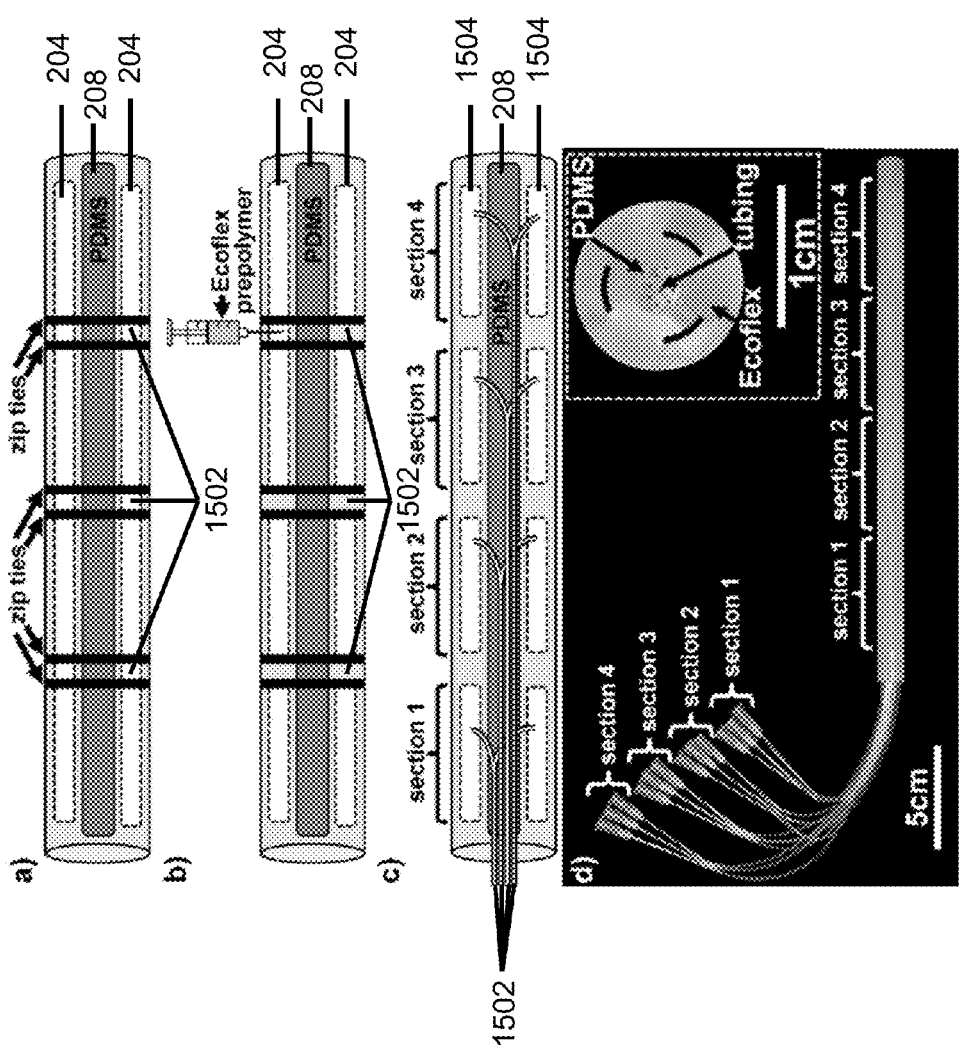
FIGS. 15a-15d illustrate a design and fabrication of a multi-section soft tentacle in accordance with some embodiments of the disclosed subject matter.

FIG. 15c illustrates a four-section tentacle, where each section of the tentacle includes three fluidic channels arranged symmetrically around the rotation axis. The four sectioned fluidic channels can be vertically aligned. Each fluidic channel in each section can be controlled independently using its own gas inlet. Since there are four sections and each section has three fluidic channels, there are 12 independent gas inlets for the multi-section tentacle illustrated in FIG. 15d. Independent gas inlets allow for controlling each section of the tentacle independently, which can provide complex motions for the tentacle.

FIGS. 15a-15c illustrate a process for fabricating a multi-section soft tentacle in accordance with some embodiments of the disclosed subject matter. The initial step includes providing a single-section soft tentacle using, for example, the process illustrated in FIG. 9. The second step includes, as illustrated in FIG. 15a, creating small chambers 1502 in the fluidic channels. The chambers 1502 can be decoupled from the rest of the fluidic channels. In some embodiments, creating the chambers 1502 can include wrapping zip ties around a circumference of the tentacle. When the circumference of the tentacle is firmly wrapped by two zip ties, the volume between the zip ties can form the chambers 1502.

The third step includes, as illustrated in FIG. 15b, filling up the chambers 1502 using a soft material. The soft material can be substantially identical to the soft material used to form the skin structure of the tentacle. In some embodiments, the soft material can include Ecoflex prepolymer. In some embodiments, filling up the chambers 1502 can include delivering the soft material to the chambers 1502 using a syringe. The subsequent step can include curing the delivered soft material at 60° C. for 15 minutes to form strong walls between the fluidic channel sections. The fourth step includes, as illustrated in FIG. 15c, connecting tubings 1502 to the sectioned fluidic channels 1504. In some embodiments, connecting tubings 1502 to the sectioned fluidic channels 1504 can include introducing the tubings 1502 to the tentacle via the core structure 208. Because the core structure 208 can be formed using a stiffer material compared to the skin structure, the core structure can bend, but may not expand. Therefore, by introducing the tubings 1502 via the core structure 208, the tentacle's mobility can be unhindered by the tubings 1502. FIG. 15d illustrates a cross-section of a multi-section tentacle in accordance with some embodiments of the disclosed subject matter. The core structure 208, formed using PDMS, includes a plurality of tubings 1502 that are coupled to individual sections of the fluidic channels 1504.

The flexibility and deformability of a soft actuator provide complex motions, even when the soft actuator is controlled using only few simple on/off fluidic valves. FIGS. 16a-16d illustrate a variety of shapes that can be formed using a three-section soft tentacle in accordance with some embodiments of the disclosed subject matter. Since each fluidic channel section can be independently pressurized, the tentacle can adopt complex shapes.

Figure 16:
FIGS. 16a-16d illustrate a variety of shapes that can be formed using a multi-section soft tentacle in accordance with some embodiments of the disclosed subject matter.

A multi-section tentacle can be used in a variety of applications. In some embodiments, the multi-section tentacle can be controlled to manipulate delicate objects. Different sections of the multi-section tentacle can be inflated to grab an object and hold the object, as illustrated in FIGS. 16b-16d.

In some embodiments, a multi-section tentacle can move certain objects in a predetermined path. In some cases, different sections in the multi-section tentacle can be responsible for certain types of motions. For example, a first section of the tentacle can be actuated to provide a vertical movement; a second section of the tentacle can be actuated to provide a planar movement; and a third section of the tentacle can be actuated to provide a gripping movement.

In some embodiments, a soft tentacle can be augmented with a transport channel for transferring fluid and/or solid particles. The transport channel can receive or deliver certain materials from one end of the tentacle to the other end of the tentacle. The transport channel can be a tubing embedded in the tentacle. In some embodiments, the transport channel can be a tubing that is embedded in the core structure of the tentacle. In some embodiments, there can be two kinds of transport channels: delivery channels and pumping channels. The delivery channels are tubing that can flow gas, liquids, colloidal suspensions or aerosols from a reservoir to the end of the tentacle. The channels to apply reduced pressure can pump liquids or solids through the length of the tentacle so they can be collected in a reservoir. Channels that apply reduced pressure (like vacuum-cleaners) cannot pump out solids with a bigger diameter than the diameter of the channel, here we address that problem by dissolving the solid first, so the channel can pump out the liquid with the solid dissolved and the partially dissolved pieces of solid that now have a diameter smaller than the tubing.

Figure 17:
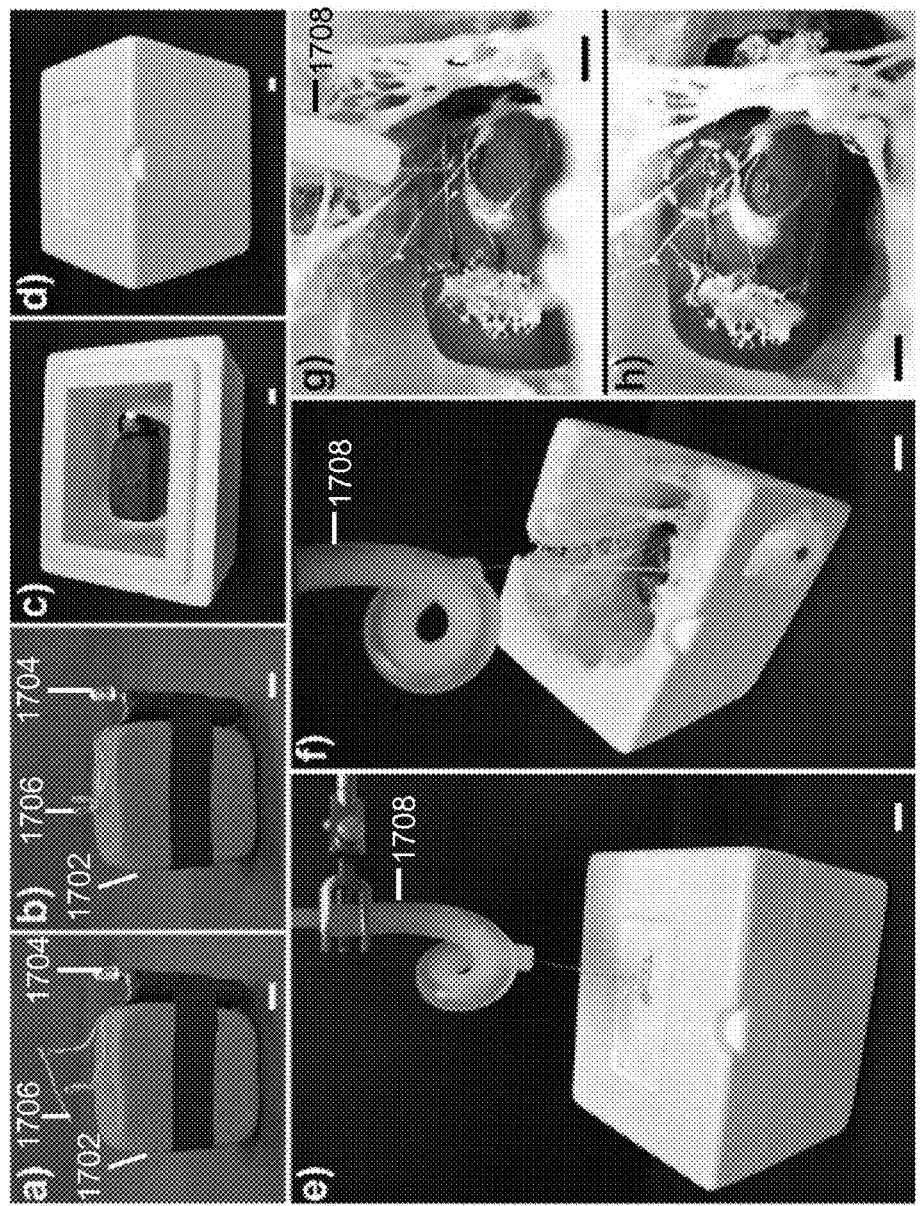
FIGS. 17a-17h illustrate a fluid delivery robot and its application in accordance with some embodiments of the disclosed subject matter.

In some embodiments, a soft tentacle with a transport channel can operate as a fluid delivery robot. FIGS. 17a-17h illustrate an application of a fluid delivery robot for deactivating an electrical system enclosed in a polystyrene foam box in accordance with some embodiments of the disclosed subject matter. FIGS. 17a-17d illustrate a setup of the application. The electrical system 1702 in FIG. 17 includes a power unit (not shown), a light emitting diode (LED) 1704, and an electrical wire 1706. At an inactive state, as illustrated in FIG. 17a, the electrical wire 1706 disconnects the LED 1704 from the power unit, such as a battery. However, at an active state, as illustrated in FIG. 17b, the electrical wire 1706 connects the LED 1704 with the power unit. Therefore, the connection state of the electrical wire 1706 determines the state of the electrical system 1702.

This active electrical system is placed and enclosed in a polystyrene foam box, as illustrated in FIGS. 17c-17d. The task for the fluid delivery soft tentacle is to break into the polystyrene foam box and to deactivate the active electrical system. The fluid delivery soft tentacle can accomplish the task by cutting the electrical wire 1706 that connects the LED 1704 and the power unit.

FIGS. 17e-17h illustrate how the fluid delivery soft tentacle 1708 performs the task. In FIG. 17e, the fluid delivery soft tentacle 1708 positions its tail end so that it can deliver the liquid at a desired position on the box. Once the tentacle 1708 positions itself, the tentacle 1708 can receive liquid that can dissolve the box. For example, the tentacle 1708 can receive acetone from an external source and deliver the acetone to the top of the box via the transport channel. FIG. 17f shows that the tentacle 1708 has dissolved a large portion of the box using the delivered liquid, creating a hole through which the tentacle 1708 can enter. In FIG. 17g, the tentacle 1708 uncurls itself and enters the box through the open hole. Then the tentacle 1708 can cut the electrical wire 1706 by pouring liquid that can dissolve the electrical wire 1706. For example, the tentacle 1708 can pour the concentrated nitric acid ($HNO_3$) on the electrical wire 1706. In FIG. 17h, the tentacle 1708 finally dissolves the electrical wire 1706 using the acid, and cuts off the electrical connection between the LED 1704 and the power unit. Because the electrical connection is cut off, the LED 1704 is turned off, indicating that the electrical system is now deactivated. FIG. 17 illustrates that the soft tentacle 1708 can be used in environments that are unsafe for physical human intervention. Furthermore, FIG. 17 illustrates that the soft tentacle 1708 can be used to deliver fluids that may be hazardous. While FIG. 17 illustrates the application of a fluid delivery robot in a particular synthetic scenario, the concept of using a fluid delivery robot for dismantling an electrical system can apply in a variety of scenarios, such as bomb dismantling and a hazardous area exploration.

Figure 18:
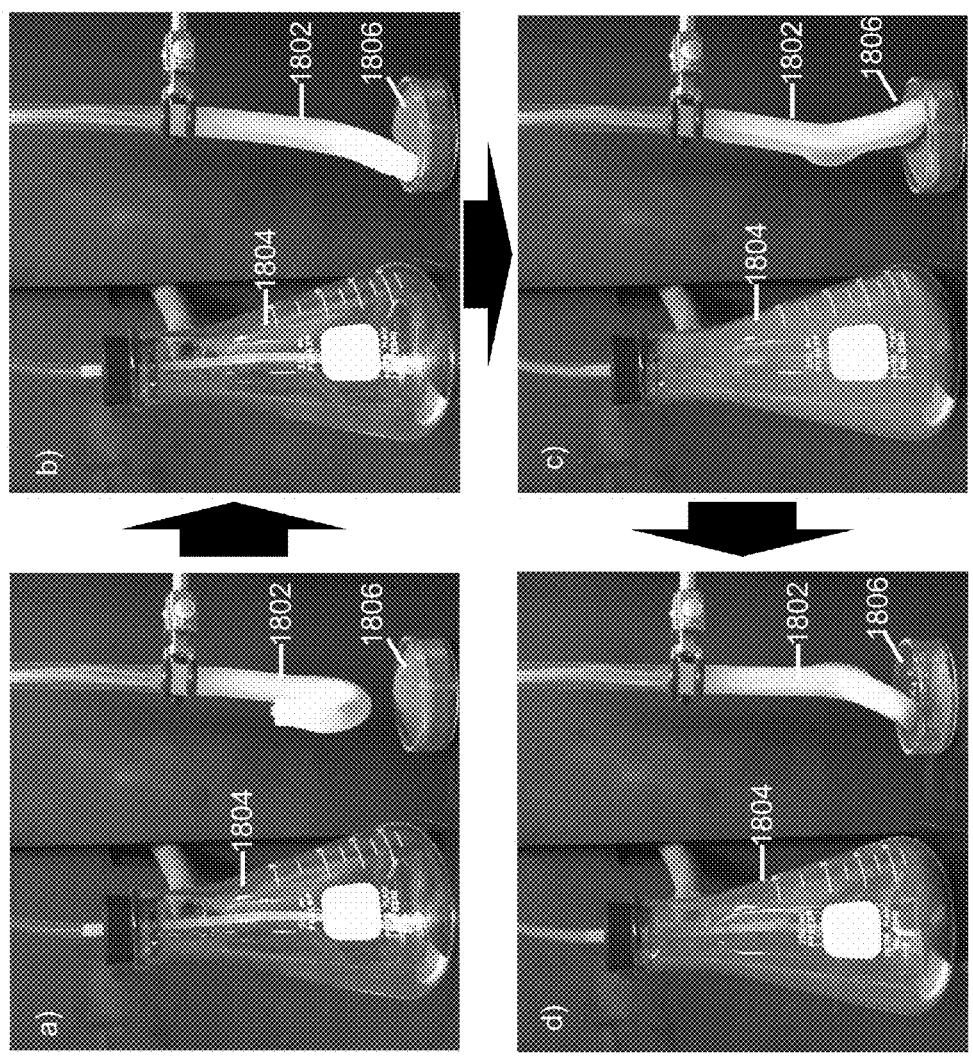
FIGS. 18a-18d illustrate a transfer of solid materials using a soft tentacle in accordance with some embodiments of the disclosed subject matter.

In some embodiments, a soft tentacle with a transport channel can transfer solid materials. FIGS. 18a-18d illustrate a transfer of solid materials using a soft tentacle in accordance with some embodiments of the disclosed subject matter. The soft tentacle with a transport channel 1802 can be deployed to inhale solid materials 1806 on the petri dish. For example, one end of the transport channel 1802 can be coupled to a suction machine that can provide an air suction to inhale the soft materials 1806. In some embodiments, the transport channel of the tentacle 1802 can be coupled, via a tubing, to a container 1804 that can receive the inhaled solid materials. The container 1804 can be an Erlenmeyer flask. The container 1804 can also be coupled to a suction machine (not shown) that can provide the air suction. The illustrated system can be used to inhale granular media, such as colored glass beads, as illustrated in FIG. 18.

In FIG. 18a, the tentacle 1802 is actuated to place the tail end of the tentacle 1802 on the solid materials 1806. This step can include uncurling the soft tentacle 1802 by simultaneously actuating some of the sectioned fluidic channels. In FIG. 18b, the tail end of the tentacle 1802 is placed on the target solid materials 1806. In FIG. 18c, the tentacle 1802 can start inhaling the solid materials 1806 through the transport channel. The inhaled solid materials can be visually seen in the container 1804. The tail-end of the tentacle 1802 can be actuated to move around the petri dish to ensure that the tentacle 1802 inhales all the solid materials 1806. In FIG. 18d, the tentacle 1802 can continue to inhale the solid materials 1806, until all of the solid materials 1806 have been inhaled. Because the tentacle 1802 can move during the inhale process, the tentacle 1802 can quickly inhale the solid materials spread around a sizeable area.

In some embodiments, a soft tentacle can time-multiplex its transport channel. For example, the soft tentacle can use the transport channel to deliver fluid at a first point in time, and then use the same transport channel to inhale solid particles at a second point in time.

Figure 19:
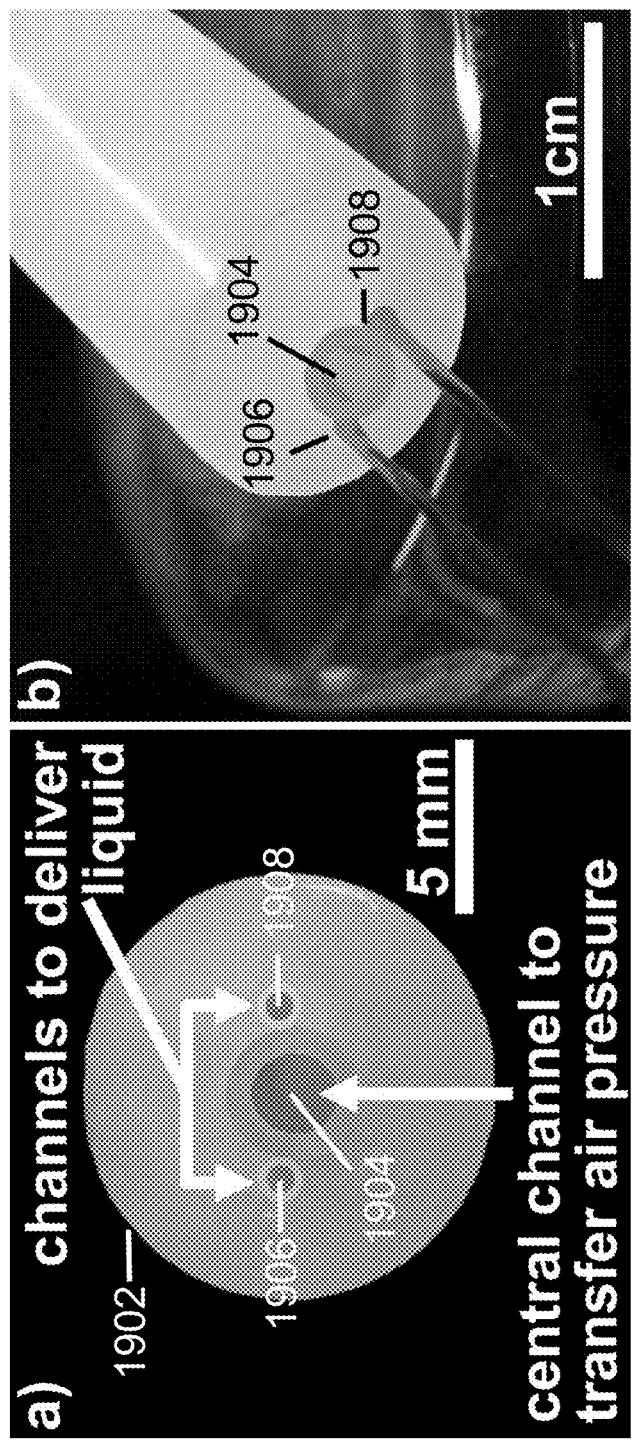
FIGS. 19a-19b illustrate a soft tentacle with a plurality of transport channels in accordance with some embodiments of the disclosed subject matter.

In some embodiments, a soft tentacle can include a plurality of transport channels. In some cases, each transport channel can be tailored to perform a particular function. FIGS. 19a-19b illustrate a soft tentacle with a plurality of transport channels in accordance with some embodiments of the disclosed subject matter. FIG. 19a illustrates a cross section of a soft tentacle 1902 with three transport channels. The transport channel 1904, embedded in the core structure, can be used to transfer air, and the other transport channels 1906, 1908 can be used for to transfer liquid. The liquid transport channels 1906, 1908 can be formed using two polyethylene tubes. FIG. 19b illustrates a delivery of liquid via the liquid transport channels 1906, 1908.

In some embodiments, a soft tentacle 1902 with a plurality of transport channels can be used to transfer sizeable solid particles. In some cases, the transport of large particles through the central transport channel, as is illustrated in FIG. 18, can be difficult due to frequent clogging. For example, the transport of particles with a diameter greater than 1 mm can be challenging. To transport such particles, if the particles are soluble, the tentacle 1902 can first dissolve the particles in liquid and then transfer the dissolved particles. This mechanism can be useful in reducing clogging.

Figure 20:
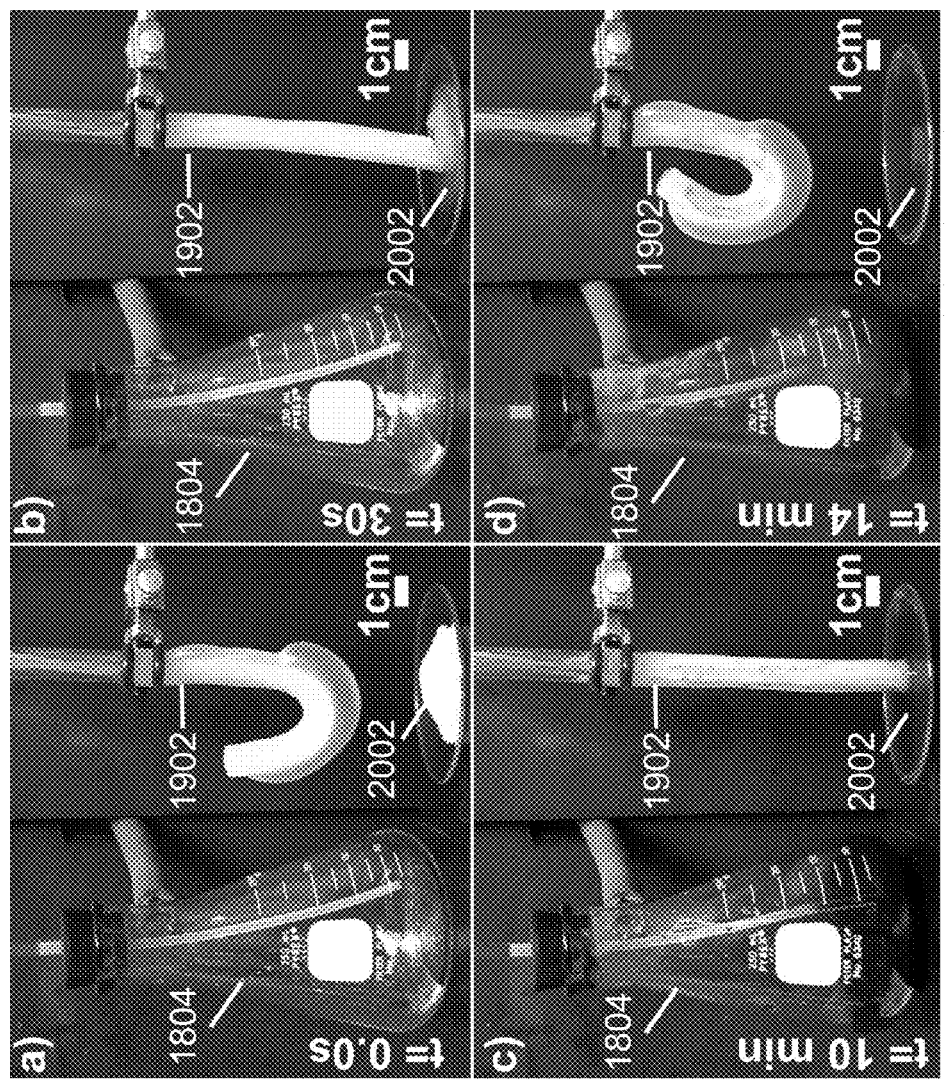
FIGS. 20a-20d illustrate a transfer of dissolved particles using a soft tentacle in accordance with some embodiments of the disclosed subject matter.

In some embodiments, a soft tentacle can transport solid particles by either dissolving the solid particles using liquid and transporting the dissolved solid particles or suspending the solid particles in the liquid. FIGS. 20a-20d illustrate a transfer of dissolved particles using a soft tentacle in accordance with some embodiments of the disclosed subject matter. As illustrated in FIG. 20a, the central transport channel 1904 of the tentacle 1902 is coupled to a container 1804, and the liquid transport channels 1906, 1908 of the tentacle 1902 are coupled to a liquid source (not shown.) The container 1804 can be an Erlenmeyer flask. The task for the tentacle 1902 is to transfer a pile of sodium chloride (NaCl) crystals 2002, having 1-3 mm, to the container 1804.

In FIG. 20a, the tentacle 1902 can be actuated to place the tail end of the tentacle 1902 on the target particles 2002. In FIG. 20b, the same tentacle 1902 can deliver a solution (or water) to the target particles 2002 via the fluid transport channels 1906, 1908 to dissolve the target particles 2002. In some cases, the delivered water can be warmed up to, for example, 60° C. to increase the solubility of the particles. In FIG. 20c, while the tentacle 1902 delivers the water, the tentacle 1902 can inhale the dissolved particles via the air transport channel 1904. In some cases, the tentacle 1902 can simultaneously deliver water and inhale the dissolved particles. In FIG. 20d, the tentacle 1902 can inhale the remaining residues and complete the transfer of the particles 2002. In some cases, the solid particles may not dissolve entirely; instead, the solid particles may be suspended in the solution. Even in those cases, the tentacle 1902 can inhale the suspending particles to transfer the particles from one location to another.

Figure 21:
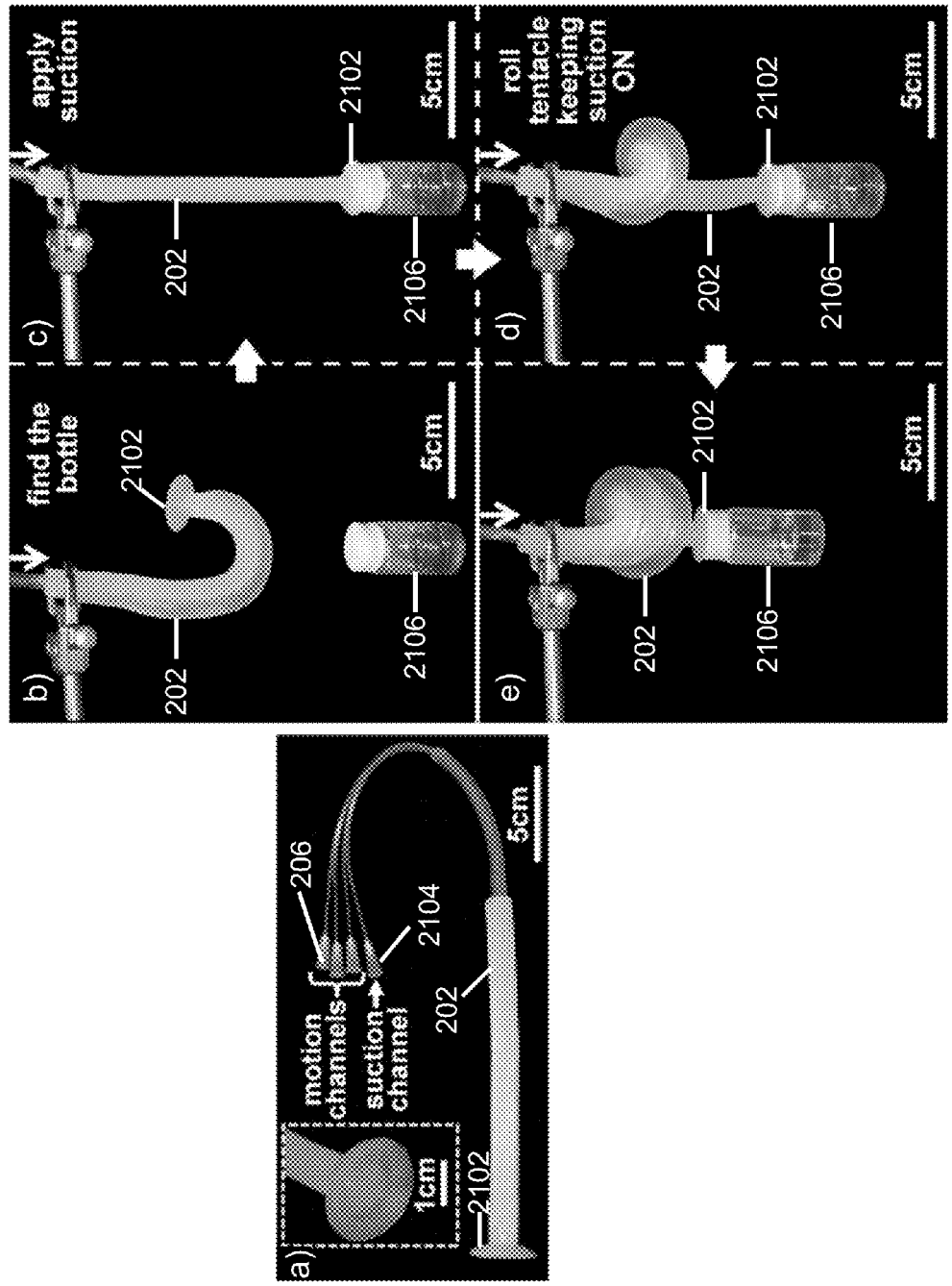
FIGS. 21a-21e illustrate a suction robot and its operation in accordance with some embodiments of the disclosed subject matter.

In some embodiments, a soft tentacle can cooperate with other robotic elements to provide additional functionalities. For example, the tentacle can be coupled with a suction cup. FIGS. 21a-21e illustrate a suction robot and its operation in accordance with some embodiments of the disclosed subject matter. As illustrated in FIG. 21a, the suction robot can include a soft tentacle 202 and a suction module 2102. The soft tentacle 202 can include a transport channel that can be used as a suction channel. The suction channel can be coupled to the suction module 2102. The suction channel can allow an external pressure source to actuate the suction module 2102 by inhaling air through the suction channel. In some embodiments, the suction channel can be embedded in the core structure. The suction channel can be controlled using a suction channel inlet 2104 connected to a mechanical pump, vacuum lines, or other sources of reduce pressure; the fluidic channels in the tentacle 202 can be controlled using motion channel inlets 206. The suction channel can be coupled to sources of gas (like a gas compressor) or sources of reduced pressure (like a mechanical pump, vacuum line, a vacuum cleaner) for operation.

In some cases, the suction robot can be used to lift an object 2106, such as a liquid bottle, as illustrated in FIGS. 20b-20e. As illustrated in FIG. 21b, the soft tentacle 202 can be actuated to place the suction module 2102 on the object 2106. As illustrated in FIG. 21c, once the suction module 2102 is placed on the object 2106, the suction module 2102 can be activated to couple the suction module 2102 tightly onto the object 2106. As illustrated in FIG. 21d, the soft tentacle 202 can then be actuated so that the soft tentacle 202 curls itself, thereby imposing a lifting force on the object 2106. In some cases, the length to which the object 2106 is lifted can be controlled by controlling the pressure applied to the soft tentacle 202. For example, as illustrated in FIG. 21e, the soft tentacle can be actuated further to increase the lifting force, thereby lifting the object 2106 higher.

A soft tentacle can cooperate with other elements to provide useful functionalities for biomedical applications. For example, a doctor can use the soft tentacle during a surgical procedure to provide water to a target region in order to, for example, wash away blood clots. The doctor can also use the same tentacle to collect waste products during the surgical procedure either through the transport channel or by grabbing the waste product via a rolling motion of the tentacle. In some cases, the doctor can use a soft tentacle with a plurality of transport channels to provide water and collect waste products at the same time. In some cases, the doctor can use a multi-section soft tentacle to maneuver around a region of interest and transport fluid from/to a desired location.

In some embodiments, a soft tentacle can include a camera module for capturing image/video information. The soft tentacle with a camera module can be deployed as an endoscope for capturing image/video information of body parts that are not easily accessible. For example, a soft tentacle-based endoscope can be used for colonoscopy or esophagogastroduodenoscopy. A soft tentacle-based endoscope has many advantages compared to a conventional endoscope. For example, due to its great degree of bending, the soft tentacle-based endoscope can provide controlled movements within the body, which is difficult with a conventional endoscope. Embedding functional components into these actuators (for example, a video camera, tubing for delivering fluid, or a suction channel) would extend the capabilities of these soft endoscopes. Furthermore, the soft tentacle is inherently soft and can be less intrusive during operation. The elastomeric skin of soft tentacles is chemically resistant to a variety of solvents, basis, and acids, what make these endoscopes more suitable than the traditional hose endoscopes for their use in chemically aggressive media such as the digestive tract or harsh industrial inspection environments.

Figure 22:
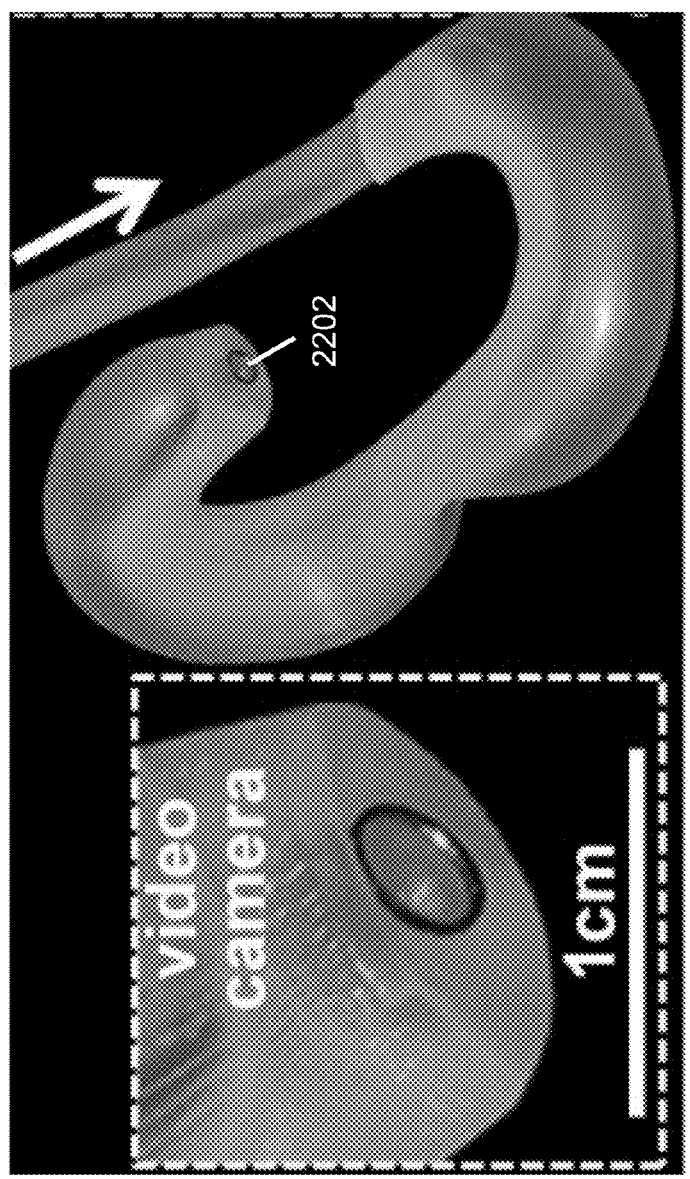
FIG. 22 illustrates a soft tentacle with a camera module in accordance with some embodiments of the disclosed subject matter.

The central channel of the soft tentacles can be used to host components with specialized optical, electrical, or mechanical functions. FIG. 22 illustrates a soft tentacle with a camera module in accordance with some embodiments of the disclosed subject matter. The soft tentacle can include single-section fluidic channels or multi-section fluidic channels. The camera module 2202 can be coupled to a tail-end of the tentacle. After the camera and its wires were introduced along the central channel of the tentacle the rest of the central channel was filled with elastomers so, after the elastomers cured, the camera moves as a whole with the soft-tentacle. The camera module 2202 can be a charge coupled device (CCD) image sensor or a complementary metal-oxide-semiconductor (CMOS) image sensor. The camera module 2202 can be coupled to a computer and/or a power unit via an electrical wire. In some embodiments, the electrical wire can be embedded in the core structure of the tentacle. For example, the electrical wire can be inserted along the central channel and glued in place with PDMS. To avoid damage to the video camera from the thermal curing step, the PDMS was cured at room temperature for 48 hours.

In some embodiments, the soft tentacle can include two sections. The section of the tentacle closest to the tether can bend to form a base of the tentacle so that the other section with a camera module 2202 can be lifted out of plane and be oriented in a desired direction.

Figure 24:
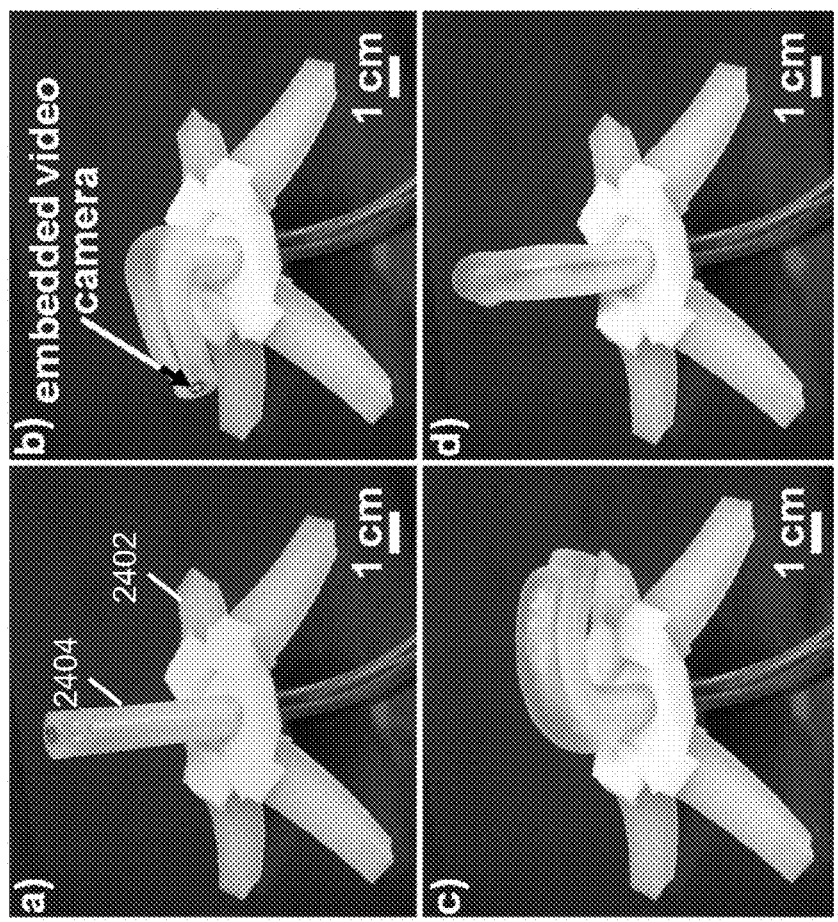
FIG. 24a-24d shows a soft-tentacle having a camera, mounted on top of a quadruped in accordance with some embodiments of the disclosed subject matter.

In some embodiments, the soft tentacle having a camera module 2202 can be mounted on a soft robot to provide vision to the soft robot. The soft tentacle can be configured so that the camera module 2202 can be oriented in any desired direction. FIG. 24 shows a soft-tentacle mounted on a soft robot in accordance with some embodiments of the disclosed subject matter. FIG. 24 includes a quadruped soft robot 2402 and a soft-tentacle 2404 having a camera module. The quadruped soft robot 2402 can include a plurality of actuators that can be independently actuated via pressurization, and the soft tentacle 2404 can include a camera module 2202. As illustrated in FIGS. 24*a*-24*d*, the quadruped soft robot 2402 and the soft tentacle 2404 can be actuated independently. This allows the soft tentacle to provide an almost 360° vision to the quadruped soft robot 2402.

Figure 23:
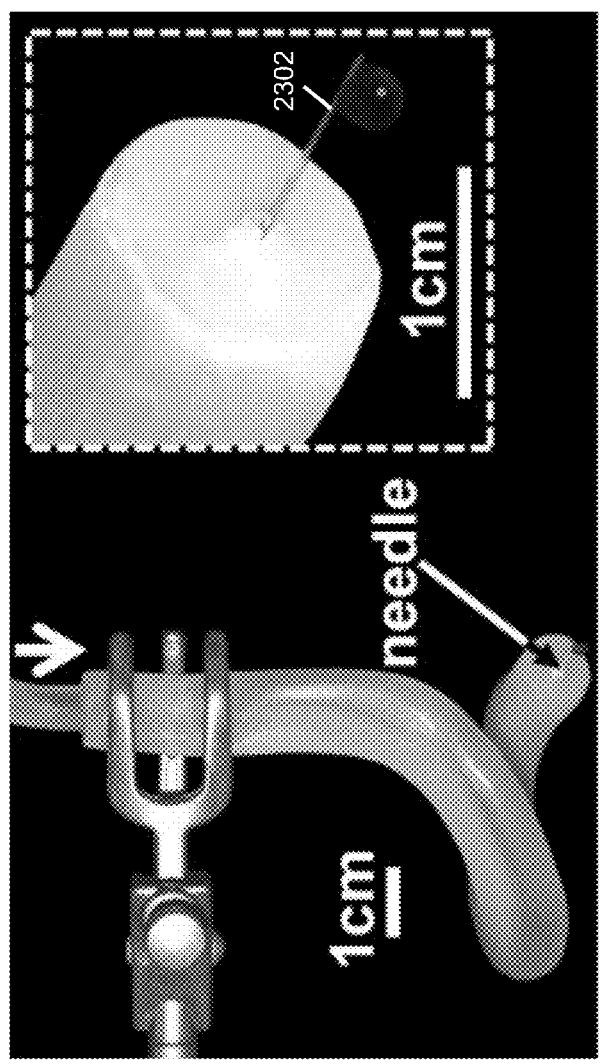
FIG. 23 illustrates a soft tentacle that includes a needle in accordance with some embodiments of the disclosed subject matter.

In some embodiments, a soft tentacle can include an apparatus for performing certain surgical procedures on a patient. The apparatus can include scissors, a knife, a clamp, a clip, a decapitator, forceps, a microdissector, a scalpel, a tweezer, or a needle. As a particular example, FIG. 23 illustrates a soft tentacle that includes a hypodermic needle (22 G11/2) for fluid delivery in accordance with some embodiments of the disclosed subject matter. The hypodermic needle was connected to the end of a polyethylene tubing, then the ensemble was introduced through the central channel of the tentacle. The central channel was filled with elastomers to secure the fluid delivery channel. The needle 2302 can be coupled to a transport channel of the tentacle. Therefore, the need 2302 can be used to deliver a desired amount of fluid to a desired location. For example, a doctor can use the soft tentacle to move the needle 2302 to a desired location, and use the needle 2302 to deliver a desired amount of fluid to a desired location.

Radial Deflection Actuators

Some embodiments of a radial deflection actuator can include a soft material with an embedded network of fluid channels (e.g., pneumatic networks.) Such soft robotics include fluidic channels that are disposed radially around a central point, which causes the robot to deflect upwards out of the plane that houses the channels when at rest. In some embodiments, the channels form arced channels having a radius of curvature around an imaginary central point in the device. In some embodiments, the channels forms arcs, semi-circles, circles and the like, arranged around a central point in the device. When pressurized with fluids, the radially positioned fluid channels can inflate to deflect the actuator into a hemispherical geometry, thereby providing a radial deflection to the actuator.

FIGS. 25A-25C illustrate a radial deflection actuator in accordance with some embodiments of the disclosed subject matter. The top view of a radial deflection actuator 2500, illustrated in FIG. 25A, shows fluid/fluidic channels 2502 embedded in a flexible body 2504. The flexible body 2504 can be formed using a soft material. In this particular embodiment, the radial channels 2502 are arranged in concentric circles; however, as noted above, the channels can have other shapes and arrangements radially arranged around a central point. The fluid channels 2502 is sealed from the bottom (not shown) using a flexible, but relatively inextensible layer. This layer is strain-limiting with respect to the soft material covering the top layer of the fluid channels 2502.

FIG. 25B illustrates a cross-section of the radial deflection actuator, in accordance with the embodiment disclosed in FIG. 25A. The illustrated cross-section is taken along the dotted line 2506. The cross section illustrates the fluid channels 2502 and the flexible body 2504, the top layer 2508 of the fluid channels 2502 formed using the same soft material as the flexible body 2504, and the strain limiting layer 2510 sealing the fluid channels 2502. FIG. 25B illustrates the radial deflection actuator 2500 in a relaxed state. The relaxed state is a state in which the pressure in the fluid channels 2502 is substantially similar to the ambient pressure, $P_{amb}$, as in FIG. 1A. Because the fluid channels 2502 are not pressurized, the actuator 2500 lies flat and is not deflected.

FIG. 25C illustrates a cross-section of the radial deflection actuator in a pressurized state, in accordance with the embodiment disclosed in FIG. 25A. Again, the cross-section is taken along the dotted line 2506. In some embodiments, the fluid channels 2502 can be pressurized through a pressurizing inlet 2512, indicated by 'X.' However, the pressurizing inlet can be located anywhere. When the fluid channels 2502 are pressurized, the fluid channels 2502 inflates the top layer 2508 and bend around the strain limiting layer 2510. Because this bending motion is provided along every radial cross sections, the actuator 2500 deflects into a convex or hemispherical geometry, thereby providing a radial deflection to the actuator 2500.

In some embodiments, the fluid channels 2502 can be arranged in different shapes and still provide radial deflection movements. In some embodiments, the channels form arced channels having a radius of curvature around an imaginary central point in the device. In some embodiments, the channels forms arcs, semi-circles, circles and the like, arranged around a central point in the device. For example, the fluid channels can be arranged as concentric triangles, concentric squares, concentric pentagons, and any other concentric polygons. When the polygon formed by the fluid channels is equilateral, the radial deflection movement is isotropic; when the polygon is non-equilateral, the radial deflection movement is non-isotropic.

In some embodiments, channels in materials such as used herein can be fabricated by using soft lithography. Forming channels in silicones and other elastomers is a well understood, widely used technique in soft lithography and microfluidics and can be applied to the construction of soft robotic pressurized networks.

Figure 25:
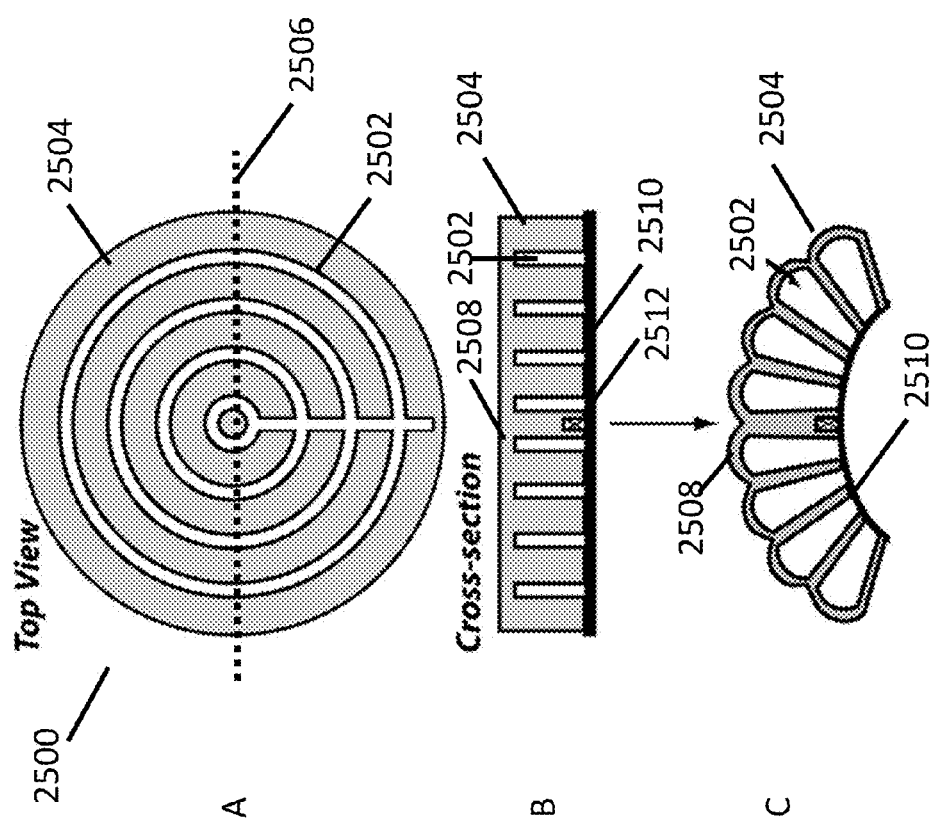
FIGS. 25A-25C illustrate a radial deflection actuator in accordance with some embodiments of the disclosed subject matter.
Figure 26:
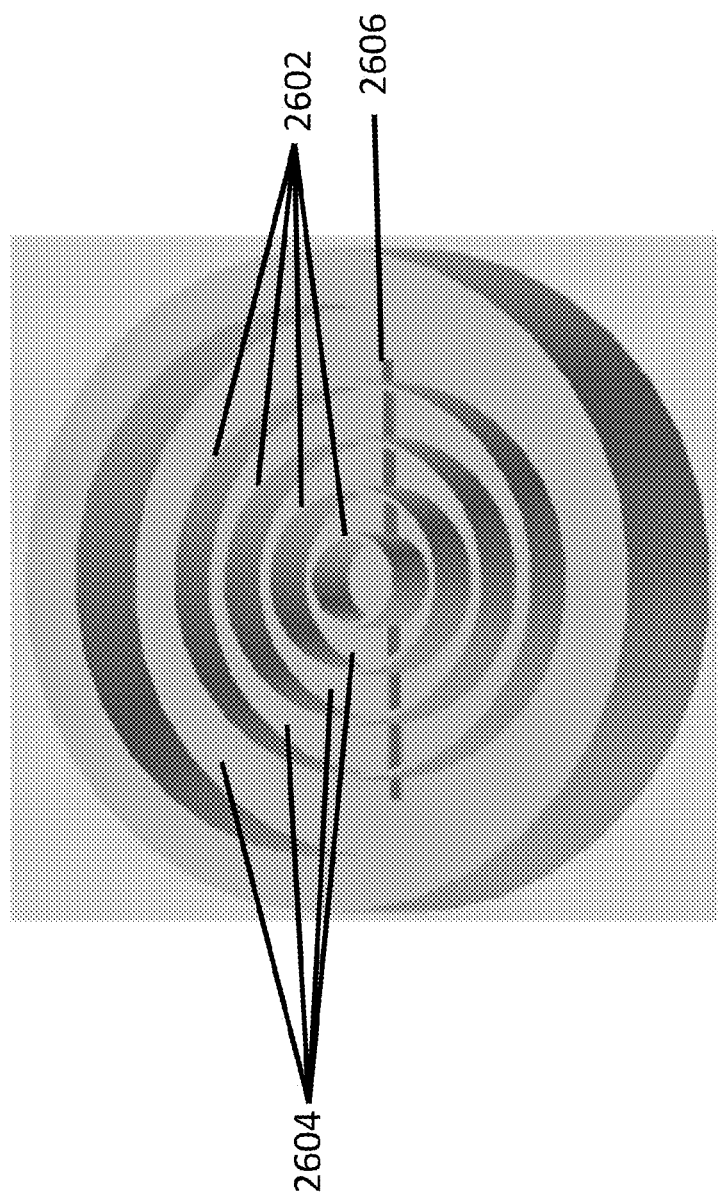
FIG. 26 illustrates a mold for molding the radial deflection actuator in accordance with some embodiments of the disclosed subject matter.

In other embodiments, the actuator 2500 can be molded. The pressurizable networks are prepared by casting the elastomeric materials in a mold containing the negative replica of the desired features in the structure. FIG. 26 illustrates a mold for molding the radial deflection actuator in accordance with the embodiment of FIGS. 25A-25C. The mold defines the "negative" structure of the actuator 2500. For example, the raised walls 2602 define the volume for fluid channels 2502 and the trenches 2604 formed by the raised walls 2602 define the volume for the flexible body 2504. Also, the raised structure 2606 coupled to the raised walls 2602 can form the conduit for providing pressurized fluid. By casting a soft material in this mold, a flexible molded body 2504 with embedded fluid channels 2502 can be provided. Once the soft material is molded into a flexible molded body 2504, the flexible molded body 204 can be sealed using a strain-limiting layer 2510 as disclosed in FIGS. 25A-25C in accordance with some embodiments of the disclosed subject matter.

Such methods of manufacture permit fabrication of devices having an overall thickness greater than 1 mm and typically having a thickness in the range of 5 mm to 5 cm. Exemplary thicknesses include 2-4 mm, 5 mm, 1 cm, 2 cm, or 5 cm. The relatively large scale of the pressurizable networks (compared to features obtainable, for example, by conventional photolithographic techniques) result in the fabrication of functional devices on a large scale. Embedded channel networks in soft robotics are not limited to large scale and it is contemplated that conventional microfabrication techniques can be used to develop soft robotics on the sub-millimeter scale.

Figure 27:
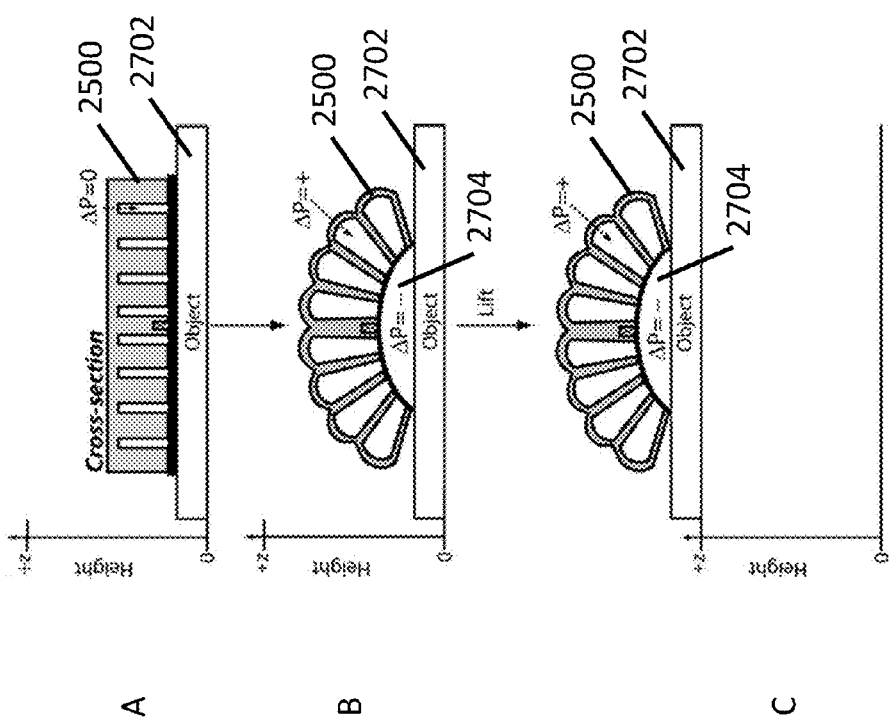
FIGS. 27A-27C illustrate using the radial deflection actuator as a gripping device in accordance with some embodiments of the disclosed subject matter.

In some embodiments, the radial deflection actuator 2500 can be used as a gripping device by creating a suction or negative pressure between the device and the gripped surface. FIGS. 27A-27C illustrate using the radial deflection actuator as a gripping device in accordance with some embodiments of the disclosed subject matter. First, the actuator 2500 can be placed in contact with an object 2702 that is non-porous, as in FIG. 27A. Then, the actuator 2500 can be pressurized and inflated as in FIG. 27B. While only shown in cross-section, the radial distribution of the fluidic channels around a central point causes the actuator to deflect upwards in two dimensions to form a 'bubble' or convex shape with respect to the object. The conformal, sealing contact between the bottom layer of the actuator 2500 and the surface of the object 2702 while pressurized creates the void space 2704 between them. The void space has a lower pressure than the external ambient pressure (indicated by the notation that "ΔP=−"). This sub-atmospheric pressure holds together the bottom layer of the actuator 2500 and the surface of the object 2702, providing the gripping. Thus, the actuator can function as a suction cup, that is, an object that uses negative fluid pressure of air or water to adhere to a nonporous surfaces. Once this vacuum is formed, the actuator 2500 can lift the object 2702, as illustrated in FIG. 27C. This suction mechanism of the radial deflection actuator 2500 can be useful in many applications. For example, the radial deflection actuator 2500 can reversibly attach to objects for lifting or transfer or anchor points for various components of machines. The actuator 2500 can also be used to reliably control and maintain the position of instruments (e.g., cutting tools) or sensors. When placed at contact points between a robot and a surface, the actuator 2500 can also provide a traction mechanism. In this regard, actuator 2500 can act as a 'foot' for a soft robotic. In addition, the actuator 2500 can provide simple gripping and manipulation of delicate objects that may otherwise be difficult to handle, for example, glass panes and sheets of paper or plastic.

Figure 28:
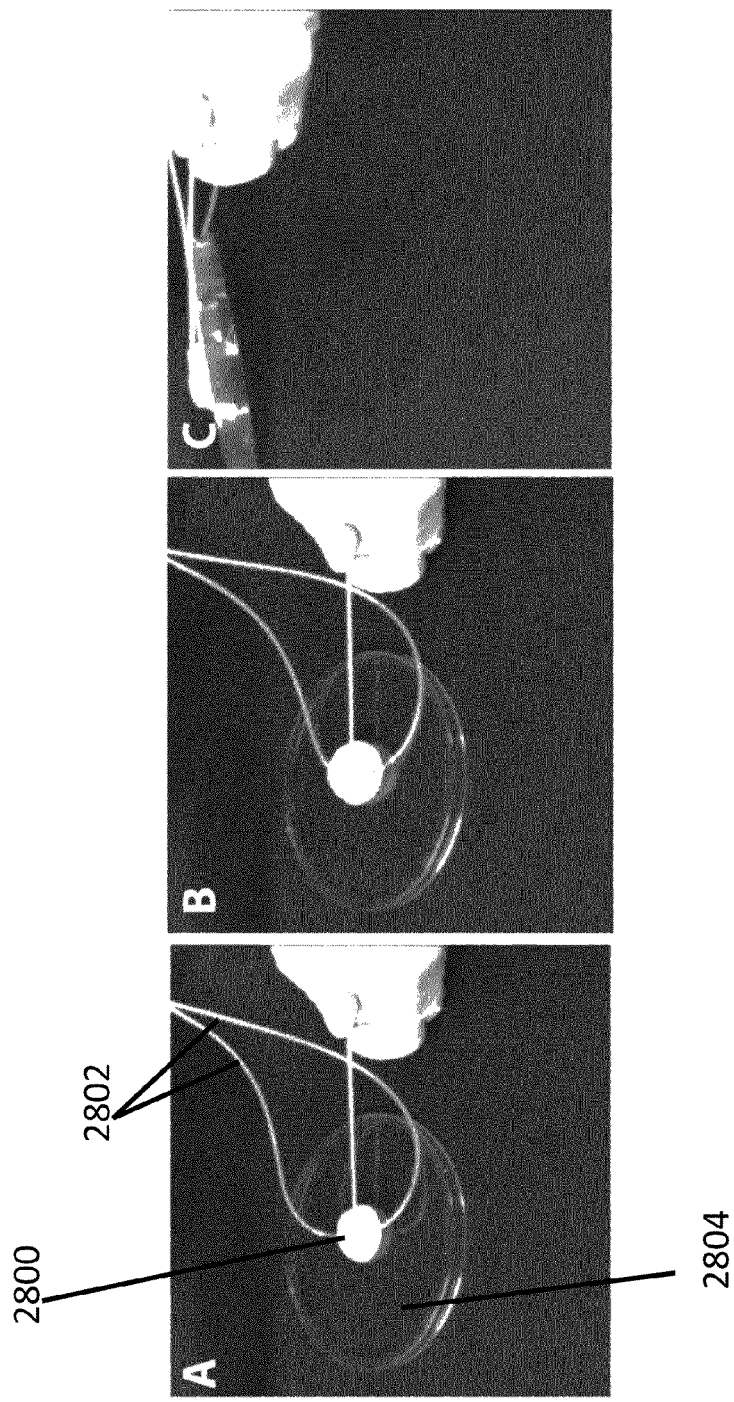
FIGS. 28A-28C demonstrate a manipulation of an object, e.g., a petri dish, using a radial deflection actuator in accordance with some embodiments of the disclosed subject matter.

FIGS. 28A-28C demonstrate a manipulation of an object, e.g., a petri dish, using a radial deflection actuator in accordance with some embodiments of the disclosed subject matter. In this demonstration, the actuator 2800, substantially similar to the embodiment described in FIG. 25, is pressurized via two conduits 2802. In FIG. 28A, the actuator 2800 is brought in contact with the petri dish 2804. At this point, the actuator 2800 is in a relaxed state, as illustrated in FIG. 27A. In FIG. 28B, the actuator 2800 is pressurized so that the lower surface of the actuator 2800 grips the petri dish 2804, as illustrated in FIG. 27B. In FIG. 28C, the actuator 2800 can be lifted to lift the petri dish 2804 attached to actuator 2800.

The radial deflection actuator can cooperate with other robotic elements to provide new functionalities. One of the new functionalities includes fluid control. For example, the radial deflection actuator can control fluid flows in another robot. In particular, the radial deflection actuator can be combined with a second chamber for the sampling and delivery of fluids from one location to another, effectively forming a fluid suction device. FIG. 29A illustrates a cross-section of a fluid suction device in accordance with some embodiments of the disclosed subject matter. The fluid suction device 2900 can include the radial deflection actuator 2500, substantially as described in FIG. 2, and a soft chamber 2902 stacked on the actuator 2500. The soft chamber 2902 can include a reservoir 2904 that can accommodate fluids, such as gases and liquids. The soft chamber 2902 can further include a fluid inlet 2906 through which the soft chamber 2902 can receive or eject fluid. The fluid inlet 2906 is not coupled to any of the fluid channels 2502.

In some embodiments, the soft chamber 2902 is provided on the radial deflection actuator 2500 by attaching a cap on top of the radial deflection actuator 2500. The cap can include a cover layer and one or more walls, and the one or more walls are attached to the flexible body. The volume between the cap and the top of the radial deflection actuator 2500 can form the reservoir 2904. In some cases, the cap can simply be a layer of soft material disposed on the radial deflection actuator 2500. The soft material of the soft chamber 2902 can be the same material as that of the actuator 2500; the soft material of the soft chamber 2902 can be a different soft material compared to that of the actuator 2500.

In some embodiments, the cap of the soft chamber 2902 can be molded. FIG. 30 shows a mold for molding a cap of the soft chamber 2902 in accordance with the embodiment of FIGS. 29A-29D. The mold defines the "negative" structure of the layer for the soft chamber 2902. For example, the raised bump 3002 defines the reservoir 2904, the trench 3004 defines the layer's wall for coupling the molded layer to the radial deflection actuator 2500, and the raised structure 3006 coupled to the raised bump 3002 defines the fluid inlet 2906 for the reservoir 2904.

Figure 29:
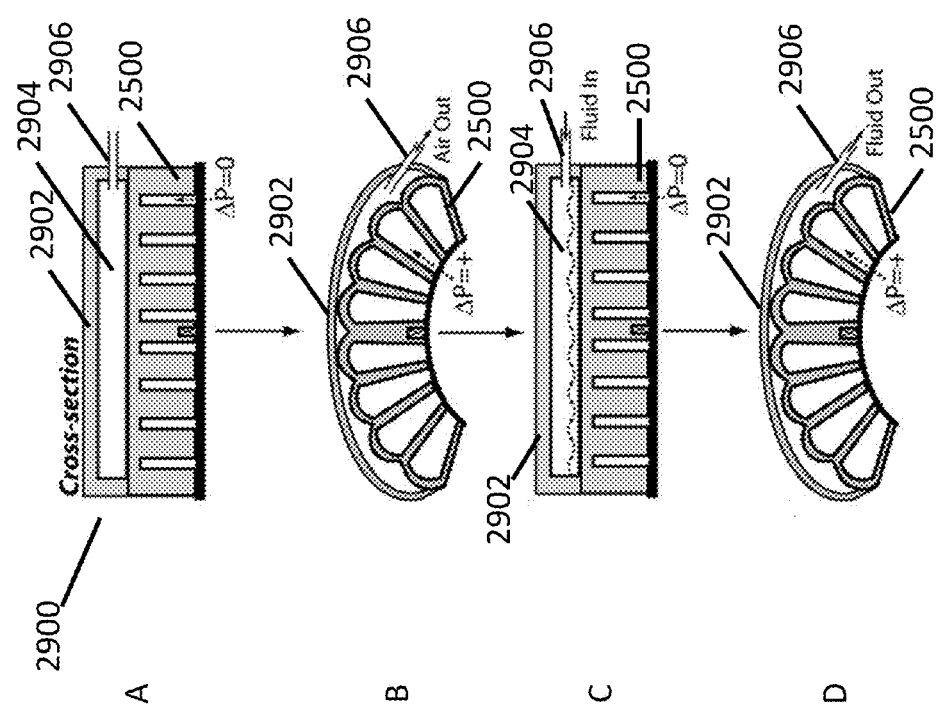
FIGS. 29A-29D illustrate a cross-section of a fluid suction device in accordance with some embodiments of the disclosed subject matter.
Figure 30:
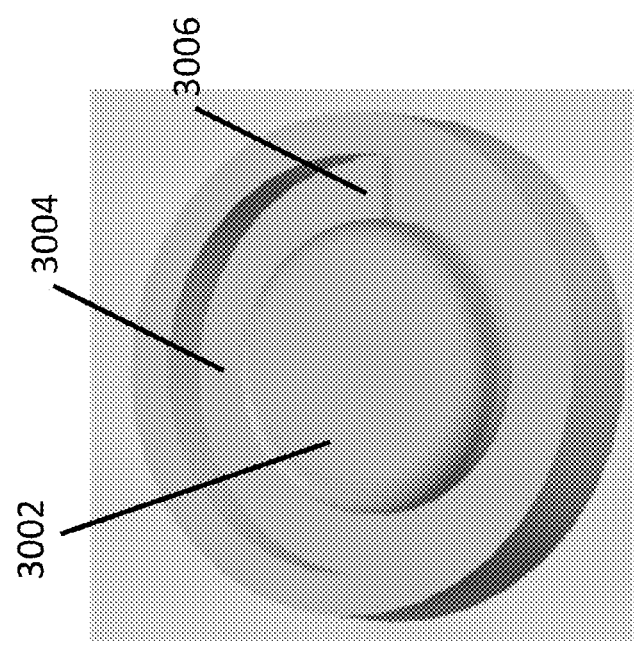
FIG. 30 shows a mold for molding a layer of soft material for a soft chamber in accordance with some embodiments of the disclosed subject matter.

This fluid suction device shown in FIG. 29 can be used to collect and deliver fluids. FIGS. 29A-29D illustrate a fluid control mechanism of the soft fluid suction device in accordance with some embodiments of the disclosed subject matter. The fluid suction device 2900 illustrated in FIG. 29A is in its relaxed state. In the relaxed state, the radial deflection actuator 2500 is in its relaxed state. FIG. 29B shows the fluid suction device in its exhaled state. In the exhaled state, the radial deflection actuator 2500 is actuated, which causes the radial deflection actuator 2500 to radially deflect. Upon deflection, actuator 2500 is disposed upward and into soft chamber 2902. The deflected actuator 2500 reduces the volume of the reservoir 2904 in the soft chamber 2902 and the soft chamber 2902 of the fluid suction device 2900 "exhales" the air in the reservoir 2904 via the fluid inlet 2906.

When the actuator 2500 returns to its relaxed state, as in FIG. 29C, the volume of the reservoir 3004 in the soft chamber 3002 returns to its original volume as well. As the actuator 2500 returns to its relaxed state, the soft chamber 3002 is configured to "inhale" a volume of gas (air) or fluid via fluid inlet 3006. By placing the fluid inlet 3006 in a fluid, the soft chamber 3002 can inhale the desired fluid via the fluid inlet 3006. Thus, the device receives an aliquot of liquid into reservoir 3004. To remove the fluid from reservoir 3004, the radial deflection actuator 2500 can be re-actuated. Upon deflection, actuator 2500 again is disposed upward and into soft chamber 3000. Again, the volume of reservoir 3004 is compressed and in this way, soft chamber 3002 delivers the captured fluid via the fluid inlet 3004 from the reservoir chamber.

As illustrated in FIGS. 29A-29D, the actuator 2500 provides an effective mechanism for controlling the receipt and delivery of fluids in soft chamber 2902. This fluid control mechanism can be useful in many applications. For example, the actuator 2500 provides a simple solution to collecting and delivering fluids. In some embodiments, the actuator 2500 can be coupled to other robots to sample fluids from a remote location (e.g., from harsh environments unsafe for humans) and deliver the sampled fluid to another location. Because the sampled fluid can be completely contained in the reservoir 2904, even toxic fluids can be collected and delivered safely.

Figure 31:
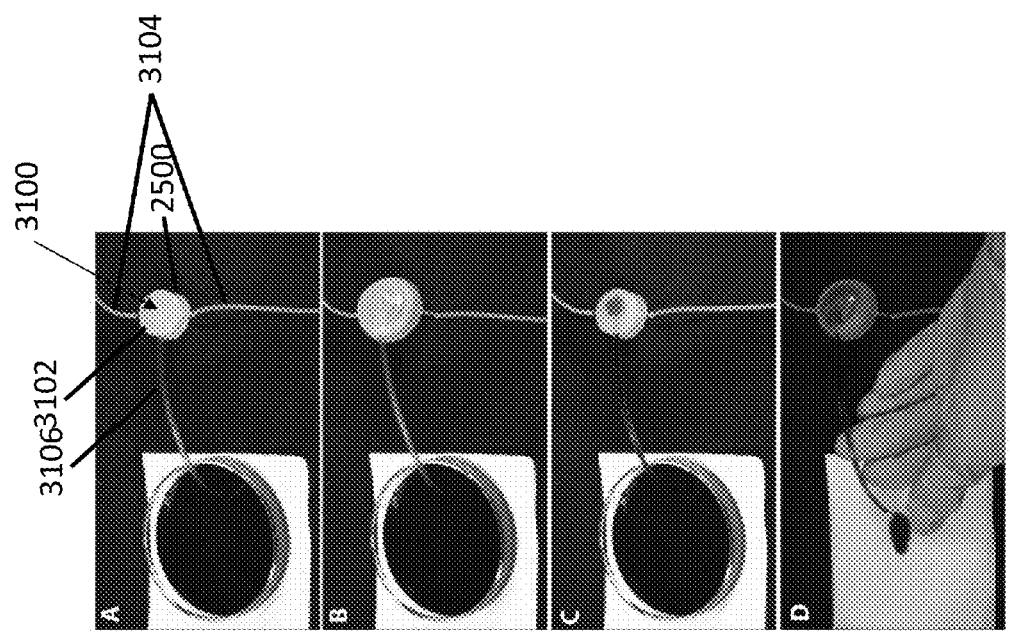
FIGS. 31A-31D demonstrate a manipulation of dyed water using a fluid suction device in accordance with certain embodiments.

FIGS. 31A-31D demonstrate a manipulation of dyed water using a fluid suction device in accordance with some embodiments of the disclosed subject matter. As disclosed in FIGS. 29A-29D, the fluid suction device 3100 includes a radial deflection actuator 2500 and the soft chamber 3102 stacked on top of the radial deflection actuator 2500. In this demonstration, the actuator 2500 is coupled to a pressure source via two conduits 3104, and the soft chamber 3102 is coupled to the dyed water via the fluid inlet 3106. In FIG. 31A, the fluid suction device 3100 is in its relaxed state, as illustrated in FIG. 29A. In FIG. 31B, the actuator 2500 is pressurized via the conduits 3104 so that the actuator 2500 deflects radially. The radial deflection of the actuator 2500 causes the soft chamber 3102 to exhale air in its reservoir. In FIG. 31C, the actuator 2500 is depressurized to return to its relaxed state, which causes the soft chamber 3102 to inhale the dyed water, as discussed in FIG. 29C. The sampled dyed water can be retrieved by pressurizing the actuator 2500 again, as illustrated in FIG. 29D.

Figure 32:
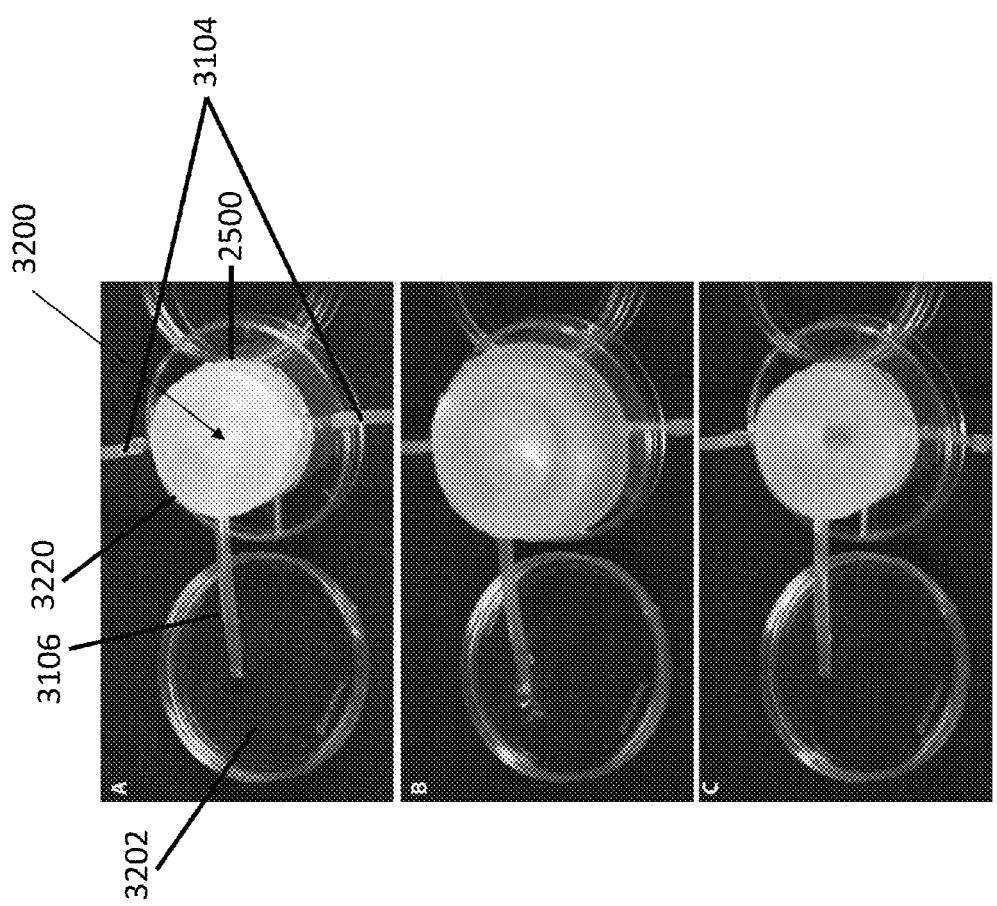
FIGS. 32A-32C demonstrate the use of the fluid suction device in a chemical analysis application, in accordance with certain embodiment.

In addition to fluid collection and delivery, the fluid suction device 3200 can be useful for localized chemical analysis and/or chemical reaction. FIGS. 32A-32C demonstrate the use of the fluid suction device 3200 in a chemical analysis application, in accordance with some embodiments of the disclosed subject matter. In this demonstration, the fluid suction device 3200 samples the chemical 3202 and delivers chemical 3202 into a reservoir housed within the soft chamber 3220, and accommodates a chemical reaction in the reservoir for analyzing certain characteristics of the sampled chemical 3202. As shown in FIG. 32A, the fluid suction device 3200 is configured in a similar manner as in FIG. 31A. For chemical analysis, the soft chamber 3220 in the fluid suction device 3200 can include a colorimetric indicator, e.g., a colorimetric base indicator. The translucent properties of silicone-based elastomers, such as Ecoflex silicone elastomers, make them particularly suitable for visually observing the chemical reaction that takes place within the soft chamber. In some embodiments, the colorimetric base indicator can be a breakable capsule that is compressed upon actuation of actuator 2500 to release the indicator material, e.g., a colorimetric base indicator. In FIG. 32B, the fluid suction device 3200 is pressurized to expel air residing in the reservoir of soft chamber 3220; upon return to its resting state (depressurization) fluid chemical 3202 is delivered to a reaction chamber within the soft chamber. The sampled chemical 3202 reacts with the colorimetric base indicator, which would, in turn, indicate the characteristic of the sampled chemical 3202 using color, as illustrated in FIG. 32C. Because the fluid suction device 3200 is translucent, the color change can be easily observed.

Hybrid Soft/Hard Robot

While soft robots can perform many types of complex motions, even the most sophisticated soft robots may be challenged by tasks that hard robots can easily address. One such example is locomotion. Some soft robots can include a plurality of "soft actuator legs" that can be bent via actuation. These soft robots can provide locomotion by bending the soft actuator legs in a concerted manner, thereby providing a spider-like locomotion. Unfortunately, locomotive capabilities of such multifunctional soft robots may be limited and can fall short of locomotive capabilities of hard robots, especially for certain terrains, such as flat terrains. While spider-like movements of soft robots can be well equipped for moving on a rugged surface, such movements may not be able to provide rapid motion on flat surfaces. Therefore, robots that retain desirable characteristics of both soft robots and hard robots are desired.

Figure 33:
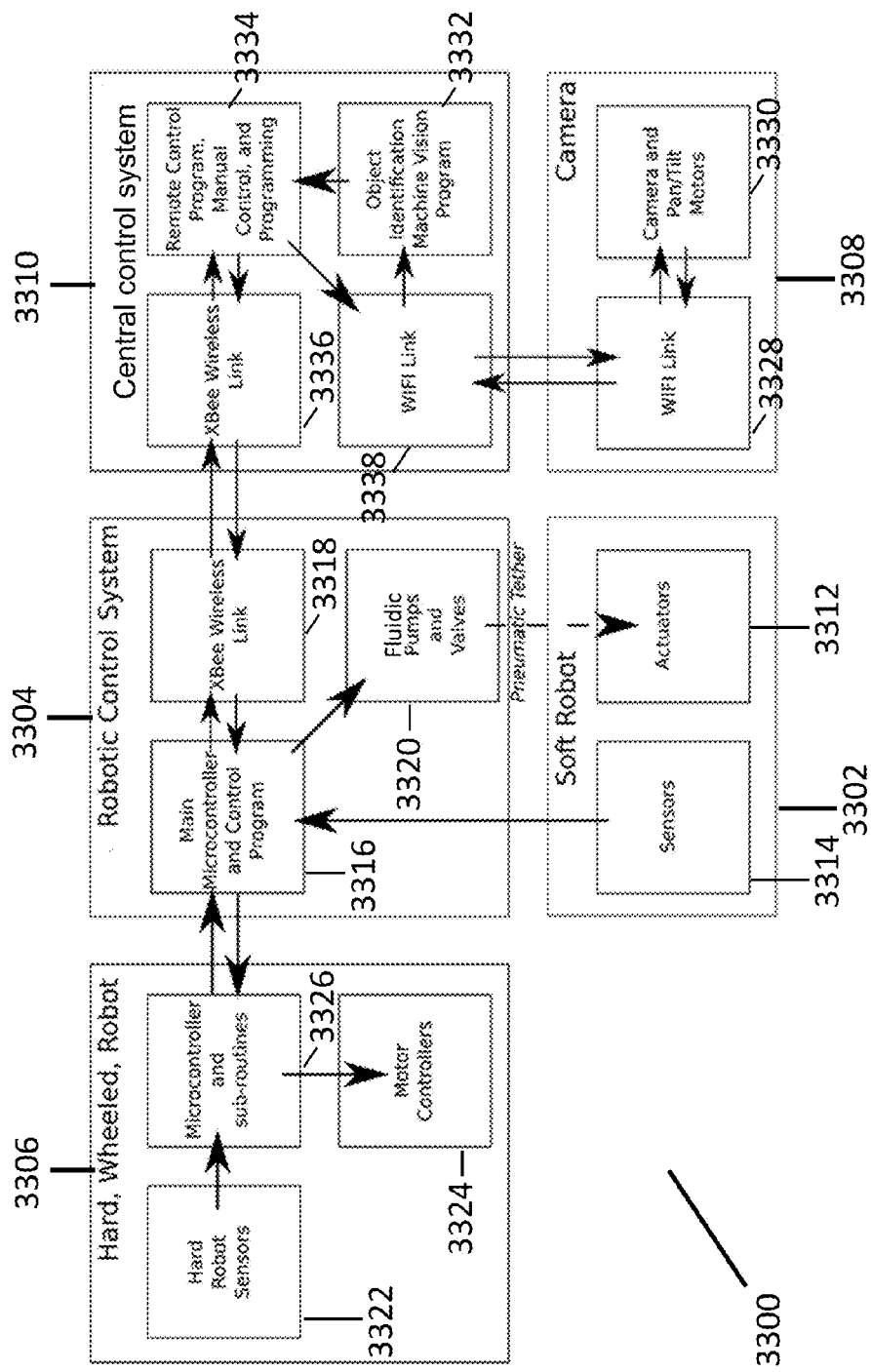
FIG. 33 illustrates a robotic system integrating a soft robot and a hard robot in accordance with certain embodiments of the disclosed subject matter.

FIG. 33 illustrates a robotic system in accordance with some embodiments of the disclosed subject matter. The robotic system 3300 can include one or more of the following components: a soft robot 3302, a robotic control system 3304, a hard robot 3306, a camera system 3308, and a central control system 3310. Each of these components are described below in detail.

Soft Robot

In some embodiments, the soft robot 3302 can include one or more actuators 3312. The actuators 3312 can include one or more fluidic channels that can be actuated to provide motion. As a method of actuation, most of the proposed soft robots utilize the reversible change in shape produced in thin, elastomeric membranes by pressure: microfluidic networks of channels embedded in soft elastomers can be designed to be used as actuation layers of stiffer elastomeric membranes. Channels are embedded into a softer elastomer and this layer is bonded to a stiffer, but still pliable layer. Upon pressurization of the channels using air (pneumatic actuation) or more generally a fluid (fluidic actuation), the soft elastomeric network expands. This expansion, or strain, is limited at the interface between the softer and stiffer elastomeric layers; the expansion of the soft elastomer is accommodated by bending around the stiffer, strain-limiting layer.

The actuators 3312 are configured to provide certain functionalities. In some embodiments, the actuators 3312 can include a soft tentacle actuator 202. In other embodiments, the actuators 3312 can include the radial deflection actuator 2500. In yet other embodiments, the actuators 3312 can include one or more of the actuators as disclosed in PCT Patent Application No. PCT/US2011/061720, titled "Soft Robotic Actuators," PCT Patent Application No. PCT/US2012/059226, titled "Systems and Methods for Actuating Soft Robotic Actuators," PCT Patent Application No. PCT/US2013/028250, titled "Apparatus, System, and Method for Providing Fabric-Elastomer Composites as Pneumatic Actuators" and PCT Patent Application No. PCT/US2013/022593, titled "Flexible Robotic Actuators," which are hereby incorporated herein by reference in their entireties.

Figure 34:
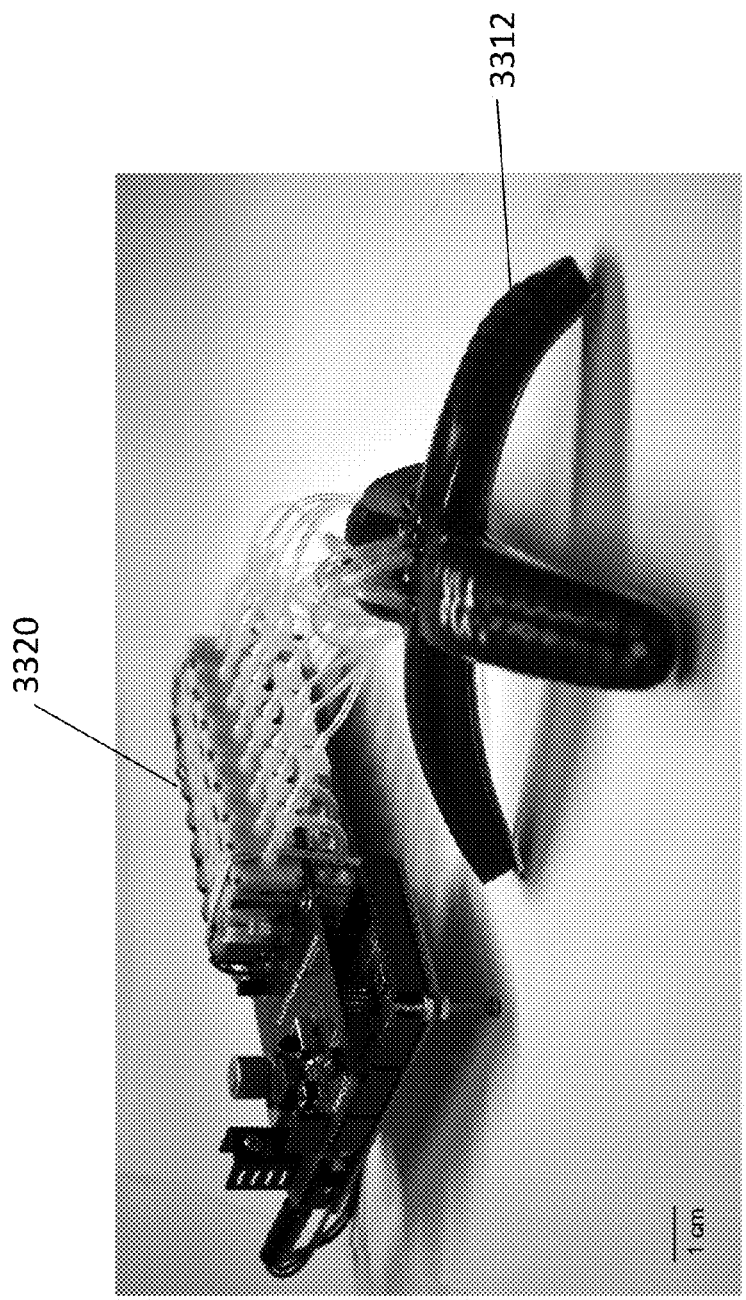
FIG. 34 illustrates the actuators configured as a walker and a robotic control system coupled to the walker in accordance with certain embodiments of the disclosed subject matter.
Figure 35:
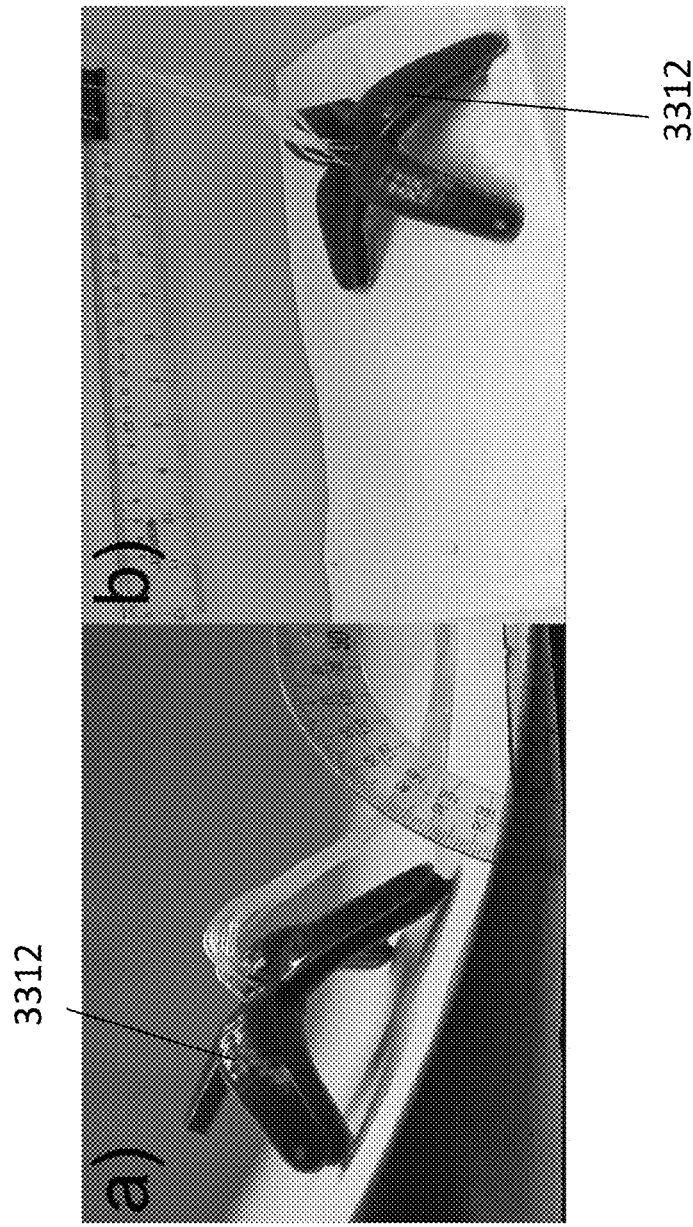
FIGS. 35a-35b illustrate the walking motion of the walker in accordance with certain embodiments of the disclosed subject matter.

In some embodiments, the actuators 3312 can be configured as a walker. FIG. 34 illustrates actuators configured as a walker in accordance with some embodiments of the disclosed subject matter. The actuator 3312 can include legs that are configured to bend upon actuation. These legs can be independently actuated to provide directional movements. FIGS. 35a-35b illustrate the walking motion of the actuator 3312 in accordance with some embodiments of the disclosed subject matter. FIG. 35a illustrates that the actuator 3312 can walk up an inclined surface, having about 10-15 degrees of incline angle. FIG. 35b illustrates that the actuator 3312 can walk on a variety of surface types, including sand.

In some embodiments, the actuator 3312 can be configured to exhibit rotational symmetry. For example, the actuator 3312 can have three legs configured to exhibit a three-fold rotational symmetry (i.e., C3 symmetry.) The C3 symmetry configuration can provide a passive stability of the actuator 3312. In another example, the actuator 3312 can have four legs configured to exhibit a four-fold rotational symmetry (i.e., C4 symmetry.) This allows a simpler control of the actuator 3312 to move in multiple directions.

Figure 36:
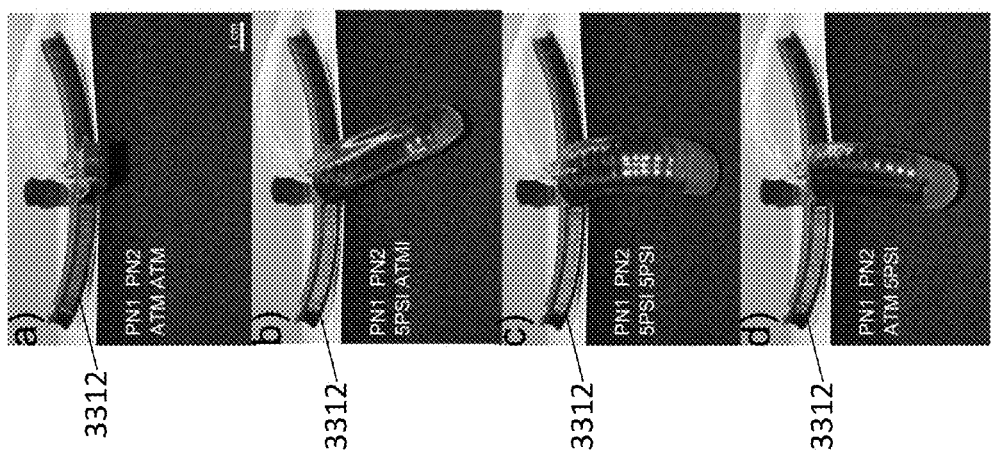
FIGS. 36a-36d illustrate the paddling motion of the leg in accordance with certain embodiments of the disclosed subject matter.

In some embodiments, each leg in the actuator 3312 can include two parallel fluidic channels that can be independently actuated. The parallel fluidic channels can run from the center of the actuator 3312 to the tip of the leg and can act as agonist/antagonist muscles. This pairing allows for actuating the leg in a paddling motion. FIGS. 36a-36d illustrate the paddling motion of the leg in accordance with some embodiments of the disclosed subject matter. In FIG. 36a, both fluidic channels are at an atmospheric pressure. When one of the fluidic channels is pressurized, namely PN1, then the tip of the leg can move forward-and-down, as illustrated in FIG. 36b. When both fluidic channels are pressurized, the tip of the leg can move back-and-down, as illustrated in FIG. 36c. Subsequently, when the pressure in PN1 is removed, then the tip of the leg can move back-and-up, as illustrated in FIG. 36d. When the pressure in both fluidic channels is removed, then the leg would return to the original position (not shown.) The sequence of pressurization/depressurization of each of the eight fluidic channels, (i.e., the fluidic channels of four legs,) determines the gait of the actuator 3312.

In some embodiments, the actuator 3312 can provide a rotational motion. For example, each leg in the actuator 3312 can be actuated with a slight time-offset, which can provide an effective rotational motion to the actuator 3312. To facilitate the rotational motion, the tip of each leg in the actuator 3312 can be made round. This allows the legs to remain in contact with the substrate when the actuator 3312 is rotated. In some embodiments, the legs in the actuator 3312 can be simultaneously actuated to operate as a gripper.

In some embodiments, the soft robot 3302 can include sensors 3314, as shown in the schematic in FIG. 33. The soft robot 3302 can use sensors 3314 to gather information about its surroundings and respond to the gathered information. In some embodiments, sensors 3314 can include a bump sensor. The soft robot 3302 can use the bump sensor to detect obstacles, and avoid the detected obstacles by moving around them. A bump sensor can include piezo-resistive sensors that change resistance when brought into contact with another object. This change in resistance can be detected by the robotic control system, which would then cause the soft robot to alter the motion direction.

Figure 37:
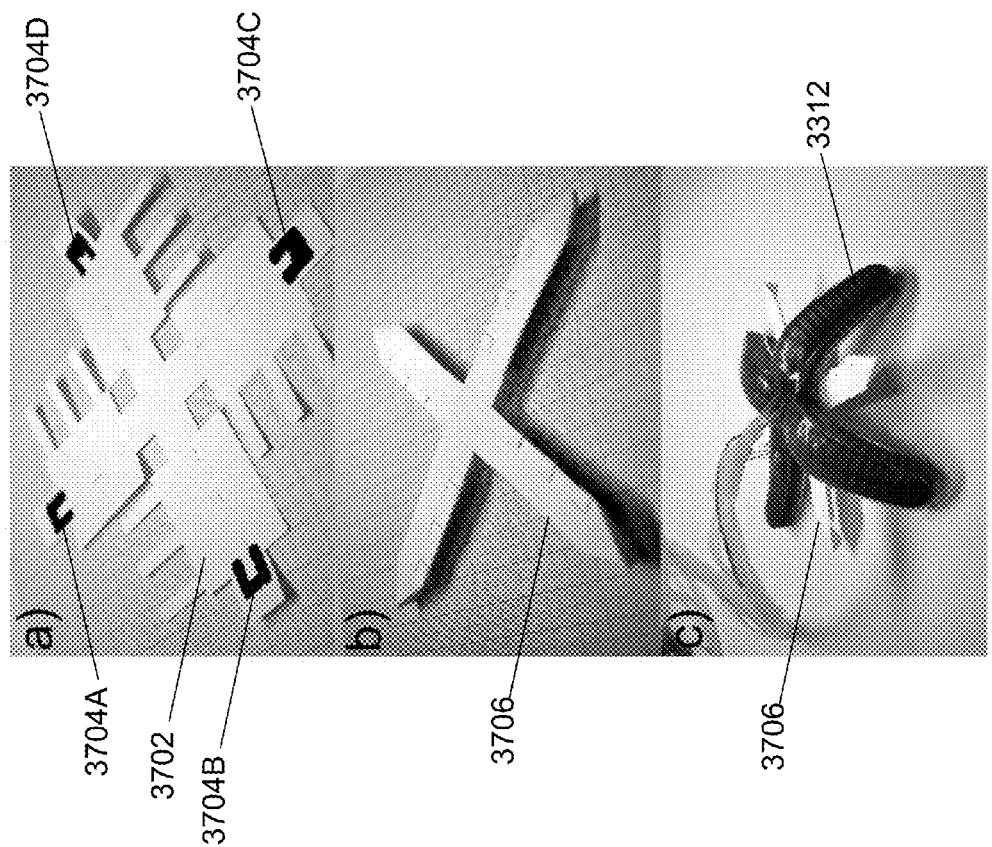
FIGS. 37a-37c illustrate the design and the deployment of a bump sensor in accordance with certain embodiments of the disclosed subject matter.

FIGS. 37a-37c illustrate the design and the deployment of a bump sensor in accordance with some embodiments of the disclosed subject matter. FIG. 37a illustrates a net 3702 for paper-based bump sensors. The stencil printed carbon ink patches 3704A-3704D at four ends of the net can operate as piezo-resistive sensors. Copper wires can be connected to the piezo-resistive sensors 3704A-3704D using silver epoxy. FIG. 37b shows the folded form of the bump sensor 3706, showing the triangular cross section of the arm and the top-side of the flexible hinge containing the piezo-resistive sensors 3704A-3704D. When the flexible hinge contacts another object, the resistance of the associated piezo-resistive sensor would change accordingly. The robotic control system 3304 can detect this change in resistance and, in response, steer the motion direction of the soft robot.

FIG. 37c shows how the bump sensor 3706 can be mounted on a soft robot 3302. In some embodiments, the bump sensor 3706 can be mounted onto the soft robot 3302 by gluing the bump sensor 3706 onto the soft robot 3302. The origami paper structure of the bump sensor 3706, having a triangular cross section, provides a rigid support and the flexible hinge provides the scaffold for the stencil printed sensors. In the illustrated embodiment, both the bump sensor and the soft robot measure six inches from point to point through their centers.

Robotic Control System

The robotic control system 3304 is coupled to the soft robot 3302, the hard robot 3306, and the central control system 3310. The robotic control system 3304 can operate as a control center for controlling the operation of the soft robot 3302 and the hard robot 3306.

In some embodiments, the robotic control system 3304 can include two main elements: an electronic system and a fluidic system. The electronic system can include a control program module 3316 and a communication link module 3318. The control program module 3316 can communicate with the hard robot 3306 via a wired serial bus and with the central control system 3310 via the communication link module 3318. The communication link module 3318 can include a XBee wireless link module. The control program module 3316 can implemented using a microprocessor, such as Atmel AVR 2056.

The control program module 3316 can receive an instruction to move the soft robot 3302. For example, the control program module 3316 can receive the instruction from a central control system 3310. The control program module 3316 can use this instruction to determine how to control the soft robot 3302. In some cases, the control program module 3316 can receive the instruction from a user via a central control system 3310. For example, a user can use a gamepad, coupled to the central control system 3310, to specify the desired motion of the soft robot. The central control system 3310 can process the user input and provide appropriate instruction to the control program module 3316. This allows a semi-autonomous control of the robot's motion. In some embodiments, the control program module 3316 can receive sensory feedback information from the sensors 3314 on the soft robot 3302. The control program module 3316 can use this sensory feedback information to determine how to adjust the soft robot movements.

The fluidic system of the robotic control system 3304 can include fluidic pumps and valves 3320. The fluidic pumps and valves 3320 can be coupled to the soft robot 3302 to actuate the fluidic channels in the soft robot 3302. In some embodiment, each of the fluidic pumps and valves 3320 can be coupled unique fluidic channels. This allows the robotic control system 3304 to actuate fluidic channels independently, thereby enabling complex motions.

Figure 38:
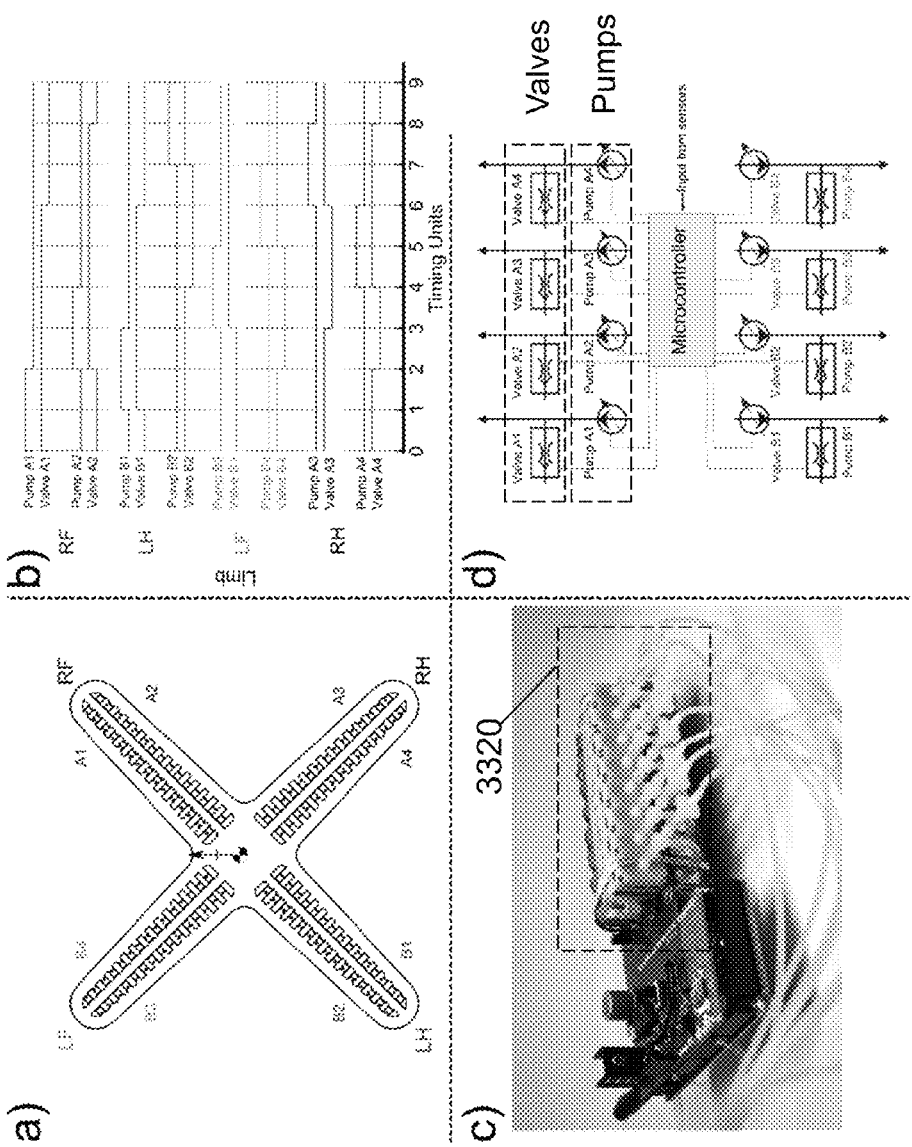
FIGS. 38a-38d illustrate a soft robot, soft robot actuation sequences, and fluidic pumps and valves in accordance with certain embodiments of the disclosed subject matter.

FIGS. 38c-38d illustrate the fluidic pumps and valves in accordance with some embodiments of the disclosed subject matter. The fluidic pumps and valves 3320 can include diaphragm pumps and solenoid valves that are repurposed from low-cost sphygmomanometers. The schematic of the diaphragm pumps and solenoid valves is shown in FIG. 38d. FIG. 34 also illustrates how the diaphragm pumps and solenoid valves are coupled to the soft robot 3312 in accordance with some embodiments of the disclosed subject matter. In some embodiments, the pumps and valves 3320 can be controlled using a custom built PCB and an open source, inexpensive, Arduino microcontroller. The microcontroller, pumps, and valves can run from a lithium-polymer battery so that the robotic system is portable.

In some embodiments, the fluidic pumps and valves 3320 can include an on-board, soft micro-pumping system, as disclosed in PCT Patent Application No. PCT/US2012/059226, titled "Systems and Methods for Actuating Soft Robotic Actuators," which is herein incorporated by reference in its entirety. Different designs of micropumps are contemplated, such as a micro-air compressor, a micro electrolyzer cell, and peroxide fuelled gas generator.

In some embodiments, the micropump can include a reciprocating diaphragm micro-pumps such as those available from Takasao Electronics, e.g., SDMP302 standard series piezoelectric micropump, with the smallest devices on the order of 3000 mm$^3$. These piezoelectrically actuated micropumps use less than a Watt of power to produce ~1 mL/min air flow at ~1 kPa. A soft 100 mm$^3$ micropump is proposed by incorporating existing reciprocating diaphragm technologies into an embedded elastomer. The air compressor can be composed of a diaphragm pump, inlet and outlet membrane valves, and micro air channels. The complete system can be assembled by bonding pre-patterned layers of silicone and polyurethane elastomers. The only rigid component in the assembly is the electrically powered actuator used to pump the air chamber.

In some embodiments, the micropump can include an electrolyzer cell that can produce gas. The electrolyzer cell can generate gas (hydrogen and oxygen) at the rate ~5 mL/min, which is about 10-50 times lower than desired for the soft robots, however, improved performance is possible by increasing voltage applied, the surface area of the electrodes, the conductivity of the aqueous solution, and combination of the above. In some embodiments, the micropump can include a generator that generates pressure through catalyzed decomposition of hydrogen peroxide and self-regulated. Such a pump can produce stable pressure as high as 22 psi, and be capable of drive the locomotion of a pneumatic rolling belt.

The control program module 3316 can control the pumps and valves 3320 using actuation sequences. The actuation sequences can determine the motion of the soft robot. In some embodiments, the control program module 3316 can empirically determine the actuation sequences. For example, the control program module 3316 can find the control sequence for the soft robot 3302 in a trial-and-error manner in order to determine the adequate control sequence for desired motions. In most cases, the actuation sequence for each fluidic channel can be abstracted as follows: (a) closing a valve, (b) turning on the pump to inflate (i.e., pressurize) the fluidic channel, (c) turning off the pump while keeping the valve closed, and (d) opening the valve to deflate the fluidic channel. FIG. 38b illustrates the empirically derived actuation sequences for a spider-like locomotion of the actuator 3312 in accordance with some embodiments of the disclosed subject matter. In some embodiments, by slightly offsetting the actuation sequence of each fluidic channel, a rotation of the leg, as measured at the tip, can be observed.

In some cases, the actuation sequences can be represented as a timing matrix. Each row of the timing matrix can include the actuation sequence for each fluidic channel coupled to the robotic control system 3304. The top row of the timing matrix can be considered the primary actuation sequence that initiates the actuation of a primary fluidic channel at t=0. Then the other rows of the timing matrix, associated with other fluidic channels, can be considered secondary actuation sequences that are defined with respect to the primary actuation sequence. In some embodiments, these secondary actuation sequences can be defined in terms of their timing matrix rotation from t=0. In other words, the secondary actuation sequences can be considered the time-shifted version of the primary sequence. For example, suppose that a primary actuation sequence is 110000000. Then the secondary actuation sequences can be derived from the primary actuation sequence via a "left-shift" matrix rotation. The "left-shift" matrix rotation is the process of shifting each element of a matrix to the left. In this process, the leftmost element is taken from the end of the matrix and inserted back at the first position on the right. For instance, the primary actuation sequence 110000000 rotated to the left by one spot becomes the secondary actuation sequence 100000001.

In some embodiments, the direction of the walking motion can be modified by permuting rows of the timing matrix associated with a directional walking motion. In contrast to the locomotion of most quadruped animals, an actuator 3312 having a rotational symmetry does not need to rotate to change the motion direction. Instead, the actuator 3312 can be controlled using a modified actuation sequence to cause sideways or backwards movement. This tactic can be thought of as redefining which side of the robot is the "front". For example, the permutation of the timing matrix changes the primary fluidic channel associated with the primary actuation sequence of the directional walking motion. This effectively changes the frontal side of the walker.

FIGS. 38a-38b qualitatively illustrate the permutation of the timing matrix in accordance with some embodiments of the disclosed subject matter. FIG. 38a illustrates a soft robot in accordance with some embodiments of the disclosed subject matter. The each leg has two independently actuated fluidic channels. The quadruped has been designed for stability, locomotion and directional control. Polyethylene tubing was inserted into the leg through which pressurized air can actuate the leg. If the orientation of the soft robot is defined such that the initial left front and right front legs contain fluidic channels B3, B4, A1, and A2, then these fluidic channels can constitute the "front" of the soft robot. In this case, the first fluidic channel to be actuated in the sequences for forward, left, backward and right locomotion are A1, A3, B1 and B3 respectively. If the robotic control system 3304 decides to modify the direction of the walking motion, the control program module 3316 can permute the rows of the timing matrix to effectively redefine which fluidic channel is actuated first using the primary actuation sequence. This would change the orientation of the soft robot so that the new left front and right front legs contain fluidic channels B1, B2, A3, and A4.

Figure 39:
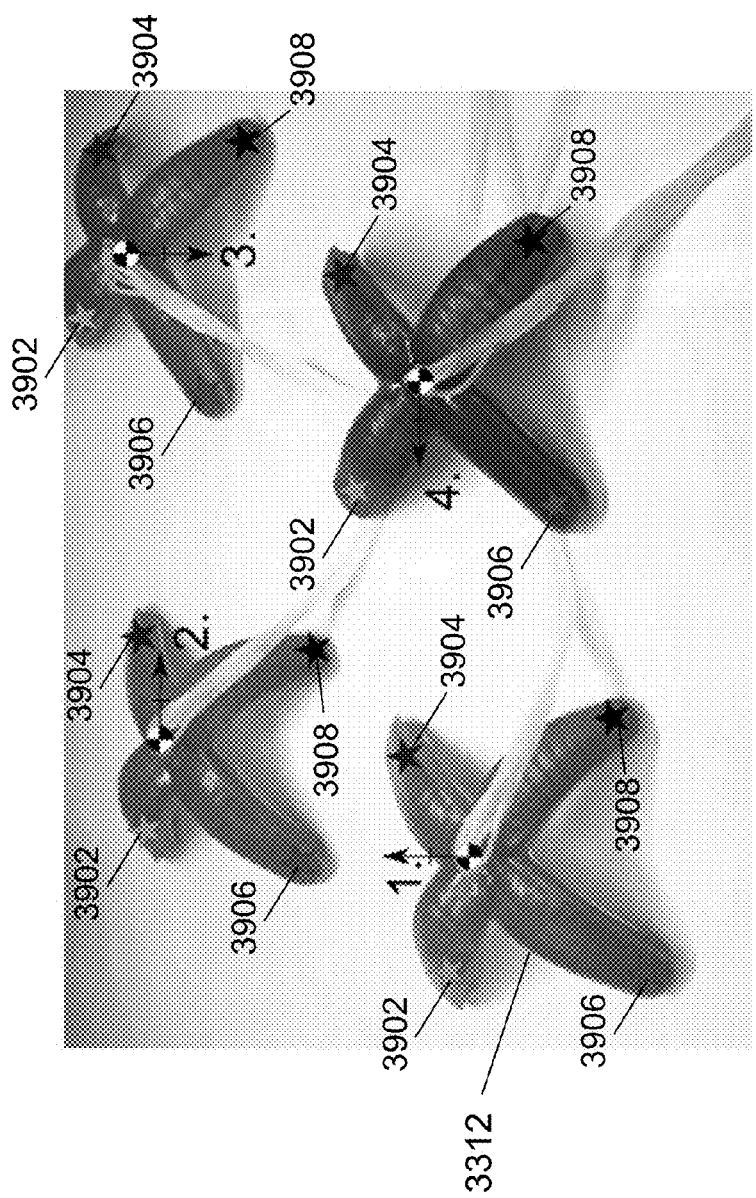
FIG. 39 illustrates the directional walking movements of the soft robot in accordance with certain embodiments of the disclosed subject matter.

FIG. 39 illustrates the directional walking movements of the soft robot in accordance with some embodiments of the disclosed subject matter. In this figure, the soft robot 3302 starts in the lower left corner of the figure and then walks to the upper left, upper right, and then lower right. The numbered stars correspond to the initial orientation of the robot: left fore 3902, right fore 3904, left hind 3906, and right hind 3908. The soft robot 3302 moves in different directions by reorienting the effective front of the robot 3312—the robot 3312 itself does not physically turn.

The software needed for implementing the robotic control system 3304 can include a high level procedural or an object-orientated language such as MATLAB®, C, C++, C#, Java, or Perl. The software may also be implemented in assembly language if desired. In some embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Hard Robot

The hard robot 3306 can include hard robot sensors 3322, motor controllers 3324, and a microcontroller 3326. The hard robot 3306 can be equipped for locomotion. In some embodiments, the hard robotic system can act as a transporter hub. The hub can carry the batteries, pumps, valves, microcontrollers, and communications equipment. The use of wheels or tracks, or any other hard-body means for providing locomotion, leverages the strengths of these two robust, high load bearing, mechanical elements. In some embodiments, the hard robot 3306 can contain its own microprocessor and instruction set and control itself autonomously. In other embodiments, the hard robot 3306 can be controlled entirely by the microprocessor in the robot control system 3304.

Camera System

The camera system 3308 can include a communication link 3328 and a camera module 3330. The camera module 3330 can include one or more image sensors for capturing image or video information surrounding the robotic system 3300, and one or more motors for moving the image sensors in response to external inputs. The communication link 3328 can include a wireless link that can enable the camera system 3308 to be operated at a distance from the central control system 3310. The camera system 3308 can be operated by a user—using a control pad and video feedback—or by a central control system 3310.

Central Control System

The central control system 3310 can include a machine vision module 3332, a remote control program module 3334, and communication links 3336 and 3338. The machine vision module 3332 running on the central control system 3310 allows object identification, and control/feedback of the position/timing of the deployment and actions of the soft robot. The central control system 3310 can be a remote computer, including a desktop computer, a laptop computer, a tablet computer, or a smart phone. The software needed for implementing the central control system 3310 can include a high level procedural or an object-orientated language such as MATLAB®, C, C++, C#, Java, or Perl. The software may also be implemented in assembly language if desired. In some embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Application

Figure 40:
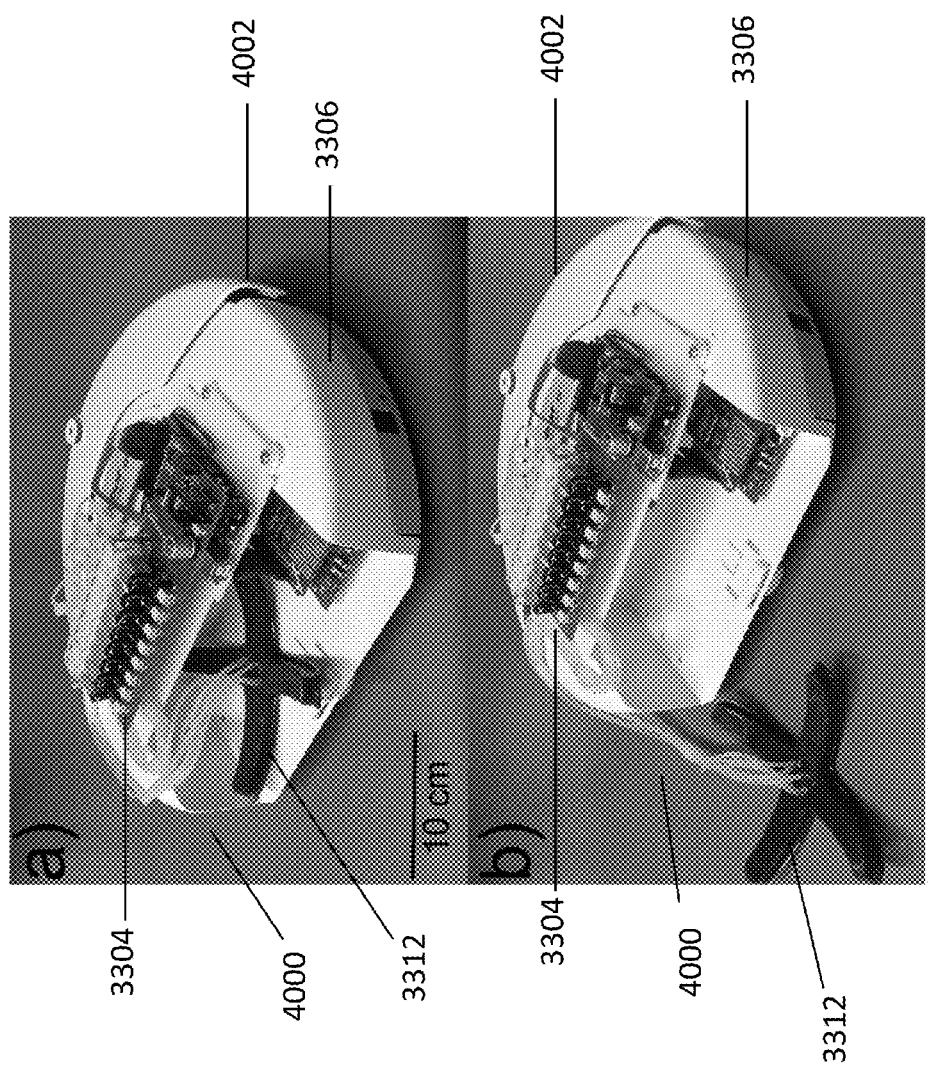
FIGS. 40a-40b illustrate the robotic vacuum cleaner in accordance with certain embodiments of the disclosed subject matter.

In some embodiments, the robotic system 3300 can be configured as a robotic mover. FIGS. 40*a*-40*b* illustrate a robotic mover in accordance with some embodiments of the disclosed subject matter. The robotic mover 4000 can include a soft robot 3302, a robotic control system 3304, and a hard robot 3306, and can couple to a camera system 3308 and a central control system 3310 (not shown.)

Figure 41:
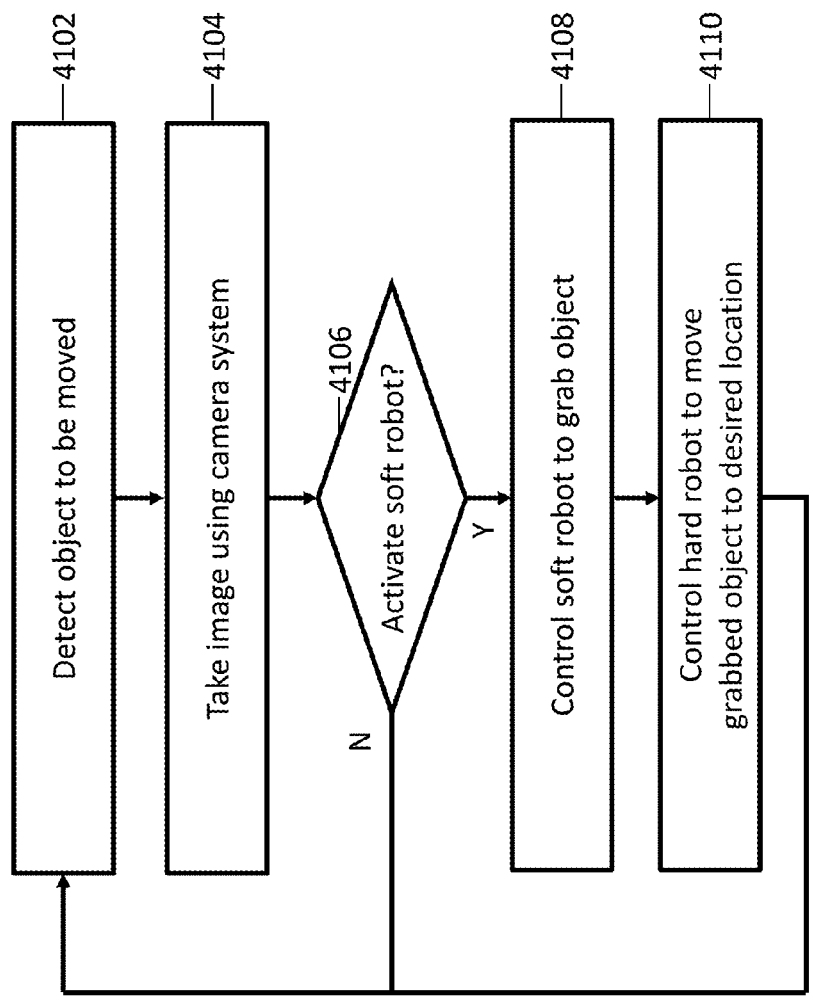
FIG. 41 illustrates a process of moving an object using a robotic mover in accordance with some embodiments of the disclosed subject matter.

The robotic mover 4000 can be deployed to perform certain predetermined tasks. FIG. 41 illustrates a process of moving an object using a robotic mover in accordance with some embodiments of the disclosed subject matter. In step 4102, the robotic mover 4000 can detect a target object to be moved. The robotic mover 4000 can detect the object to be moved using a sensor that is attached to a hard robot 3306. The sensor can include one or more of, for example, a physical bump sensor 4002, a proximity sensor such as an infrared proximity sensor, and a time-of-flight sensor including a sonar sensor. In step 4104, the robotic mover 4000 can take an image of the detected object using the camera system 3308 and provide the image to the central control system 3310. In step 4106, the central control system 3310 can process the received image and determine whether or not the robotic mover 4000 should remove the detected object. To this end, the central control system 3310 can use an image processing system and/or an object recognition system.

If the central control system 3310 determines that the robotic mover 4000 does not need to move the detected object, then the robotic mover 4000 can proceed to step 4102 until the robotic mover 4000 detects another object. If the central control system 3310 determines that the robotic mover 4000 should move the detected object, then the robotic mover can proceed to step 4108.

In step 4108, the robotic control system 3304 in the robotic mover can activate the fluidic pumps and valves 3320 so that the soft robot 3302 can grab the detected object. For example, the robotic control system 3304 can provide an activation sequence to the fluidic pumps and valves 3320, and in response, the fluidic pumps and valves 3320 can cause the soft robot 3302 to walk to the detected object and grab the detected object. The inherent compliance of the soft robot 3302 can limit any damage or pressure inflicted on the detected object and can allow the soft robot 3302 to pick up objects without knowing the shape of the object.

In step 4110, the robotic control system 3304 can send control sequences to the hard robot 3306 so that the hard robot 3306 can drag the soft robot 3302 and the grabbed object to a desired location. This way, the grabbed object can be rapidly moved to a desired location. In some embodiments, the robotic control system 3304 can autonomously operate the hard robot 3306; in other embodiments, the robotic control system 3304 can receive instructions, from the central control system, to move the hard robot to a desired location. Once the soft robot 3302 is dragged to a desired location, the soft robot 3302 can unleash the grabbed object, and return to its dock, inside the hard robot 3306.

In some embodiments, the hard robot 3306 can include a vacuum cleaner. In such embodiments, the robotic mover 4000 can be configured as a robotic vacuum cleaner. The robotic vacuum cleaner can use the soft robot 3302 to grab and remove objects that cannot be removed by the vacuum cleaner. Once the soft robot 3302 removes such objects, the robotic vacuum cleaner can use the hard robot 3406 to remove the remainder.

In some embodiments, the robotic system 3300 can be used as a transporting hub. For example, the hard robot 3306 can be used to transport functional materials, such as fuels, glues, and foams, and the soft robot 3302 can be used to apply or make use of the functional materials.

In some embodiments, the hard robot 3306 can assist soft robots in tasks that soft robots are not well equipped to carry out. For example, the hard robot 3306 can be used to provide power to the soft robot 3302. The power can be in the form of pneumatics, hydraulics, or any other types of fluidic power.

In other embodiments, the soft robot 3302 can provide the hard robot 3306 additional means to interact with surroundings. For example, the soft robot 3302 can gather objects from the surroundings, and the hard robot 3306 can analyze the gathered objects, and provide the analysis result to the central control system.

In some embodiments, the robotic system 3300 can be used as a robotic marsupial system having a soft robot and a hard robot where the hard robot operates as a hub of the robotic marsupial system and the soft robot is carried by the hard robot. In such robotic marsupial system, the soft robot 3302 provides means for the hard robot 3306 to interact with a hazardous environment without actually entering the hazardous environment. For instance, the soft robot 3302 can be deployed for bomb disposal, or deployed in a radiation-contaminated or chemical-contaminated environments, while the hard robot 3306 is placed distant from the hazardous environment. This can be a useful strategy for preserving an expensive hard robot 3306 at the expense of a cheaper soft robot 3302. In another example, the soft robot 3302 can provide operating means in regions that hard robots would fail. Hard robots can fail under certain circumstances, such as when deployed in a region exposed to a high radiation, deep soft mud, puddles of corrosive chemicals, or arcing electrical components. However, soft robots can still operate well in those regions. Therefore, the soft robots can provide means for the robotic system to operate properly, even when hard robots fail. In another example, the soft robots would provide hard robots capabilities to work with delicate subjects, such as wounded people. In yet another example, hard robots can customize the soft robots to operate in certain dedicated environments.

Materials for Soft Robots

The list of materials that can be used with soft robots is extensive and encompasses elastomers such as latex, polyurethanes, polyacrylates, silicones, vulcanized rubber for the extensible materials, and fabrics such as paper, Kevlar©, cotton, nylon, etc. for the strain limiting membrane. An exemplary list of material combinations is shown in Table 1. Each combination provides for a varying degree of bending upon actuation, where the bending degree for the same channel material increases, e.g., greater deflection or smaller radius of curvature at the strain limiting layer, with increasing difference in elastic modulus/tensile modulus of the strain limiter. Other materials and material combinations will be apparent to one of skill in the art.

TABLE 1

| Channel Material | | Strain Limiting Material | |
|---|---|---|---|
| Material | Young's Modulus (kPa) | Material | Young's Modulus |
| Ecoflex © silicone | ~40 | PDMS | ~400 kPa |
| Ecoflex © silicone | ~40 | Paper | >10 GPa |
| Ecoflex © silicone | ~40 | Plastic sheet | ~0.2 GPa for LDPE ~3 GPa for PET |
| Ecoflex © silicon | ~40 | Woven fiber mesh (fabric) | >70 GPa for Kevlar |
| PDMS | ~400 | Paper | >10 GPa |

The choice of materials, coupled with the design of the channels, determines the response of the device to pressure. The pressure necessary to achieve a particular amplitude of actuation scales with the stiffness of the materials. Each combination provides a different behavior in bending, upon actuation: for the same channel geometry, the bending increases with increasing difference in elastic modulus between the elastomer and the strain limiting fabric (or layer). Effects of material choices is demonstrated with respect to two silicone elastomers (polydimethylsiloxane (PDMS, Dow Corning Sylgard 184) and Ecoflex 00-30 (a siloxane produced by Smooth-On; http://www.smooth-on.com)) because they are readily accessible, are easy to work with, bond well to each other to form multilayer structures, and are relatively inexpensive. However, other suitable material combinations will be readily apparent. PDMS is transparent and has a Shore A hardness of 50. It is elastic and can withstand repeated bending, but fractures above a maximum strain of 150%. As a result, PDMS has a limited range of deformation, and is suited for the more rigid parts of a structure—parts that bend but do not stretch. PDMS can be used as the flexible component, as noted in Table 1, in combination with stiffer materials such as paper. Ecoflex silicone is translucent and has a hardness below the Shore A scale. It fractures above a maximum strain of 900%; it is more flexible than PDMS, and therefore, it is suitable for components with larger strains/displacements (i.e., the layers of actuation). Because it is so soft, Ecoflex silicone, if unsupported, will bend under its own weight (PDMS, much less so). Composite structures, comprising layers of PDMS and Ecoflex silicone, balance the rigidity of PDMS with the flexibility of Ecoflex silicone for the desired function.

In other embodiments, the alternate materials are useful for the fabrication of devices. Composites using paper, textiles, carbon-, glass- or metal fiber as the stiffer material (or a material having a higher tensile modulus) are possible. In other embodiments, stiffness is introduced into a wall of the channel by introducing a reinforcing agent into one wall of the channel. In other embodiments, one wall is chemically treated to increase its stiffness. By way of example, an elastomeric flexible polymer can be impregnated with a polymer precursor solution, which is then cured in a predetermined pattern to form a stiffer polymer.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

The invention claimed is:

1. A soft robot comprising:
   a flexible body having a plurality of embedded fluid channels, wherein at least two of the plurality of embedded fluid channels are arranged concentrically around a central axis of the flexible body; and
   a pressurizing inlet coupled to the at least two of the plurality of embedded fluid channels, wherein the pressurizing inlet is configured to receive pressurized fluid to inflate a portion of the at least two of the plurality of embedded fluid channels, thereby causing a radial deflection of the flexible body,
   wherein the at least two of the plurality of embedded fluid channels are arranged as concentric circles.

2. The soft robot of claim 1, wherein the flexible body comprises a strain limiting layer, wherein a tensile modulus of the strain limiting layer is higher than a tensile modulus of the flexible body.

3. The soft robot of claim 2, wherein the strain limiting layer comprises paper.

4. The soft robot of claim 1, further comprising a soft chamber disposed above and in sealing contact with the flexible body, wherein the soft chamber comprises a fluid reservoir and a fluid inlet.

5. The soft robot of claim 4, wherein the soft chamber comprises a cap comprising a cover layer and one or more walls, wherein the one or more walls are attached to the flexible body, and a volume between the cap and the flexible body forms the fluid reservoir.

6. The soft robot of claim 5, wherein the fluid reservoir is configured to deliver fluid via the fluid inlet when the at least two of the plurality of embedded fluid channels are pressurized.

7. The soft robot of claim 5, wherein the fluid reservoir is configured to receive fluid via the fluid inlet when the at least two of the plurality of embedded fluid channels are depressurized.

8. A method of receiving or delivering a fluid comprising:
   providing a soft robot according to claim 4;
   providing fluid to the soft chamber via the fluid inlet; and
   providing pressurized fluid to the pressurizing inlet to pressurize the at least two of the plurality of embedded fluid channels, thereby expelling fluid housed within the soft chamber via the fluid inlet.

9. The method of claim 8, further comprising removing the pressurized fluid from the pressurizing inlet to depressurize the at least two of the plurality of embedded fluid channels, thereby inhaling fluid into the soft chamber via the fluid inlet.

10. The method of claim 9, wherein the soft chamber is configured to accommodate a chemical reagent capable of reaction with a reagent to generate a color.

11. The soft robot of claim 1, wherein the flexible body is molded using an elastomer.

12. A method of actuating a soft robot, the method comprising:
    providing a soft robot according to claim 1; and
    providing pressurized fluid to the pressurizing inlet to pressurize the at least two of the plurality of embedded fluid channels, thereby causing a radial deflection of the soft robot.

13. A method of gripping a non-porous surface comprising:
    providing a soft robot according to claim 1;
    positioning the soft robot against a non-porous surface; and
    providing pressurized fluid to the pressurizing inlet to pressurize the at least two of the plurality of embedded fluid channels, thereby collapsing the soft robot against the non-porous surface to form a suction seal.

* * * * *